United States Patent [19]
Forslund et al.

[11] Patent Number: 5,237,626
[45] Date of Patent: Aug. 17, 1993

[54] UNIVERSAL IMAGE PROCESSING MODULE

[75] Inventors: Donald C. Forslund, Wappingers, N.Y.; Hans-Juergen Muenster, Boeblingen, Fed. Rep. of Germany

[73] Assignee: International Business Machines Corporation, Armonk, N.Y.

[21] Appl. No.: 758,155

[22] Filed: Sep. 12, 1991

[51] Int. Cl.5 .......................... G06K 9/56; G06K 9/54
[52] U.S. Cl. ......................................... 382/27; 382/49
[58] Field of Search ....................... 382/19, 27, 41, 49, 382/55

[56] References Cited

U.S. PATENT DOCUMENTS

| | | | |
|---|---|---|---|
| 3,106,698 | 10/1963 | Unger | 382/41 |
| 3,214,574 | 11/1965 | Landsman et al. | 377/10 |
| 3,339,179 | 8/1967 | Shelton et al. | 382/55 |
| 3,805,035 | 4/1974 | Serra | 235/151.3 |
| 3,846,754 | 11/1974 | Oka et al. | 340/146.3 |
| 4,003,024 | 1/1977 | Riganati et al. | 340/146.3 |
| 4,167,728 | 9/1979 | Sternberg | 340/146.3 |
| 4,174,514 | 11/1979 | Sternberg | 340/146.3 |
| 4,290,049 | 9/1981 | Sternberg | 340/146.3 |
| 4,414,685 | 11/1983 | Sternberg | 382/49 |
| 4,484,349 | 11/1984 | McCubbrey | 382/49 |
| 4,510,616 | 4/1985 | Lougheed et al. | 382/49 |
| 4,783,738 | 11/1988 | Li et al. | 382/49 |
| 4,908,751 | 3/1990 | Smith | 382/49 |
| 4,949,390 | 8/1990 | Iverson et al. | 382/55 |

FOREIGN PATENT DOCUMENTS 1487920  12/1973  United Kingdom ................ 152/152

OTHER PUBLICATIONS

Kruse, Bjorn; A Parallel Picture Processing Machine; Dec. 1973; pp. 1075–1087.
Ejiri, et al.; A Process for Detecting Defects in Complicated Patterns; 1973, pp. 327–339.
Pavlidis, Theo; A Thinning Algorithm for Discrete Binary Images; Apr. 1979; pp. 142–157.
Arcelli, et al.; A Width-Independent Fast Thinning Algorithm Jul. 1985—pp. 463–474.
Hilditch, C. J.; Comparison of Thinking Algorithms on a Parallel Processor.
Tamura, Hideyuki; A Comparison of Line Thinning Algorithms from Digital Geometry Viewpoint—Nov. 1978—pp. 715–719.

*Primary Examiner*—David K. Moore
*Assistant Examiner*—David Fox
*Attorney, Agent, or Firm*—John D. Crane

[57] ABSTRACT

An image processing system including a plurality of sections disposed in an array. Under control of a control register, the function of a plurality of interconnected function generators is selected to process image data. By reason of the control register and the array structure, the number of different and unique image processing functions which can be produced is very large.

49 Claims, 48 Drawing Sheets

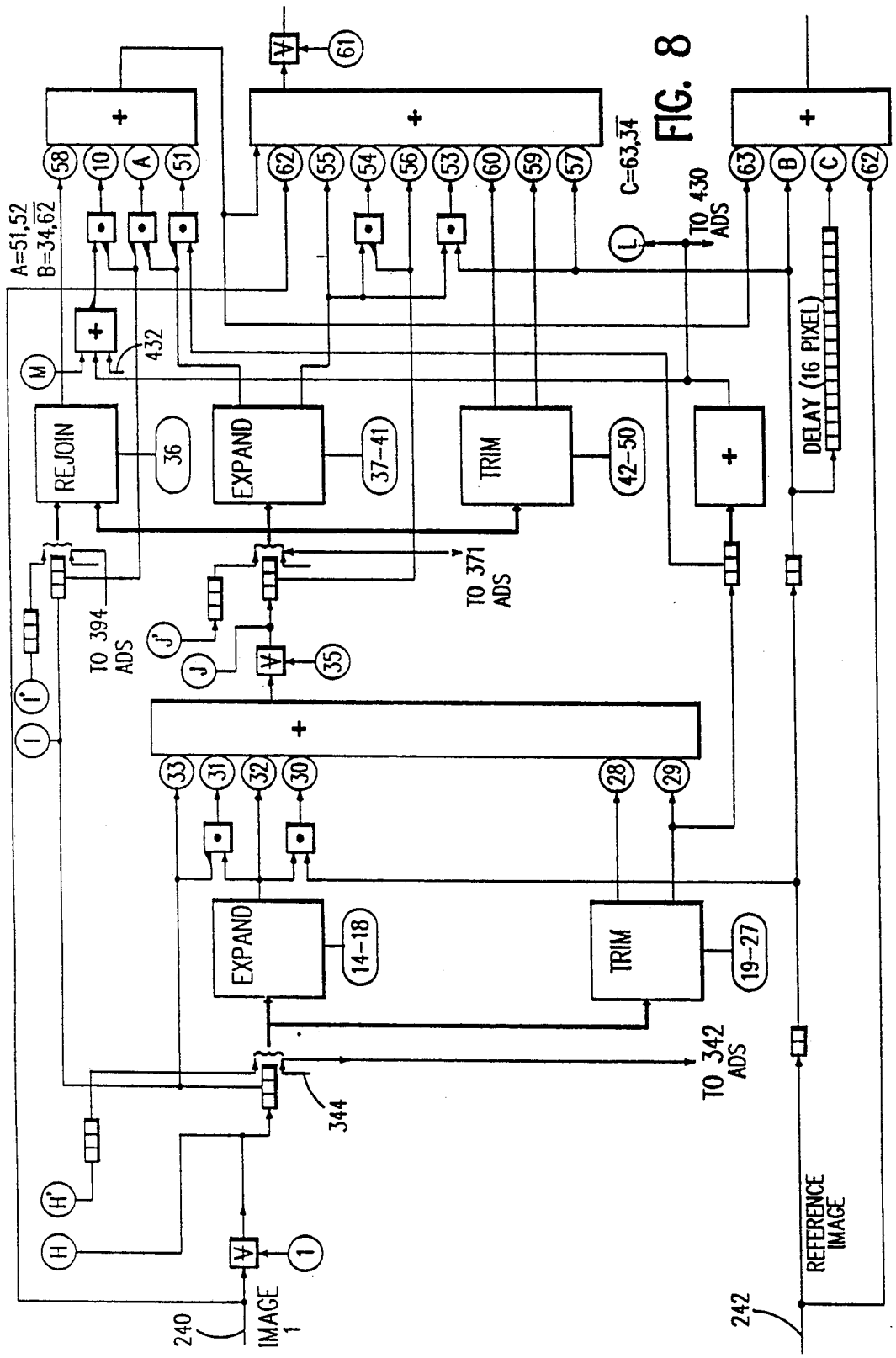

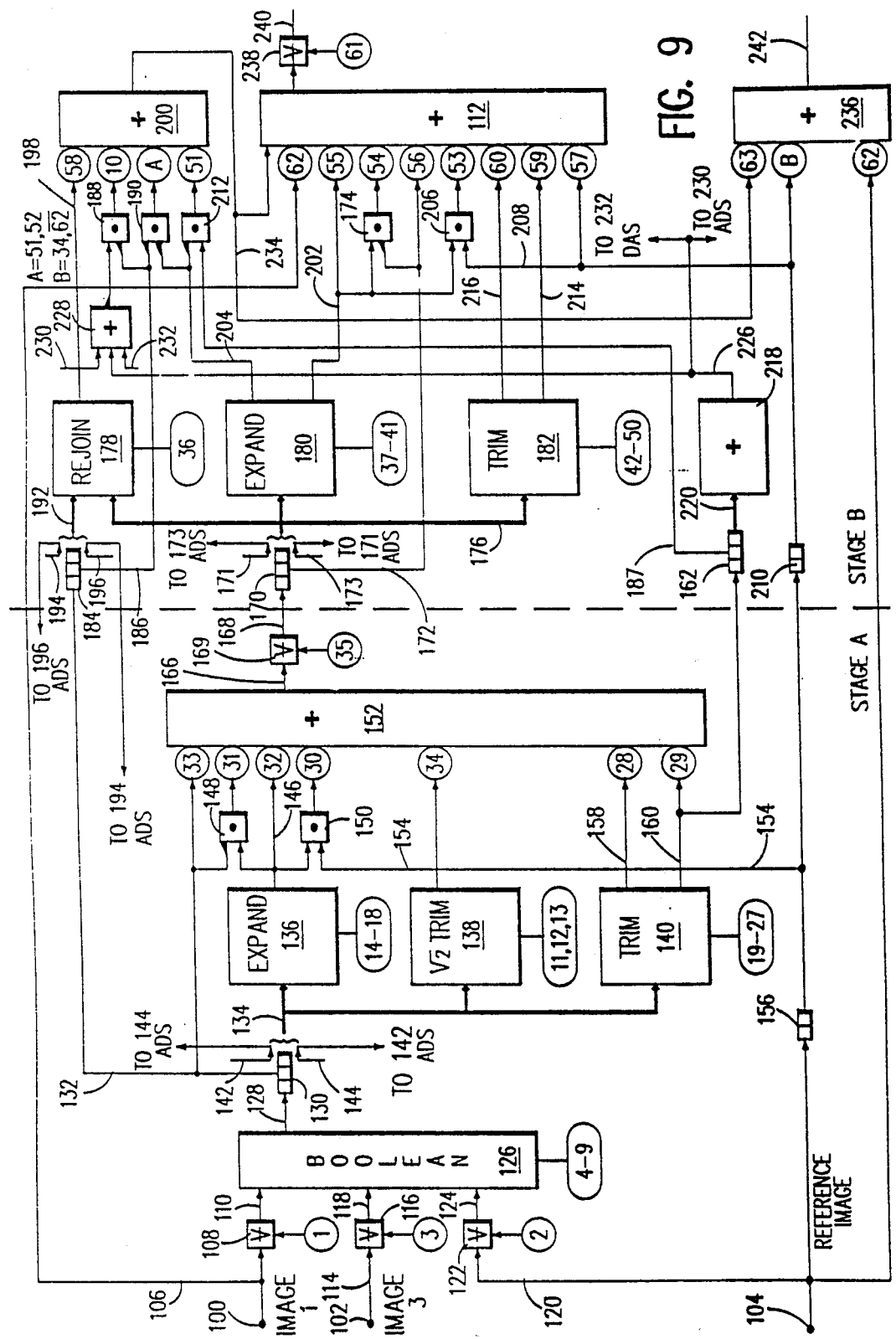

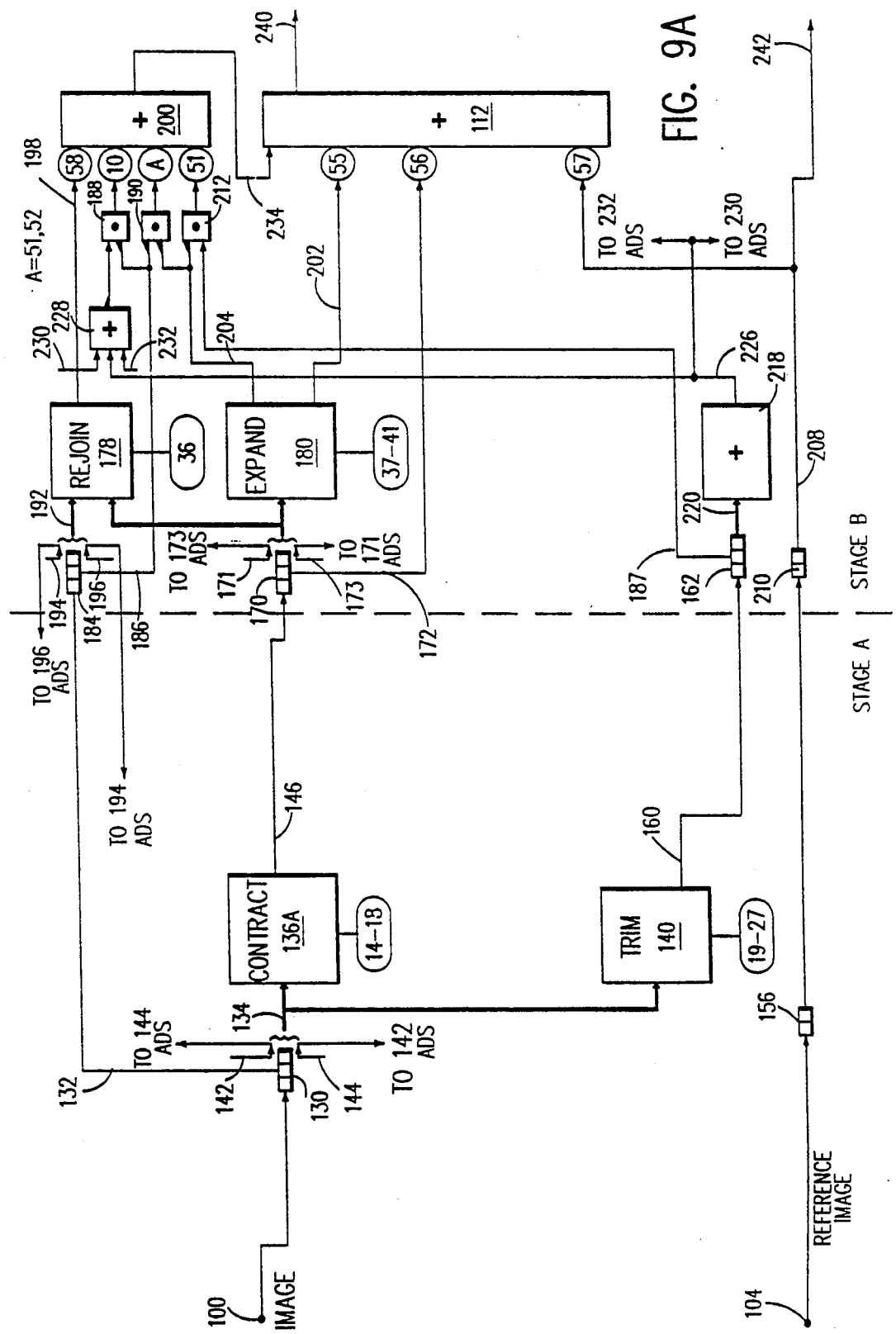

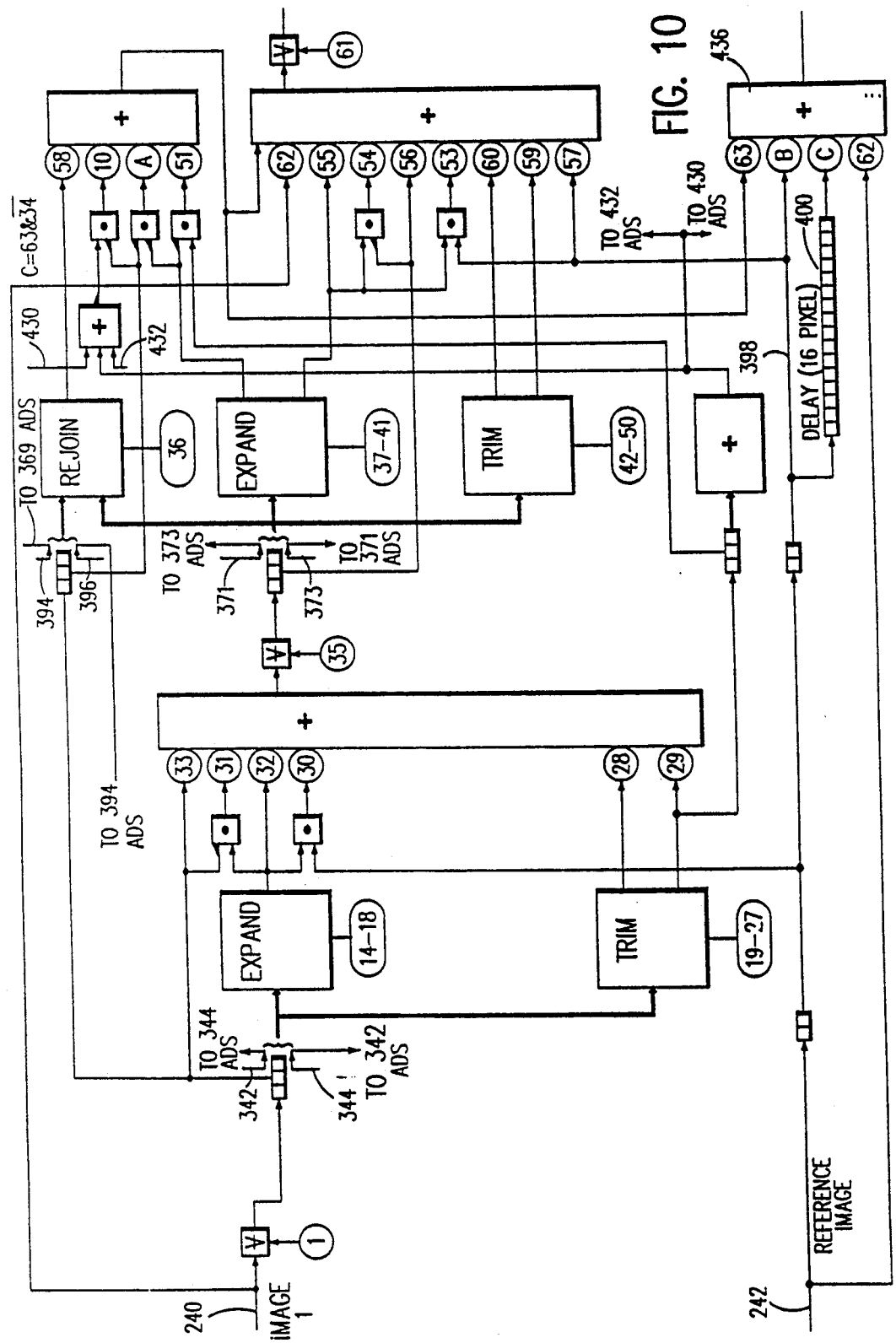

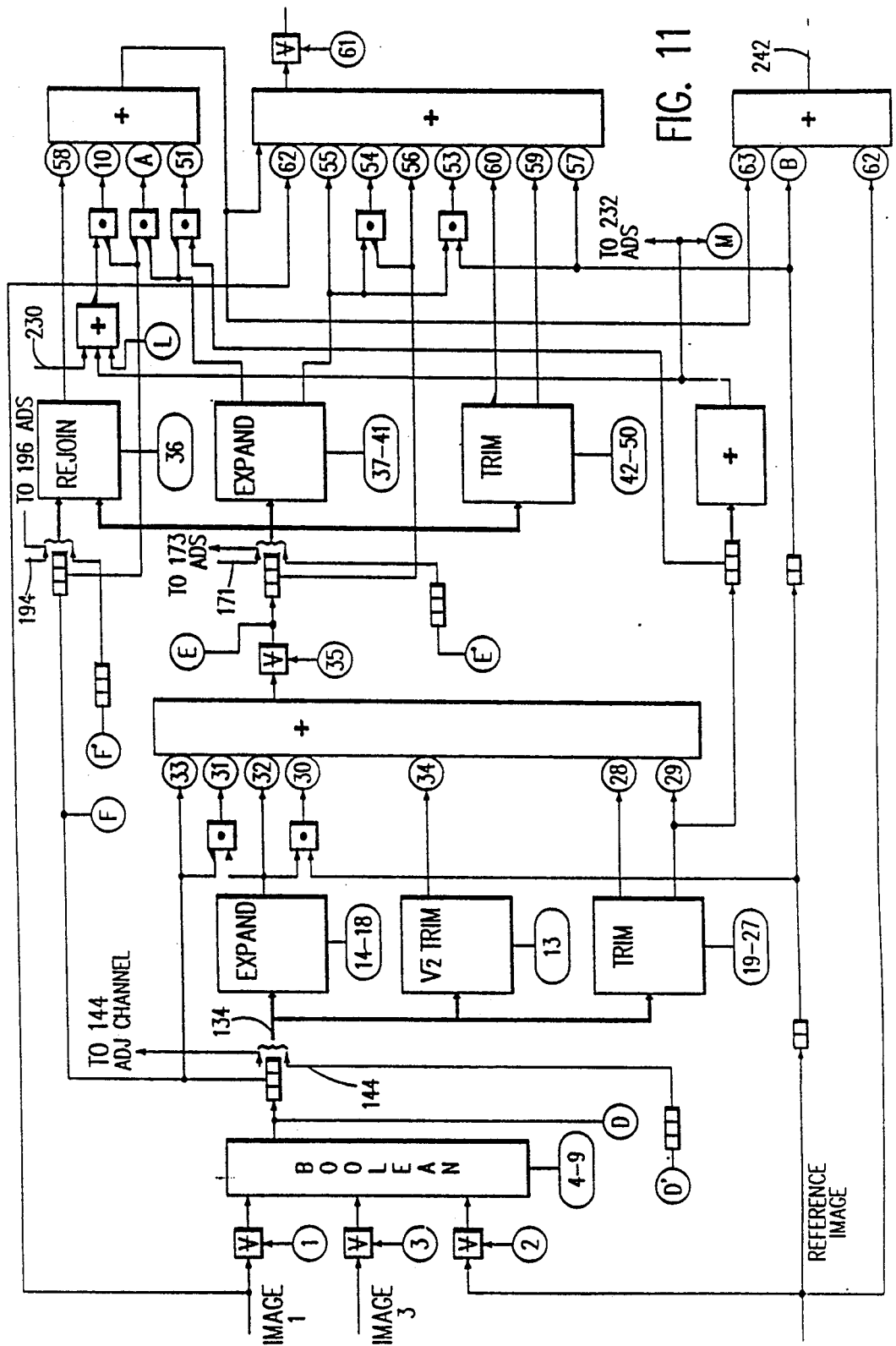

502 = $\bar{A} \cdot \bar{B} \cdot \bar{C}$
504 = $\bar{A} \cdot \bar{B} \cdot C$
506 = $\bar{A} \cdot B \cdot \bar{C}$
508 = $\bar{A} \cdot B \cdot C$
510 = $A \cdot \bar{B} \cdot \bar{C}$
512 = $A \cdot \bar{B} \cdot C$
514 = $A \cdot B \cdot \bar{C}$
516 = $A \cdot B \cdot C$

| CONTROL BITS | | | | | | FUNCTION PRODUCED AT 128 |
|---|---|---|---|---|---|---|
| 4 | 5 | 6 | 7 | 8 | 9 | |
| 0 | 0 | 0 | 0 | 0 | 1 | AB     (A AND B) |
| 0 | 0 | 0 | 0 | 1 | 0 | $\bar{A}\bar{B}$ |
| 0 | 0 | 0 | 0 | 1 | 1 | $\overline{A \forall B}$   ($\overline{A \text{ EXCLUSIVE OR } B}$) |
| 0 | 0 | 0 | 1 | 1 | 0 | $\bar{A}\bar{B}\bar{C}$ |
| 0 | 0 | 0 | 1 | 1 | 1 | $\bar{A}\bar{B}\bar{C}$ + AB   ($\bar{A}\bar{B}\bar{C}$ OR AB) |
| 0 | 0 | 1 | 0 | 0 | 0 | C |
| 0 | 0 | 1 | 0 | 0 | 1 | C + AB |
| 0 | 0 | 1 | 0 | 1 | 0 | C + $\bar{A}\bar{B}$ |
| 0 | 0 | 1 | 0 | 1 | 1 | C + ($\bar{A} \forall B$) |
| 0 | 1 | 0 | 0 | 0 | 0 | B |
| 0 | 1 | 0 | 0 | 1 | 0 | B + $\bar{A}$ |
| 0 | 1 | 0 | 1 | 1 | 0 | B + $\bar{A}\bar{C}$ |
| 0 | 1 | 1 | 0 | 0 | 0 | B + C |
| 0 | 1 | 1 | 0 | 1 | 1 | B + C + $\bar{A}$ |
| 1 | 0 | 0 | 0 | 0 | 0 | A |
| 1 | 0 | 0 | 0 | 1 | 0 | A + $\bar{B}$ |
| 1 | 0 | 0 | 1 | 1 | 0 | A + $\bar{B}\bar{C}$ |
| 1 | 0 | 1 | 0 | 0 | 0 | A + C |
| 1 | 0 | 1 | 0 | 1 | 0 | A + C + $\bar{B}$ |
| 1 | 1 | 0 | 0 | 0 | 0 | A + B |
| 1 | 1 | 0 | 1 | 1 | 0 | A + B + $\bar{C}$ |
| 1 | 1 | 1 | 0 | 0 | 0 | A + B + C |

|  | CONTROL BITS | | | | |
|---|---|---|---|---|---|
|  | 14 | 15 | 16 | 17 | 18 |
| EXP8 | 1 | 1 | 1 | 1 | 1 |
| EXP4 | 1 | 0 | 1 | 0 | 0 |
| EXP3A | 1 | 0 | 0 | 1 | 0 |
| EXP3B | 0 | 0 | 1 | 0 | 1 |
| EXP2A | 1 | 0 | 0 | 0 | 0 |
| EXP2B | 0 | 0 | 1 | 0 | 0 |

FIG. 19B

|  | CONTROL BITS | | | | |
|---|---|---|---|---|---|
|  | 37 | 38 | 39 | 40 | 41 |
| EXP8 | 1 | 1 | 1 | 1 | 1 |
| EXP4 | 1 | 0 | 1 | 0 | 0 |
| EXP3A | 1 | 0 | 0 | 1 | 0 |
| EXP3B | 0 | 0 | 1 | 0 | 1 |
| EXP2A | 1 | 0 | 0 | 0 | 0 |
| EXP2B | 0 | 0 | 1 | 0 | 0 |

FIG. 19C

|  |  |  |
|---|---|---|
| 0 | 1 |  |
| 1 | * | 0 |
|  | 0 | 0 |

(a)

|  |  |  |
|---|---|---|
|  | 1 | 0 |
| 0 | * | 1 |
| 0 | 0 |  |

(b)

|  |  |  |
|---|---|---|
| 1 | 1 | 1 |
|  | * |  |
| 0 | 0 | 0 |

(c)

|  |  |  |
|---|---|---|
| 1 |  | 0 |
| 1 | * | 0 |
| 1 |  | 0 |

| | CONTROL BITS | | | | |
|---|---|---|---|---|---|
| | 19 | 20 | 21 | 22 | 23 |
| CON 8 | 0 | 0 | 0 | 0 | 0 |
| CON 4 | 0 | 1 | 0 | 1 | 1 |
| CON 3A | 0 | 1 | 1 | 0 | 1 |
| CON 3B | 1 | 1 | 0 | 1 | 0 |
| CON 2A | 0 | 1 | 1 | 1 | 1 |
| CON 2B | 1 | 1 | 0 | 1 | 1 |
| | 1 | 1 | 1 | 1 | 1 |

FIG.49B

FULL CONTRACT CON 8

PIXEL IDENTIFICATION MAP

CROSS CONTRACT CON 4

THREE CONTRACT(A) CON 3A

THREE CONTRACT(B) CON 3B

TWO CONTRACT(A) CON 2A

TWO CONTRACT(B) CON 2B

FIG.50

| FIG.50A | FIG.50B |
|---|---|

A

1
Trim A

B
Con A

D
Rejoin B,1

C
Exp B

2
Trim 1

3
C-2

4
Exp 1

E
B+D+3

I
Rejoin E,F

F
Con B

5
Trim E

G
—
Exp F

H
G•5

J
F+I+H

7
Exp E

K
Con F

L
—
Exp K

UNIVERSAL IMAGE PROCESSING MODULE

BACKGROUND OF THE INVENTION

This invention relates to image processors for performing neighborhood transformation on matrices of data elements and more particularly, to a high speed image processor component containing a plurality of identical sections that operate simultaneously upon a plurality of adjacent raster sections of a single data matrix.

PRIOR ART

Serial vs Parallel Processing

Neighborhood processors are a class of devices that operate upon a first data array or matrix to generate a second data array or matrix wherein each element in the second data array has a value dependent upon the value of its equivalent element in the first data array and the values of its neighboring elements in the first data array.

U.S. Pat. No. 4,174,514, Nov. 13, 1979, by Stanley R. Sternberg, entitled "Parallel Partitioned Serial Neighborhood Processors" and its improvement U.S. Pat. No. 4,484,349, Nov. 20, 1984, by David L. McCubbrey, entitled "Parallel Pipeline Image Processor" disclose schemes for joining a plurality of serial neighborhood transformation processors such that a data image matrix can be sectioned vertically for faster processing. Those patents cite and discuss other prior art.

Specifically, they cite a completely parallel array neighborhood processor disclosed in U.S. Pat. No. 3,106,698 to Unger. They cite serial array processors disclosed in U.S. Pat. No. 3,339,179 to Shelton and U.S. Pat. No. 4,167,728 to Sternberg and U.S. Pat. No. 4,290,049 to Sternberg et al., and U.S. Pat. No. 3,805,035 to Serra.

In the IEEE Transactions on Computers (Dec. 1973) page 1075 Bjorn Kruse discussed a proposed parallel picture processing machine. This machine consists of 2-dimensional array of combinatorial logic modules which operate on the states of the individual picture neighborhoods simultaneously. Each neighborhood matching logic function matched its neighborhood sequentially with templates from a neighborhood template list. The object of the proposal was to reduce the amount of picture data that would subsequently be processed by a general purpose computer.

The advantage of a parallel array processor is speed. Its disadvantage is that each element of the matrix is represented by a relatively complex neighborhood transformation device. When the matrices become very large, the cost of such a processor is prohibitive.

The advantage of a serial array processor is a minimum of neighborhood transformation devices. Its disadvantage is that for large matrices, the computation time can become prohibitively long, precluding many real time applications.

The prior art focuses on paralleling a limited set of serial array processors sufficient to accomplish the matrix transformation in a reasonable amount of time. The problems encountered were the integration of the individual serial processors in an integrated circuit chip. Serial array processors employ stage line delay memories which contain long rasters of sections of the image. Large images require large stage line delay memories, which can consume large areas of a chip, or with repartitioning, increases the number of interconnections between chips. In either case the design effort is frustrated.

The partial solutions to these problems as disclosed in the Sternberg and McCubbrey inventions are to section the matrices into vertical sections and individually employ specially configured serial array processors on each section. That special configuration concerns itself with the bidirectional transfer of selected pixels in adjacent matrix sections to the opposing serial array processors. The solutions found in these inventions employ some means of stage line delay memories which continue to frustrate image processor designers as they are required to design higher speed neighborhood processors which must operate on larger and larger image arrays.

Neighborhood Transformation Logic

U.S. Pat. No. 3,214,574, Oct. 26, 1965, by R. M. Landsman et al., entitled "Apparatus for Counting Bi-Nucleate Lymphocytes in Blood" discloses a neighbor transformation scheme which uses fixed combinatorial logic called cluster logic which operates on not only a $3 \times 3$ neighborhood but also on four elements of a $3 \times 3$ transformed neighborhood.

Masakazu Ejiri, in Computer Graphics and Image Processing (1973) 2, page 335 discloses a fixed combinatorial logic called a small portion detection circuit which operates on a $7 \times 7$ neighborhood.

U.S. Pat. No. 3,846,754, Nov. 5, 1974, by Mitsunori Oka et al., entitled "Pattern Pre-Processing Apparatus" discloses a neighborhood transformation scheme which uses fixed combinatorial logic called thinning units which operates on not only a $3 \times 3$ neighborhood but also on an extended row and column forming a $4 \times 4$ neighborhood.

U.S. Pat. No. 4,003,024, Jan. 11, 1977, by John P. Riganati, entitled "Two-Dimensional Binary Data Enhancement System" discloses an improved system for enhancing two-dimensional binary data. The two-dimensional binary data is applied to one or more cascaded enhancement stages. In a preferred embodiment, the enhancement in any given stage is achieved by determining whether or not the central data bit or signal from a $3 \times 3$ bit window in a matrix should be changed as a function of the pattern of the eight other bits in that window which surround the central bit. It discloses that those eight bits in the window are used to address a read only memory (ROM) to cause it to provide a decision bit having a stored binary state for each of 256 addresses is being applied. Each ROM may store different preselected bits in its 256 address locations, depending upon the enhancement desired.

U.S. Pat. No. 4,167,728, Sep. 11, 1979, by Stanley Sternberg, entitled "Automatic Image Processor", while claiming a programmable processor which operates upon a matrix array of multibit state values, discloses the use of writable random access memory (RAM) as the means for performing neighborhood transformations.

The efforts since 1965, have been to minimize the neighborhood transformation logic for both fixed and programmable image processors. The difficulty occurs when attempting to provide a flexible programmable device which operates on neighborhoods larger than $3 \times 3$. Despite the industry providing larger and faster memories in cheaper and smaller packages, it is always the image processor designer's task to optimize the amount of function within the package by minimizing the essential logic.

Image Thinning Algorithms and Apparatus

U.S. Pat. No. 3,339,179, Aug. 29, 1967, by G. L. Shelton, Jr., et al., entitled "Pattern Recognition Preprocessing Techniques", shows that a numerical distance transform of a binary figure could be obtained whose local maxima defined a skeleton. Shelton's idea has been enlarged by others and named it the "medial axis transform". Medial axis transforms do not guarantee a connected skeleton. The neighborhood size is a 3×3 plus four elements from the neighborhood of the immediate transformed image. The connectivity functions are a limited set and are embodied in fixed combinatorial logic.

The parallel picture processing machine (PPM) is described by Bjorn Kruse in December 1973 (IEEE Transactions on Computers, Vol. C22, No. 12, pp. 1075-87) as having sets of sequentially applied 3×3 templates which change the state of the image. Like Unger and others, his thinning templates require removal of the central pixel when three adjacent neighborhood pixels are zero but require testing the subsequent states to reestablish double pixel images. The sequence of templates can be changed to generate non-symmetrical single pixel skeletons, to account for a thinning idiosyncrasy (peepholes), to generate shrinking skeletons, and to perform other functions.

U.K. Patent 1,487,920, Oct. 5, 1977, by Peter Saraga et al., entitled "Character thinning Apparatus" discloses a 5×5 cross neighborhood transformation circuit which employs a 3×3 neighborhood ROM in its preferred embodiment, for the purpose of generating a one pixel wide line skeleton for printed character recognition.

Hideyuki Tamura, in a paper entitled "A Comparison of Line Thinning Algorithms from Digital Geometry Viewpoint", November 1978, Proceedings of the Fourth International Joint Conference on Pattern Recognition, compared the thinning algorithms of Rutovitz, Hilditch, Deutsch, and Yokoi with his own.

Theo Pavlidis in his paper entitled "A Thinning Algorithm for Discrete Binary Images", Computer graphics and image processing (1980) discusses thinning algorithms for use on a conventional sequential computer which are conservant of processing time through their contour tracing modes. The proposed algorithm produces skeletons that lack symmetry.

J. Mandeville in an IBM Research Report "Novel Method for Automated Optional Inspection of Printed Circuits", March 1983 discussed a thinning sequence of a set of four steps employing 3×3 templates, as a means of avoiding loss of connectivity.

Hilditch, in a paper entitled "Comparison of Thinning Algorithms on a Parallel Processor", August 1983, compared a number of parallel algorithms for thinning elongated shapes on a CLIP-4 parallel processor. Arcelli's algorithm, extensions to it, border parallel masking algorithm, the crossing number thinning algorithm, border parallel crossing number algorithm, and distance transform algorithms were studied.

Carlo Arcelli and Gabriella Sanniti di Baja in 1985 in their paper "A Width-Independent Fast Thinning Algorithm" disclosed a thinning algorithm, for use on conventional sequential computers, which avoids the computational complexity of the majority of algorithms which are linearly proportional to the size of the picture times the maximal width of the figures to be thinned. That algorithm, using distance transformation techniques followed by branch pruning, yields a skeleton which is symmetrical and retains its shape and topology.

This prior art illustrates the differences and difficulties in providing a suitable skeleton useful in image processing. It is known and shown that the production of skeletons is a time consuming or costly activity. Conventional sequential computers with appropriate algorithms provide the ability to limit the operations upon an image matrix to elements productive of transformation thus omitting operation on those not yielding a productive transformation. This is not the fortune of elements in an image array produced by a raster scanning device and immediately or nearly so processed by the transformation devices. That is to say contour tracing is not possible in such raster scanning modes.

The prior art recognizes that symmetrical skeletons are valuable in that they are capable of reconstruction to nearly the original image.

The image processing tasks can include processing vast raster scanned image fields which contain wide lines or features which must be timewise and costwise economically skeletonized.

BRIEF DESCRIPTION OF THE INVENTION

A universal image processing module (UIM) exemplary of this invention is an LSI device which is used in an array to perform image processing on image data received from an optical inspection system. Each UIM includes a plurality of paired sections identified as a front or upstream section and a rear or downstream section. The upstream section receives image data bits from a data source which may be another UIM. The upstream and the downstream section can each selectively perform one of a plurality of morphological functions including image thinning, image shrinking, image expansion, image contraction, edge detection, image trimming, partial image summation and other functions. The upstream section can perform, in addition, a class of boolean functions and a special function for changing pixels on a 45 degree angle to the direction of image scanning. The downstream section, in addition, can perform a delay function. A plurality UIMs are typically configured in an array to process image pixels according to a programmable sequence of functions to be performed on the image.

OBJECTS OF THE INVENTION

One object of this invention is to provide a device that operates on multiple adjacent rasters of an image matrix.

Another object of this invention is to provide a device that is concatenatable with itself to form multiple stages of image processing capability.

A further object of this invention is to provide a device that is capable of being connected in parallel with itself to satisfy larger sets of multiple adjacent raster images.

A still further object of this invention is to provide a device that provides an efficient family of image skeletonization functions.

A still further object of this invention is to provide an efficient family of image dilation, erosion, trimming and boolean functions.

A still further object of this invention is to provide a device that is independent of stage delay memory requirements.

A still further object of this invention is to provide a device that is programmable.

A still further object of this invention is to provide a device that is cost effective.

The above mentioned and other objects of the present invention are achieved by the circuit of the present invention which is described below in connection with the drawings which form a part of the disclosure wherein:

FIG. 9A illustrates an alternative image processing section to that of FIG. 9 and forms the basis of a reduced image processing section that can be utilized to replace those sections illustrated in FIGS. 7-12

FIG. 17 illustrates some of the functions performable by the circuitry of FIG. 16;

FIG. 18 illustrates the functions of the expansion unit;

FIG. 19B illustrates the control bits used to control one expansion unit;

FIG. 19C illustrates the control bits used to control the second expansion unit;

FIG. 20 illustrates the functions performed by the square root of two trim unit;

FIGS. 24-27 illustrate the function of the logic of FIG. 22;

FIGS. 28-31 illustrate the function of the logic of FIG. 23;

FIG. 33 illustrates the input bit designations for the circuit of FIG. 32;

FIGS. 34-36 illustrate the functions produced by the rejoin unit of FIG. 32;

Figure 41:
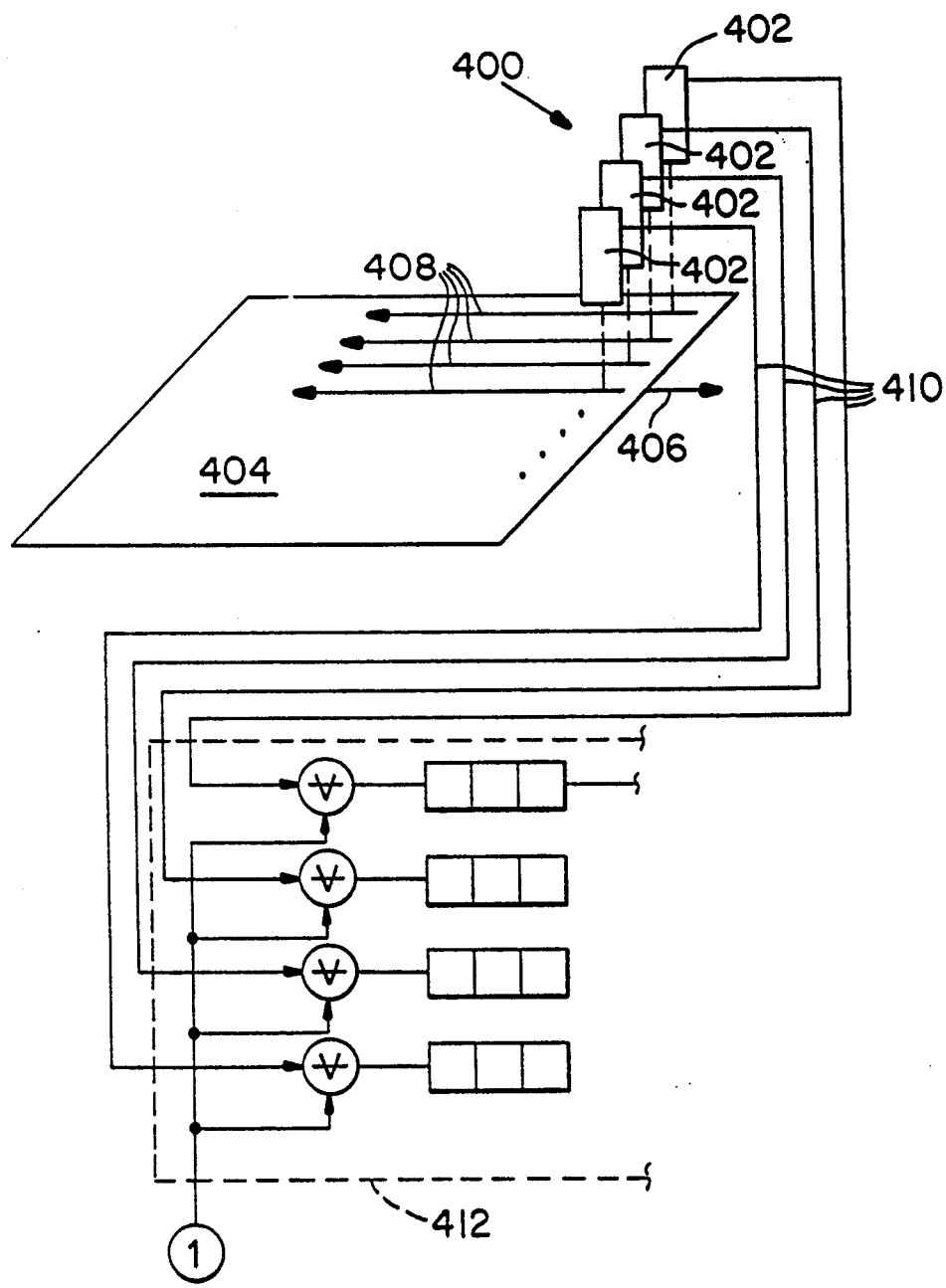
Figure 42:
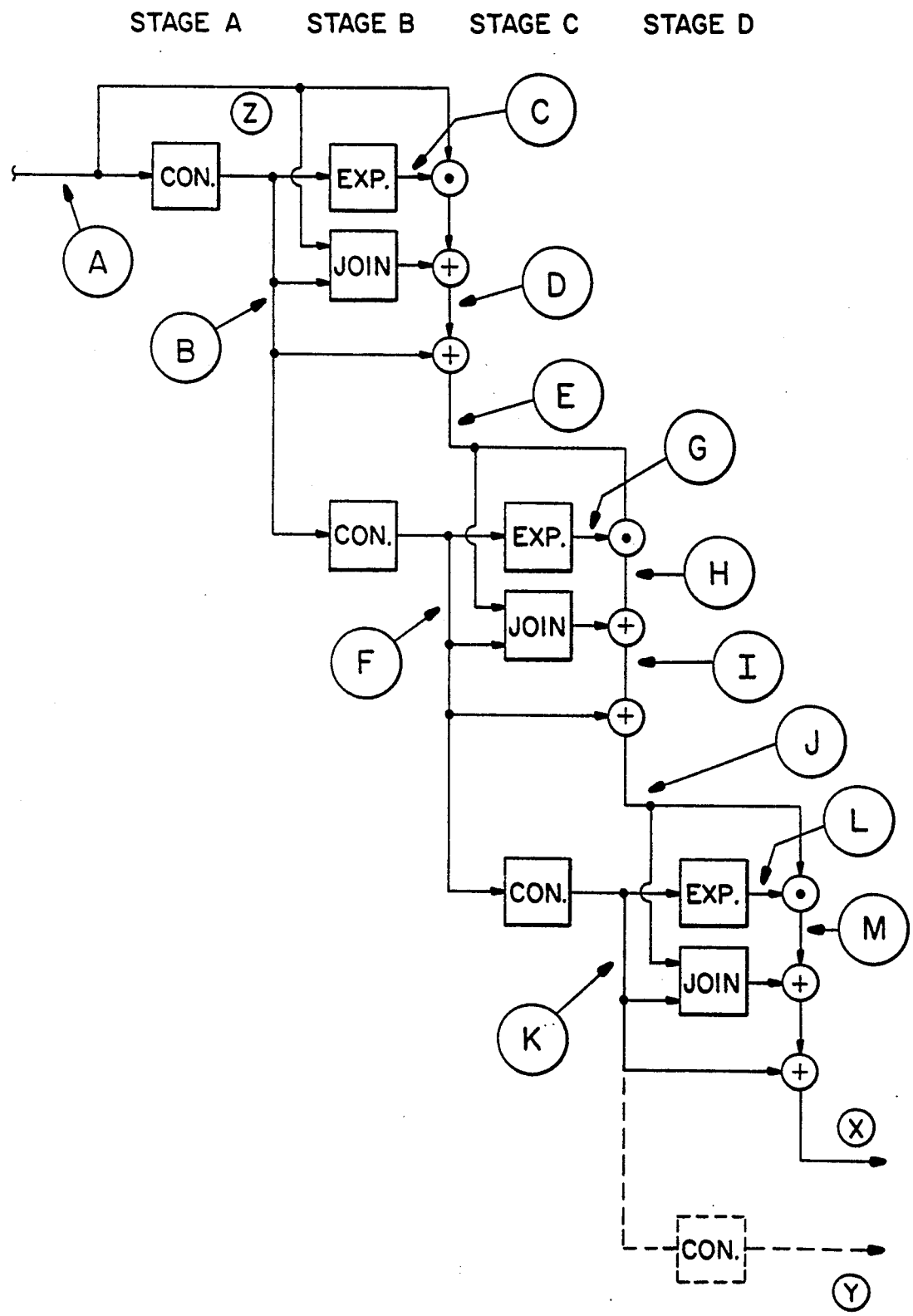
Figure 43:
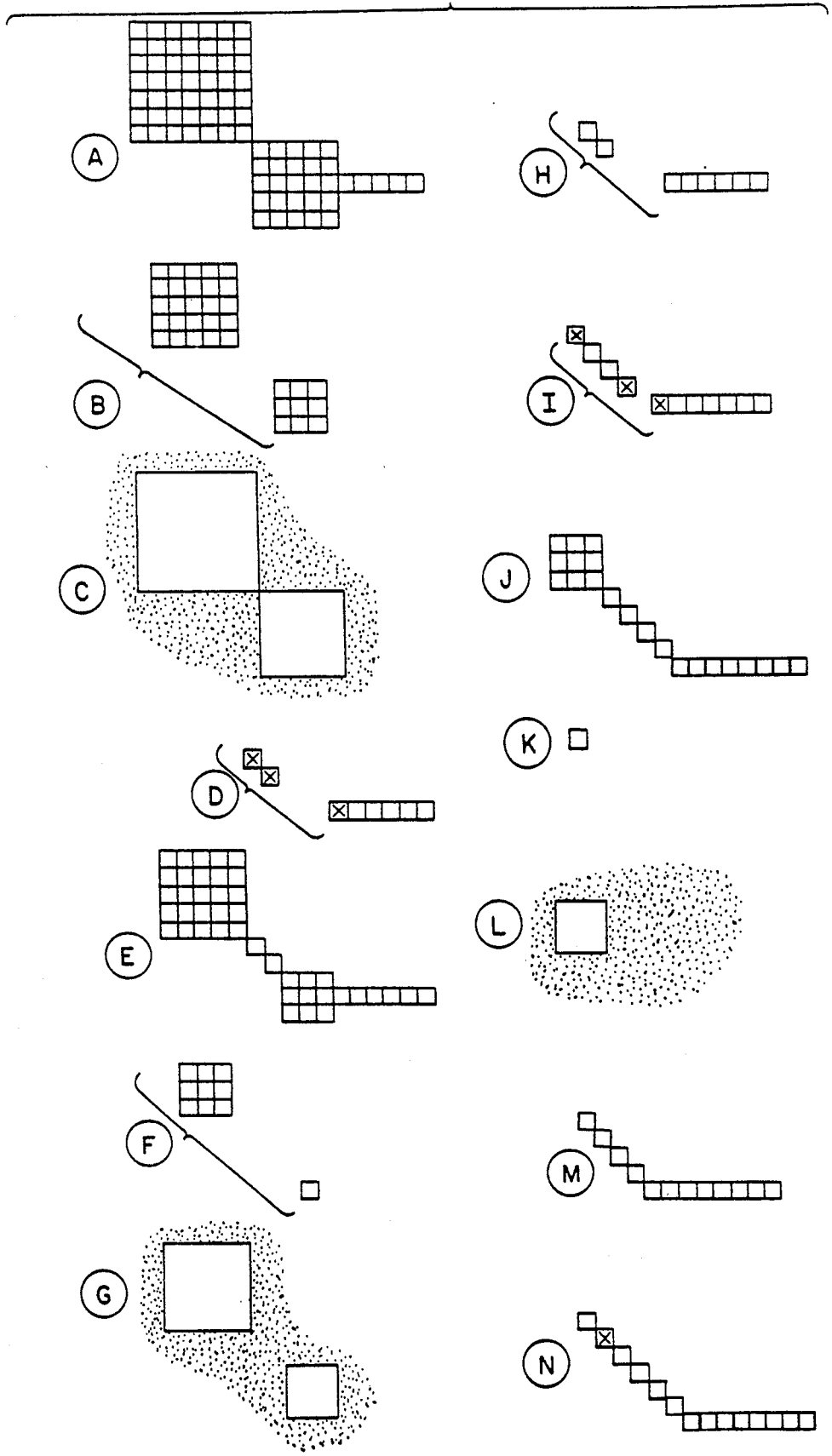
Figure 44:
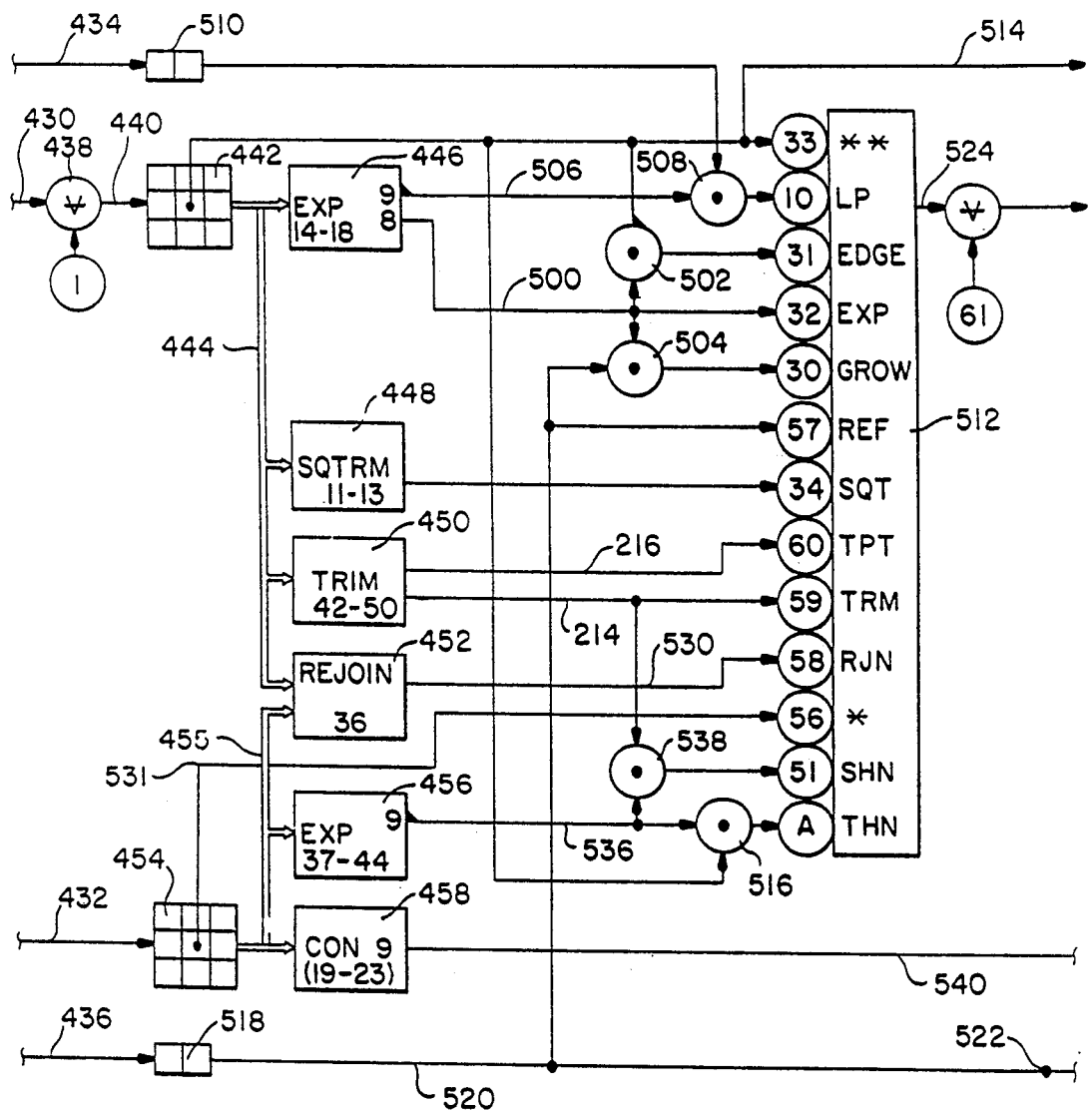
Figure 45:
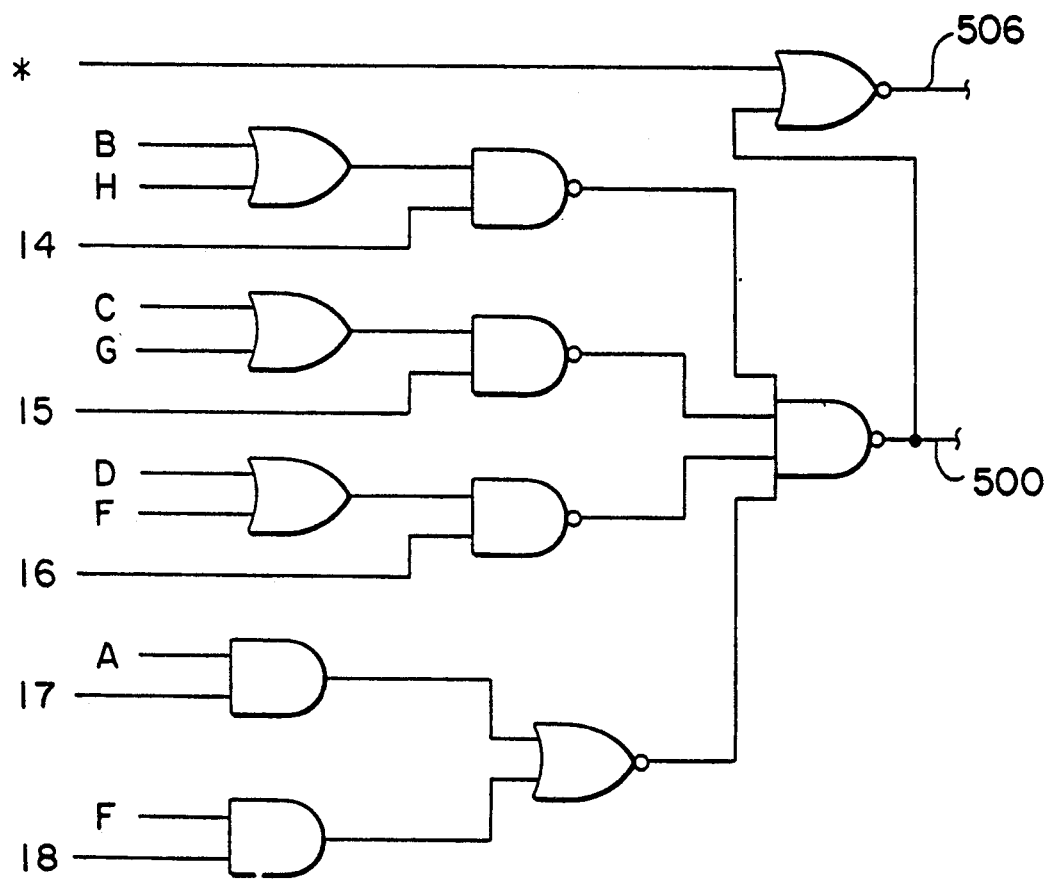
Figure 46:
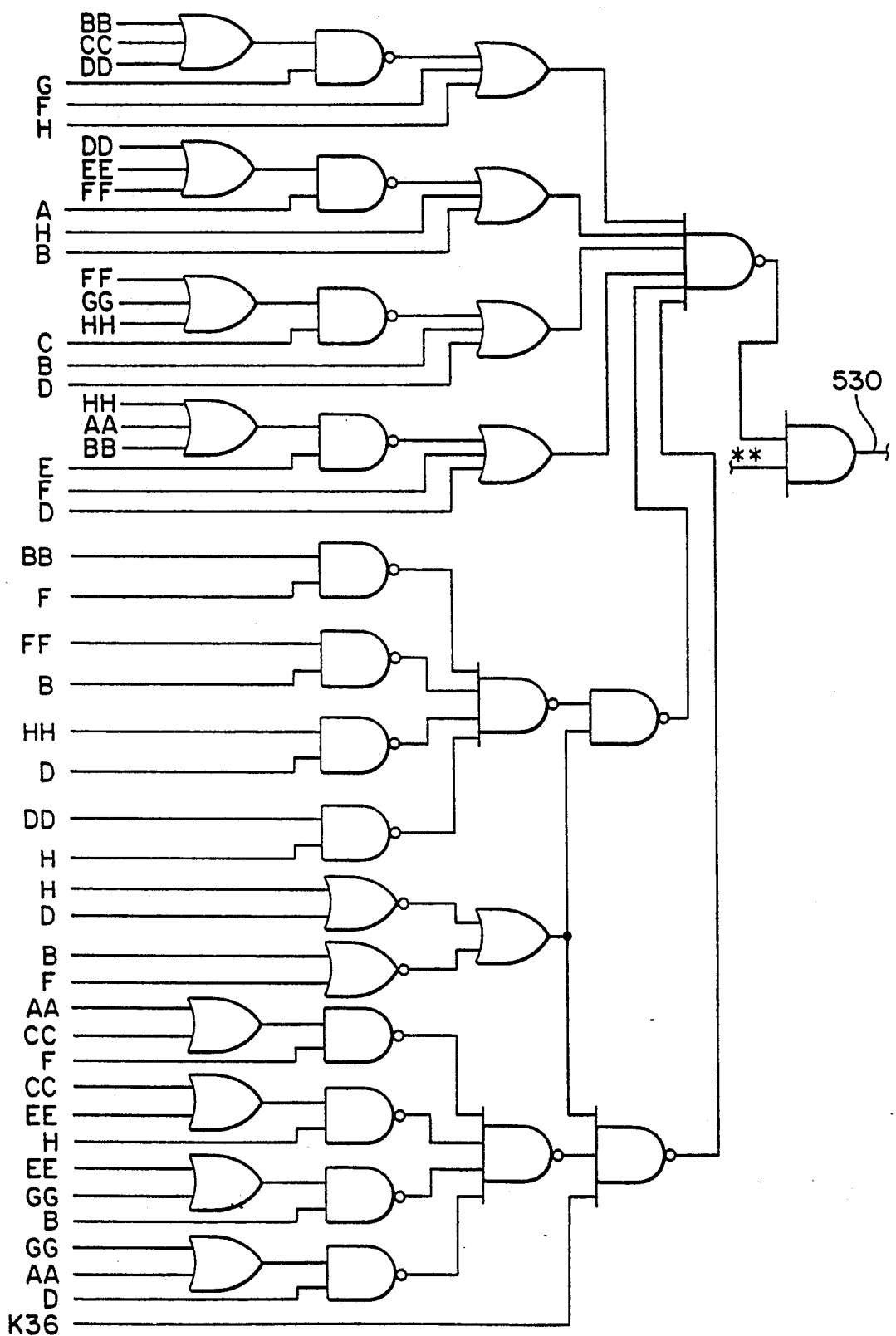
Figure 47:
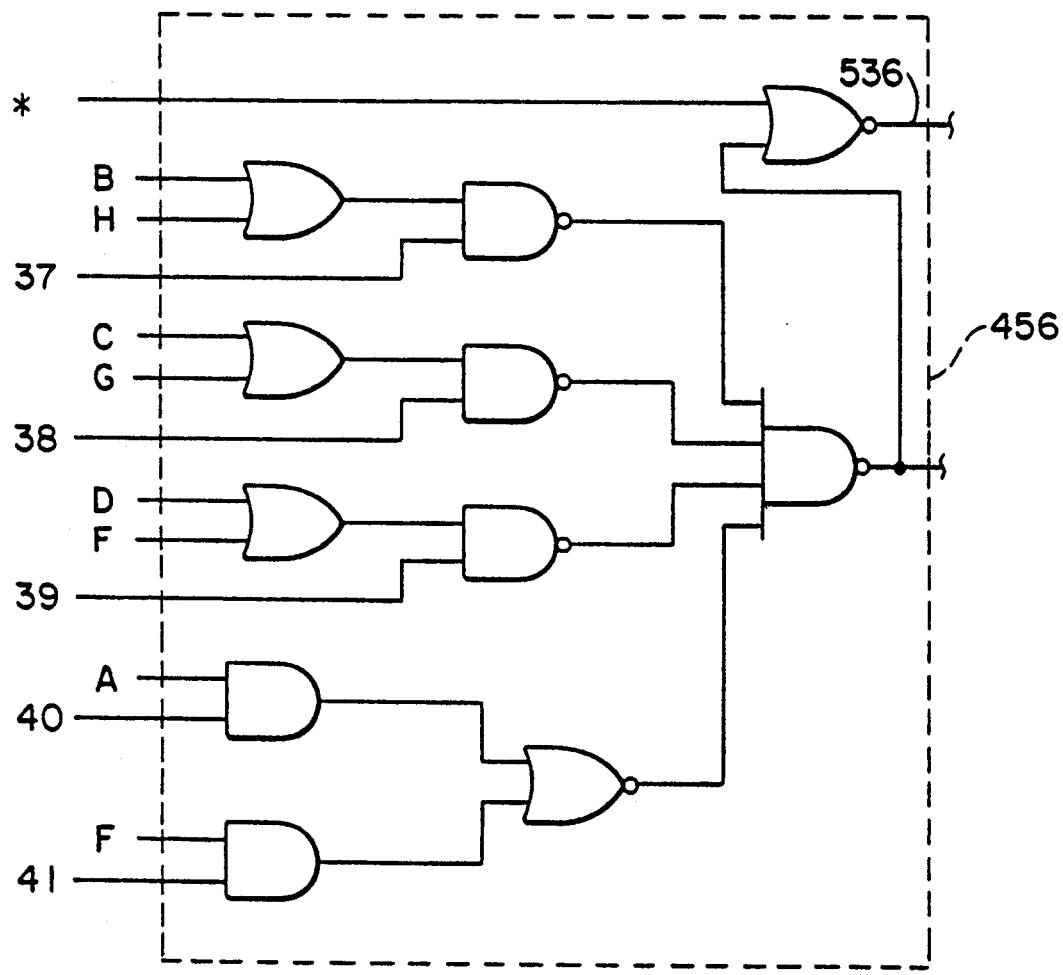
Figure 48B:
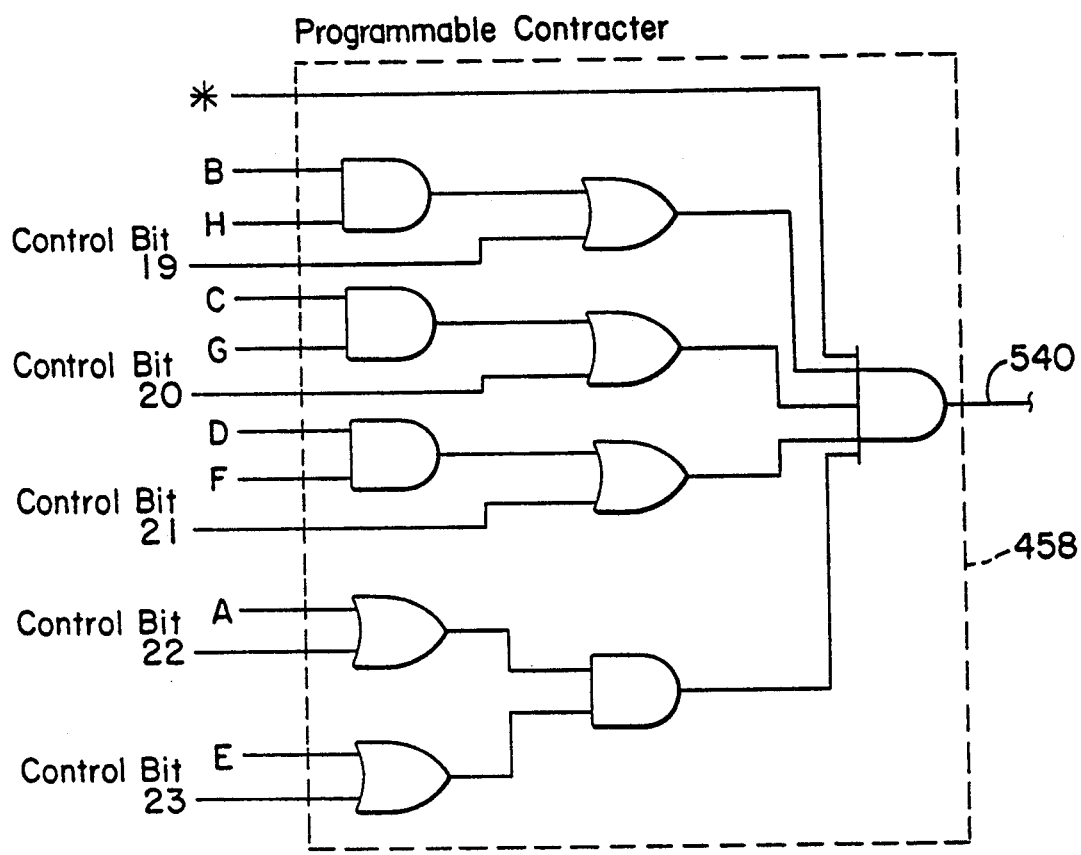
Figure 48A:
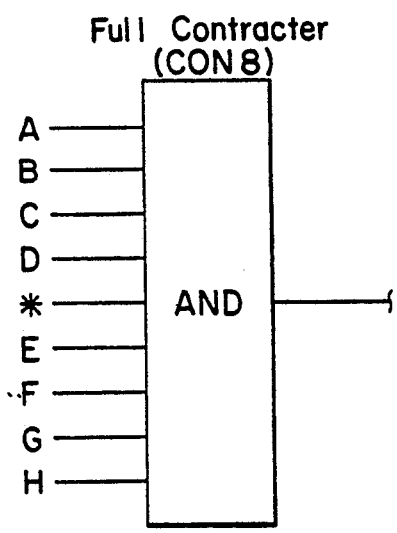
Figure 50A:
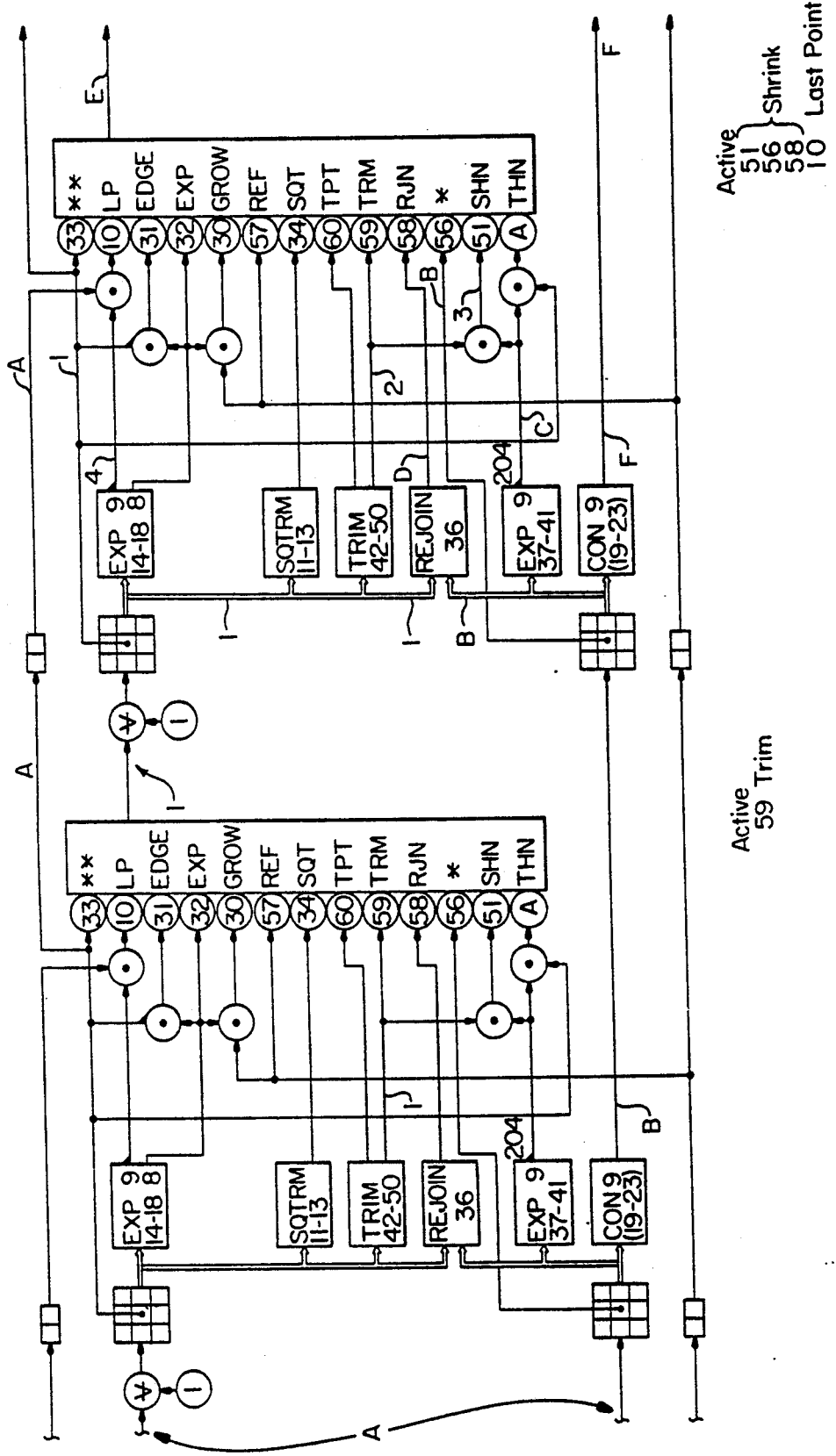
Figure 50B:
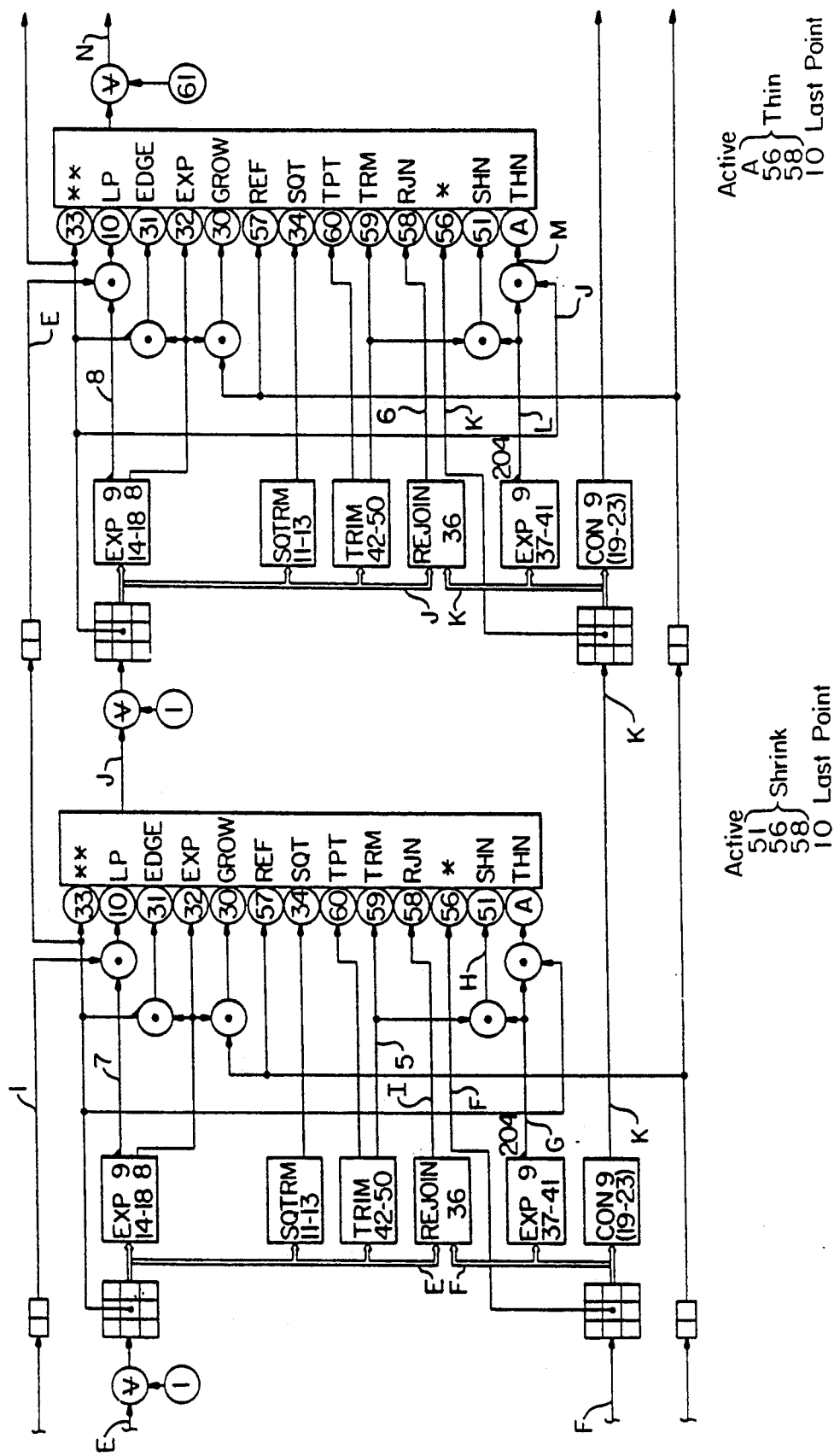
Figure 51A:
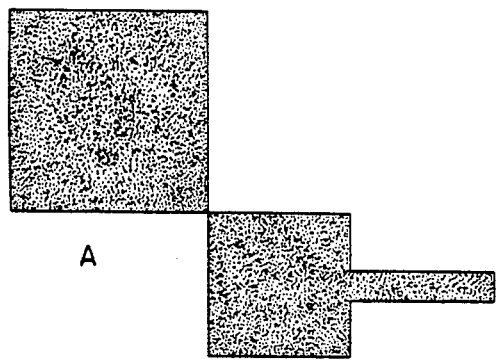
Figure 51B:
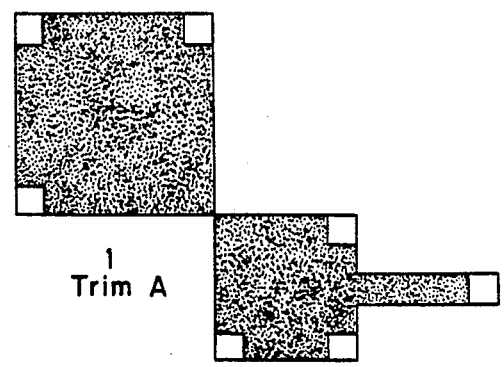
Figure 51C:
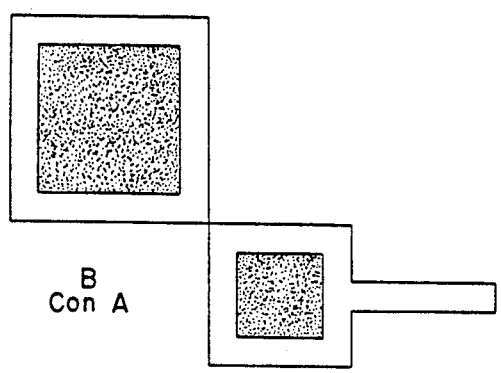
Figure 51D:
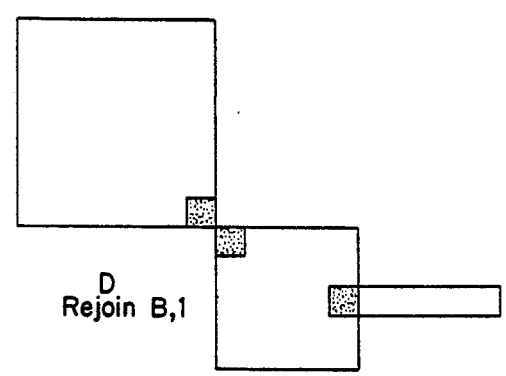
Figure 51E:
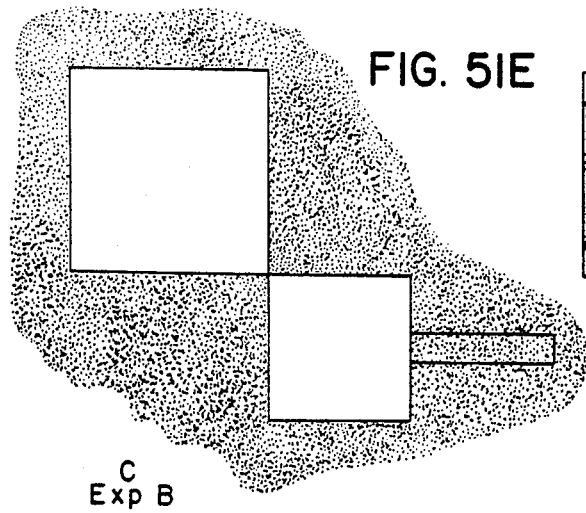
Figure 51F:
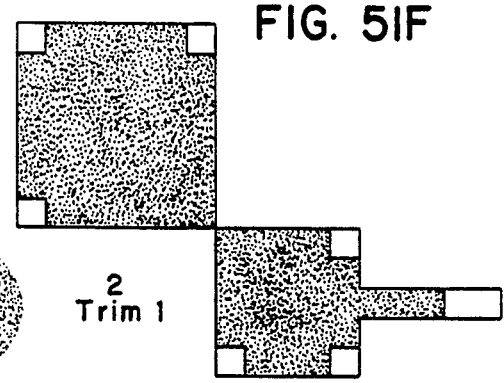
Figure 51G:
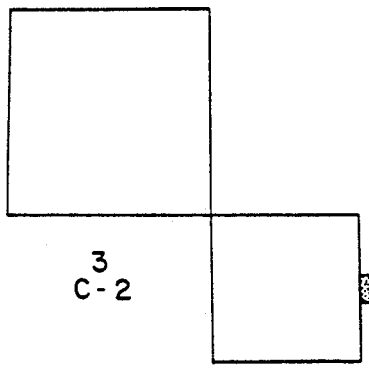
Figure 51H:
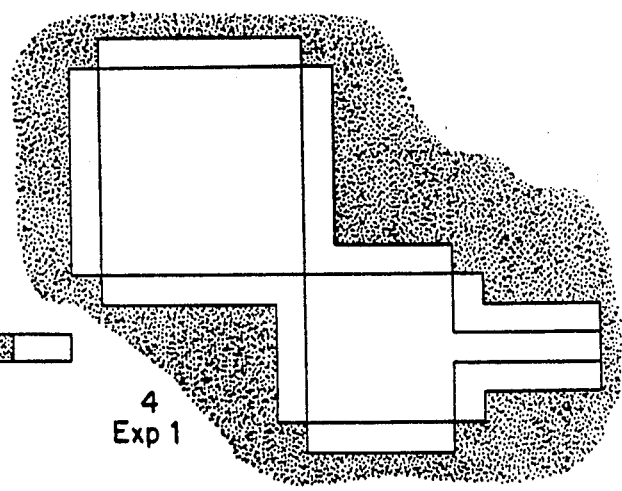
Figure 51I:
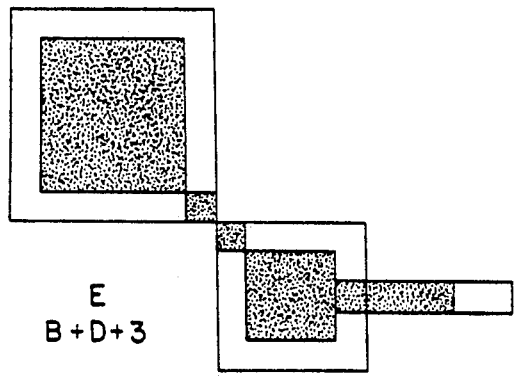
Figure 51J:
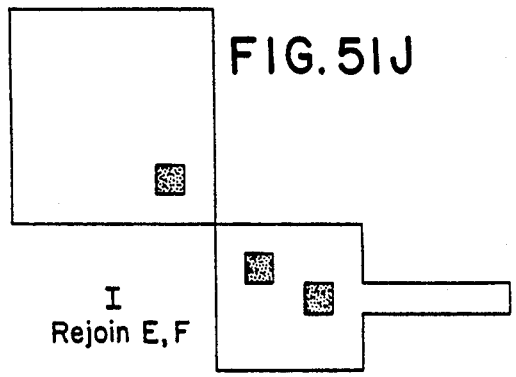
Figure 51K:
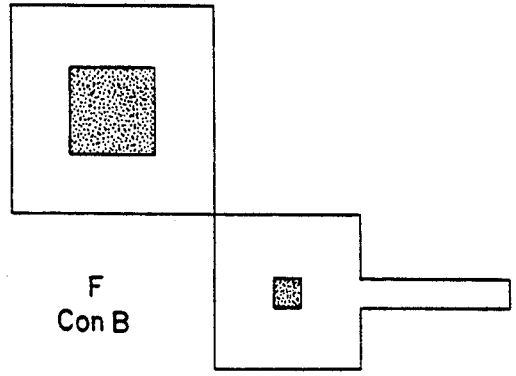
Figure 51L:
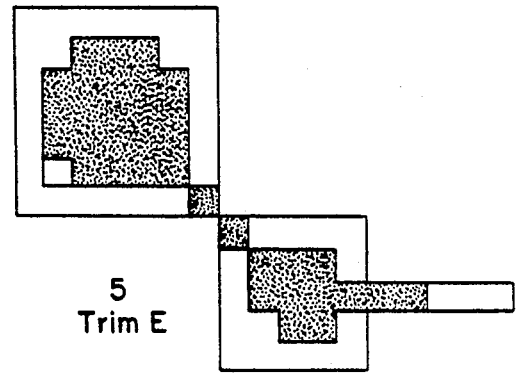
Figure 51M:
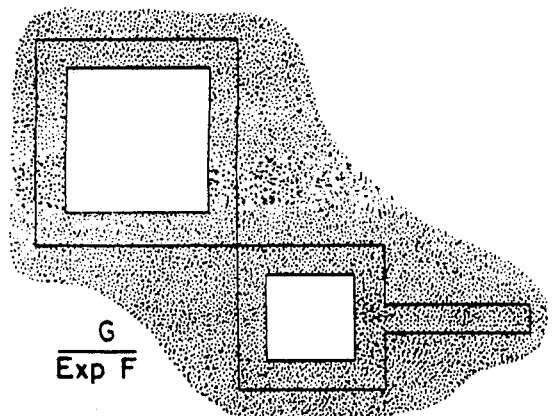
Figure 51N:
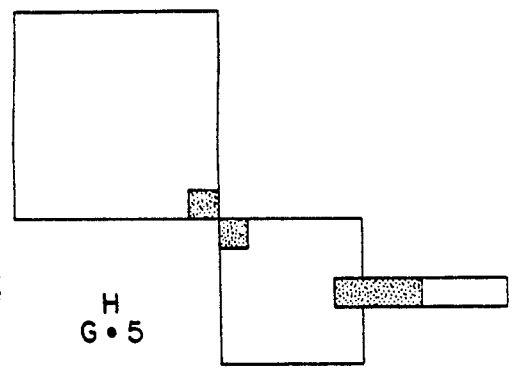
Figure 51O:
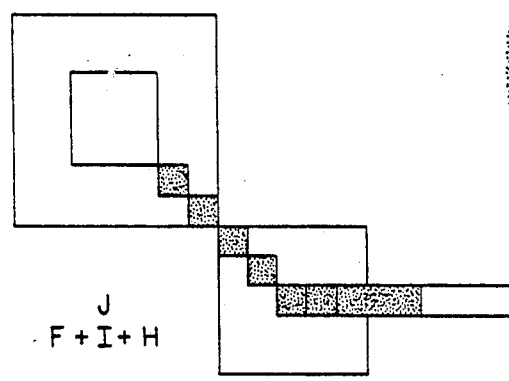
Figure 51P:
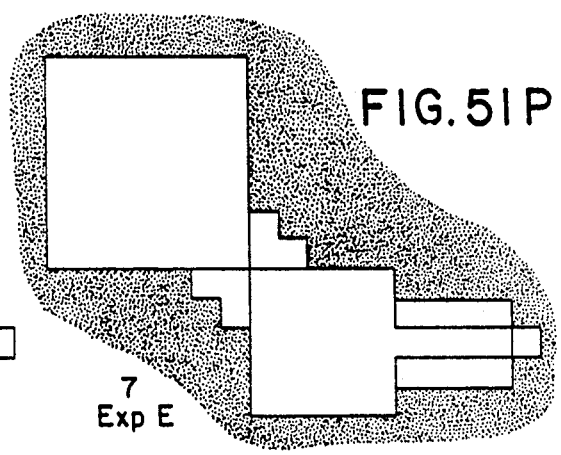
Figure 51Q:
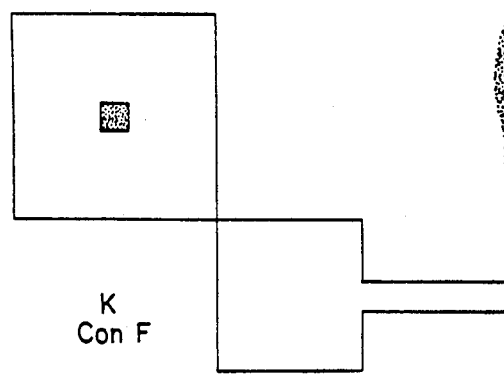
Figure 51R:
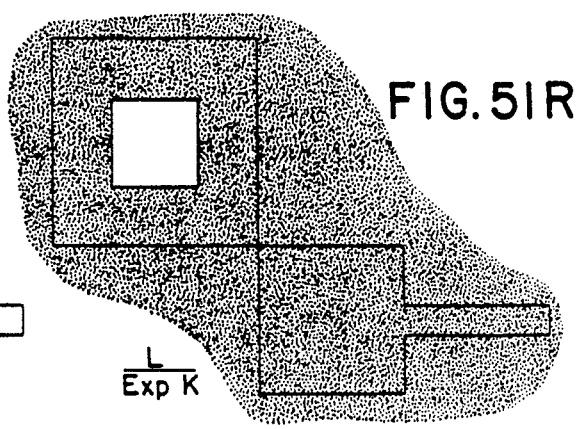
Figure 51S:
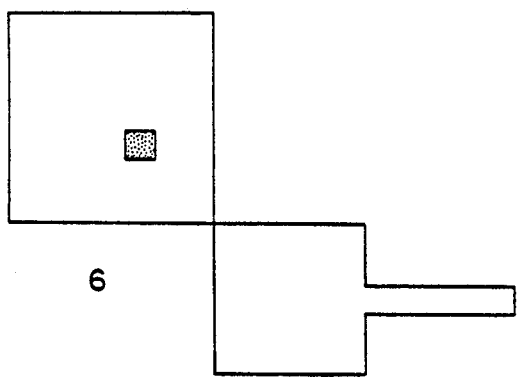
Figure 51T:
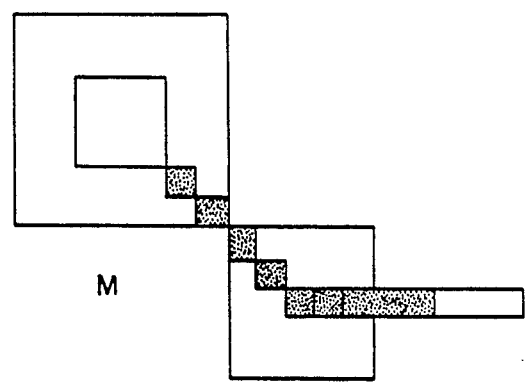
Figure 51V:
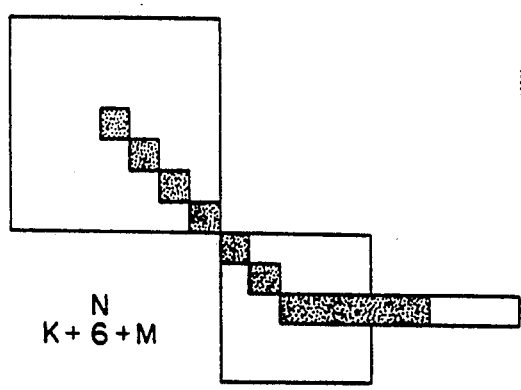
Figure 51U:
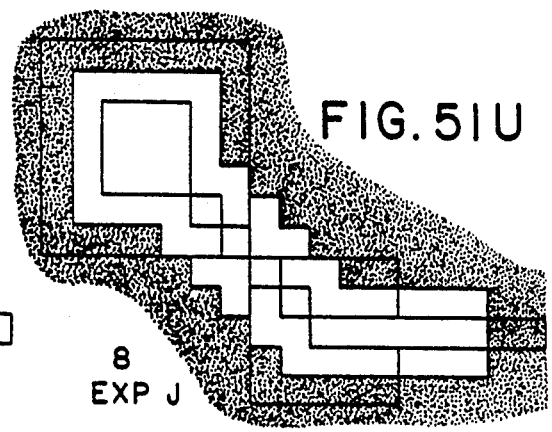

FIG. 41 schematically illustrates a scanning mechanism useful in producing raster scanned pulse streams representative of the value of light reflected from a work piece or the like being inspected;

FIGS. 42 illustrate an alternative configuration of the image processing module of the present invention which is particularly desirable because it is comprised of a plurality of stages which are easily concatenated;

FIG. 43 illustrates how the configuration of FIG. 42 performs a thinning operation;

FIG. 44 illustrates an alternative image processing stage which is particularly designed to be concatenated with other identical stages;

FIG. 45 illustrates an expander circuit which is utilized in the image processing stage of FIG. 44;

FIG. 46 illustrates a rejoin circuit which is utilized in the image processing stage of FIG. 44;

FIG. 47 illustrates a second expander which is utilized in the image processing stage of FIG. 44;

FIGS. 48A and 48B respectively illustrate a single function full contracter and a programmable contracter which can be utilized in the image processing stage of FIG. 44;

FIG. 49A shows the control codes required to cause the programmable contractor to perform the listed contraction functions which are illustrated in FIG. 49B;

FIG. 50 illustrates the manner in which FIGS. 50A and 50B fit together to form a composite figure;

FIGS. 50A and 50B illustrate the manner in which a plurality of image processing stages of FIG. 44 are concatenated together and are operated to perform a shrink function; and FIGS. 51A-51V illustrate the images at the different identified positions in FIGS. 50A and 50B when a shrink operation is performed on the original image illustrated in FIG. 51A to yield the shrunk image of FIG. 51U.

DETAILED DESCRIPTION

Figure 1:
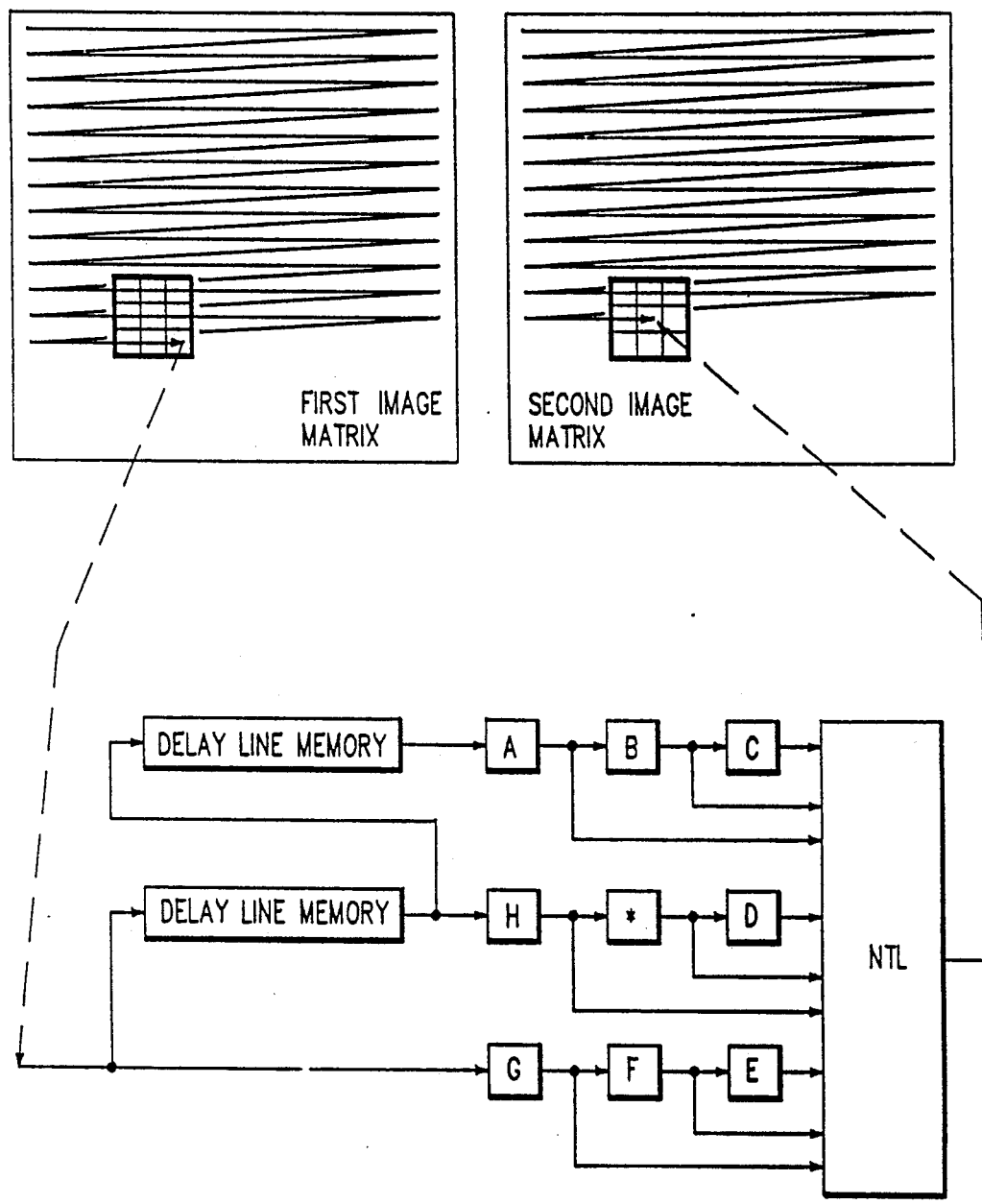
FIG. 1 illustrates a single stage neighborhood processor known in the prior art.

FIG. 1 illustrates a prior art single stage neighborhood processor which is in a class of devices that operate upon a first data matrix to generate a second matrix wherein each element has a value dependent upon the value of its equivalent element in the first matrix and the values of its neighboring elements in the first matrix.

A 3×3 neighborhood window of storage elements is supplied with binary values scanned from the first image and with binary values stored in digital delay line memories containing all the binary image data from the two previous raster scans. The binary length of the delay memories is sufficient to provide a spatial relationship within the 3×3 window that matches a 3×3 neighborhood of pixels in the matrix.

The neighborhood transformation logic (NTL) function operates on the data in the window to provide a resultant binary value which is stored in the center pixel of the neighborhood of the second matrix. The NTL in the prior art can be of several forms. Typically, it can be a read only memory (ROM) for fixed functions, a random access memory (RAM) for programmable functions, or minimized fixed combinatorial logic. For the nine input variables available from a 3×3 window, there are 512 input combinations to a truth table describing the canonical function output. There are $2^{512}$ or $1.34 \times 10^{154}$ possible functions that are capable of being implemented. However, the number of functions actually employed in the prior art image processing are relatively limited.

Typically, the NTL is a RAM which employs a 4 bit row address decoder which drives 16 row lines of the 512 bit memory matrix. 32 sense lines from the memory matrix are multiplexed by a 5 bit column address decoder to cause one of matrix memory bits to appear on the output. The memory matrix is written with the data on the input which is directed by the row and column address lines. A programmable read only memory (ROM) matrix is written by an external device and a ROM matrix is written during manufacture.

Figure 2:
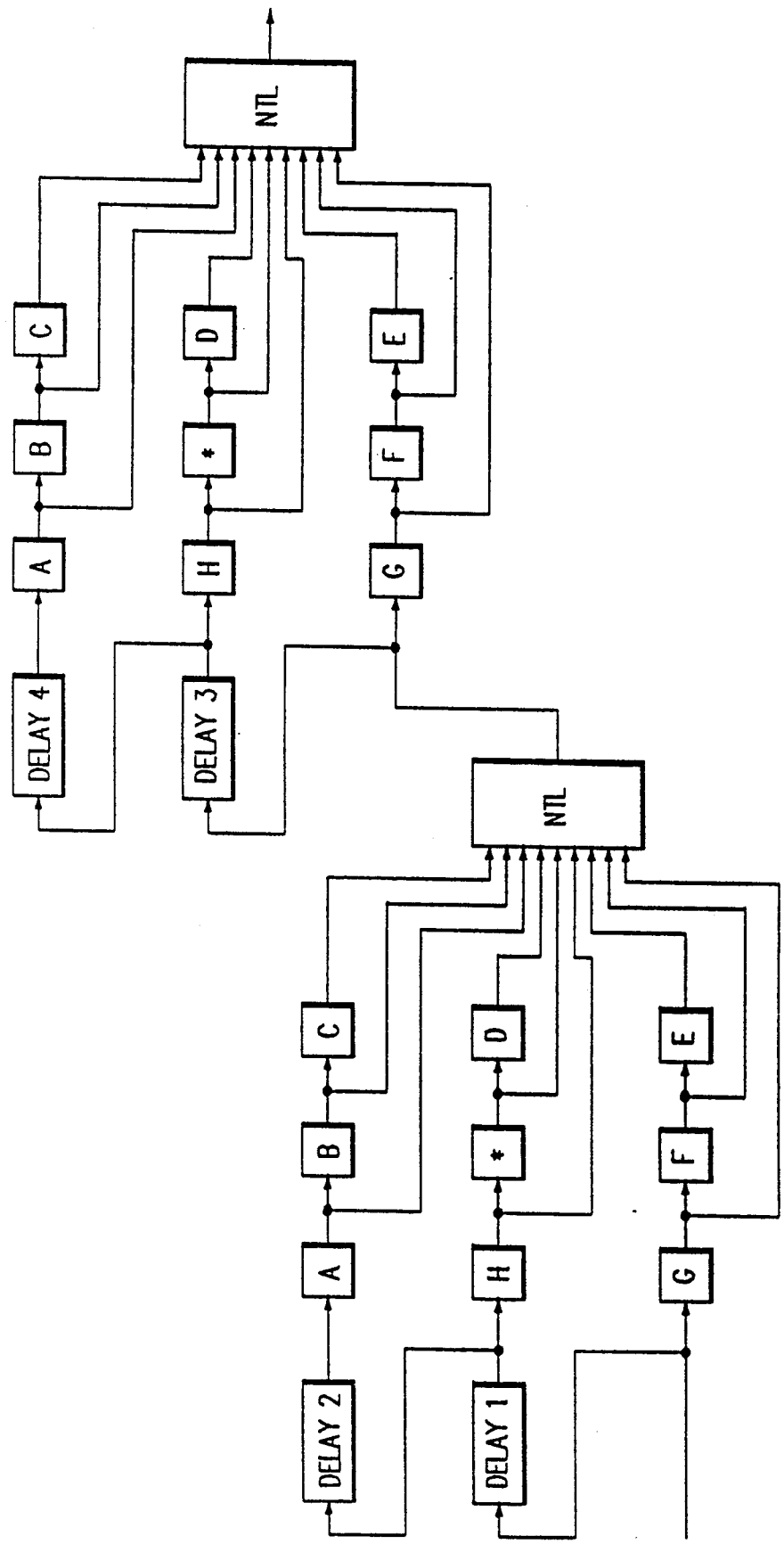
FIG. 2 illustrates a single raster advance serial pipeline of neighborhood processors known in the prior art.

FIG. 2 illustrates the typical prior art arrangement of a single raster advance serial pipeline of neighborhood processors. The stage delay line memories exist in each stage to contain the partial results of the image computation.

Figure 3:
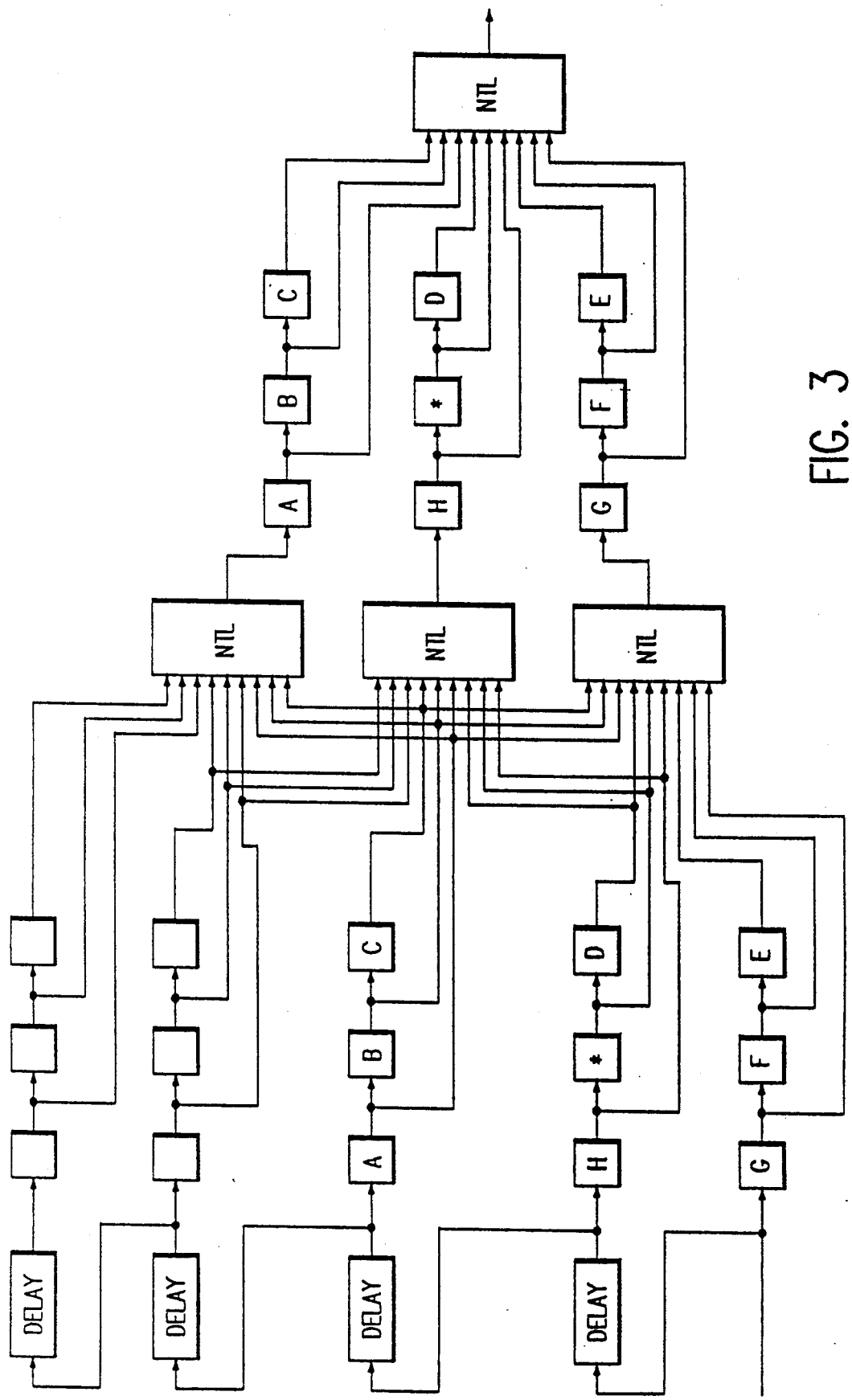
FIG. 3 illustrates the method for eliminating memory requirements for the second stage of a pipeline of neighborhood processors.

FIG. 3 illustrates the method by which the stage delay memories can be eliminated from the second processor. The contents of the eliminated memories are replaced by the direct output of additional NTLs placed in the first processor. Obviously, these additional NTLs require windows and memories which are driven by a single raster advance memory source. The effect of doing this circuit modification is to eliminate stage delay line memories in the downstream processors and place them upstream. The cost of this modification is two additional NTLs and two matrix element rows. It can be argued that this cost can more than adequately be offset by having a processor independently interfaceable with any appropriate size memory as opposed to having to design a specific size or oversize memory built into the processor.

Figure 4A:
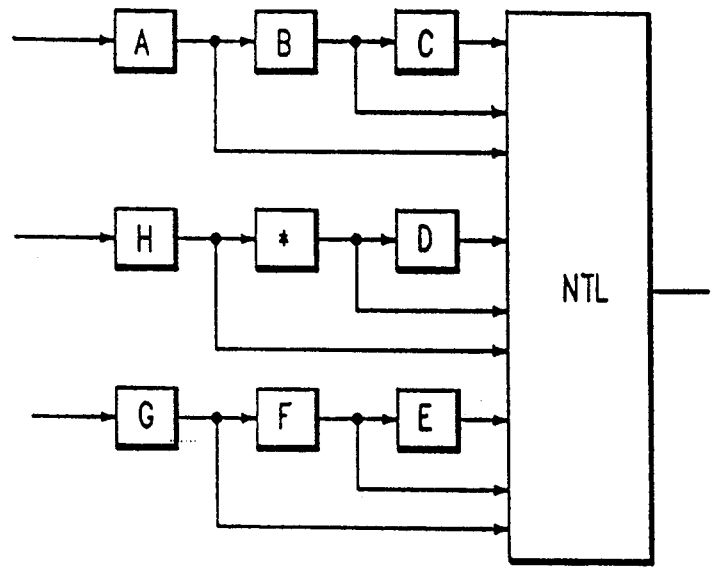
FIG. 4A is a block diagram of the basic building blocks of a neighborhood transformation logic device.

FIG. 4A illustrates the basic building block NTL and window.

Figure 4B:
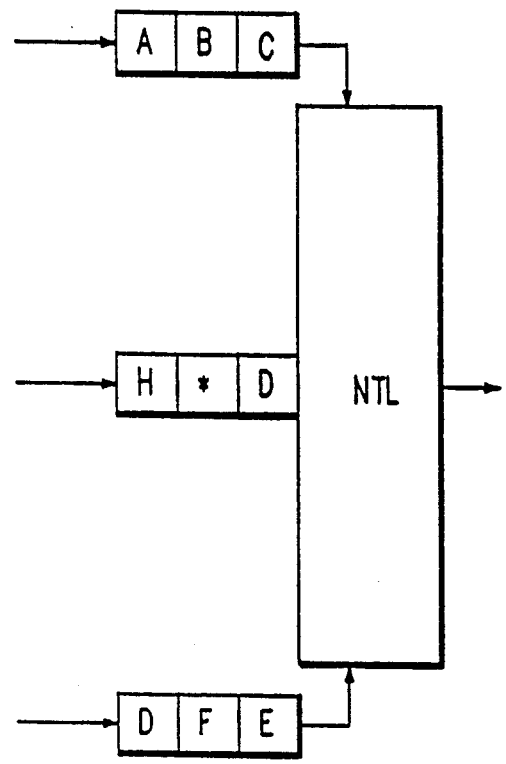
FIG. 4B illustrates the symbol used in the drawings to represent a device shown in FIG. 4A.

FIG. 4B illustrates how the logic of FIG. 4A is hereinafter represented in order to simplify the drawings.

Figure 5:
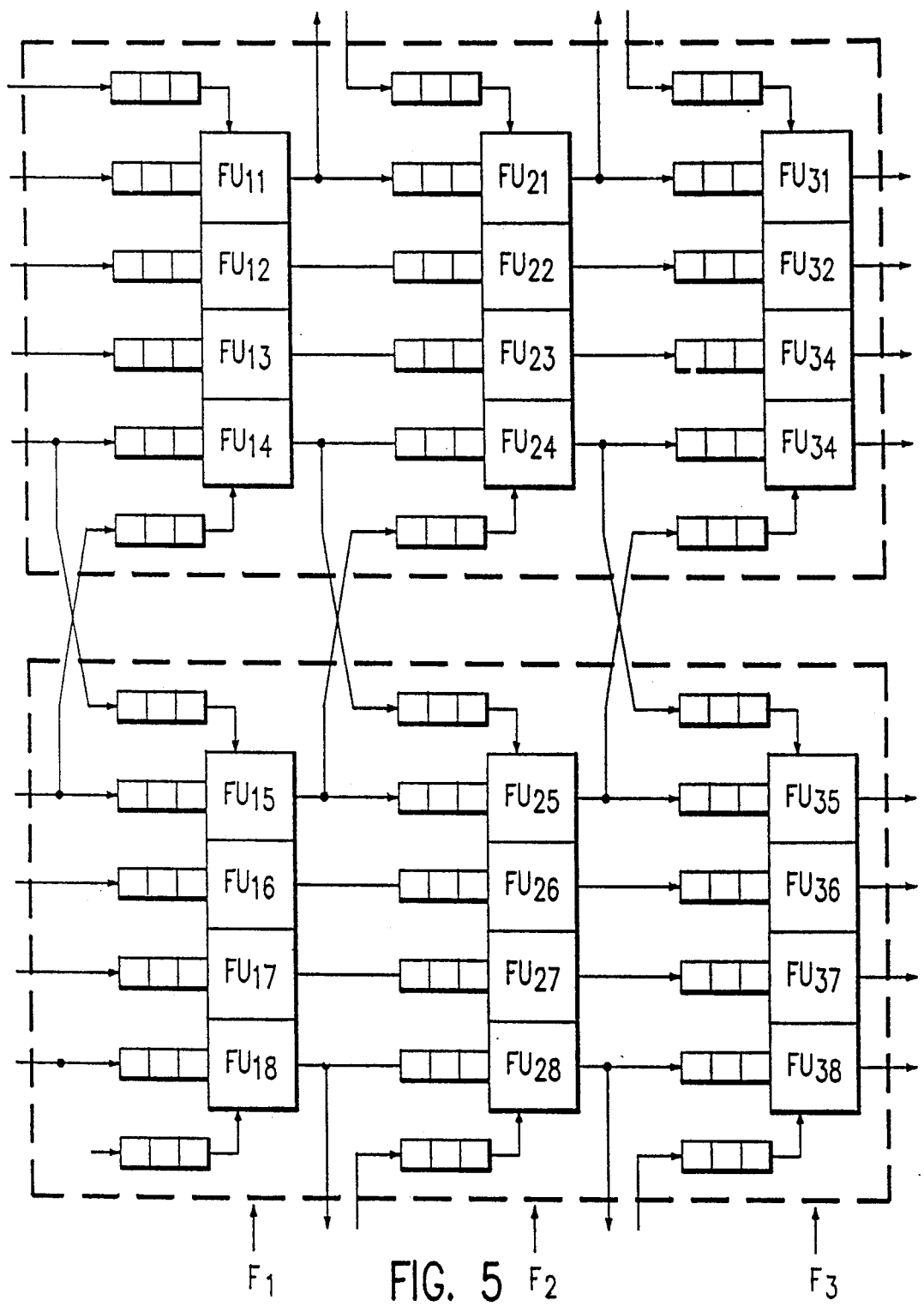
FIG. 5 illustrates how a plurality of neighborhood transformation devices are wired together in an array.

In FIG. 5, the basic building block of FIG. 4B is arranged in an array to eliminate all the memories. Given enough physical locations for mounting circuitry on a card or board, the depth and length of the array of the type illustrated in FIG. 5 can be extended. Additional extension capability exists at the top and bottom boundaries of each array to extend the processor depth into a vertical set of identical modules. This is accomplished by using the top and bottom row window elements to contain the redundant image data.

Figure 6:
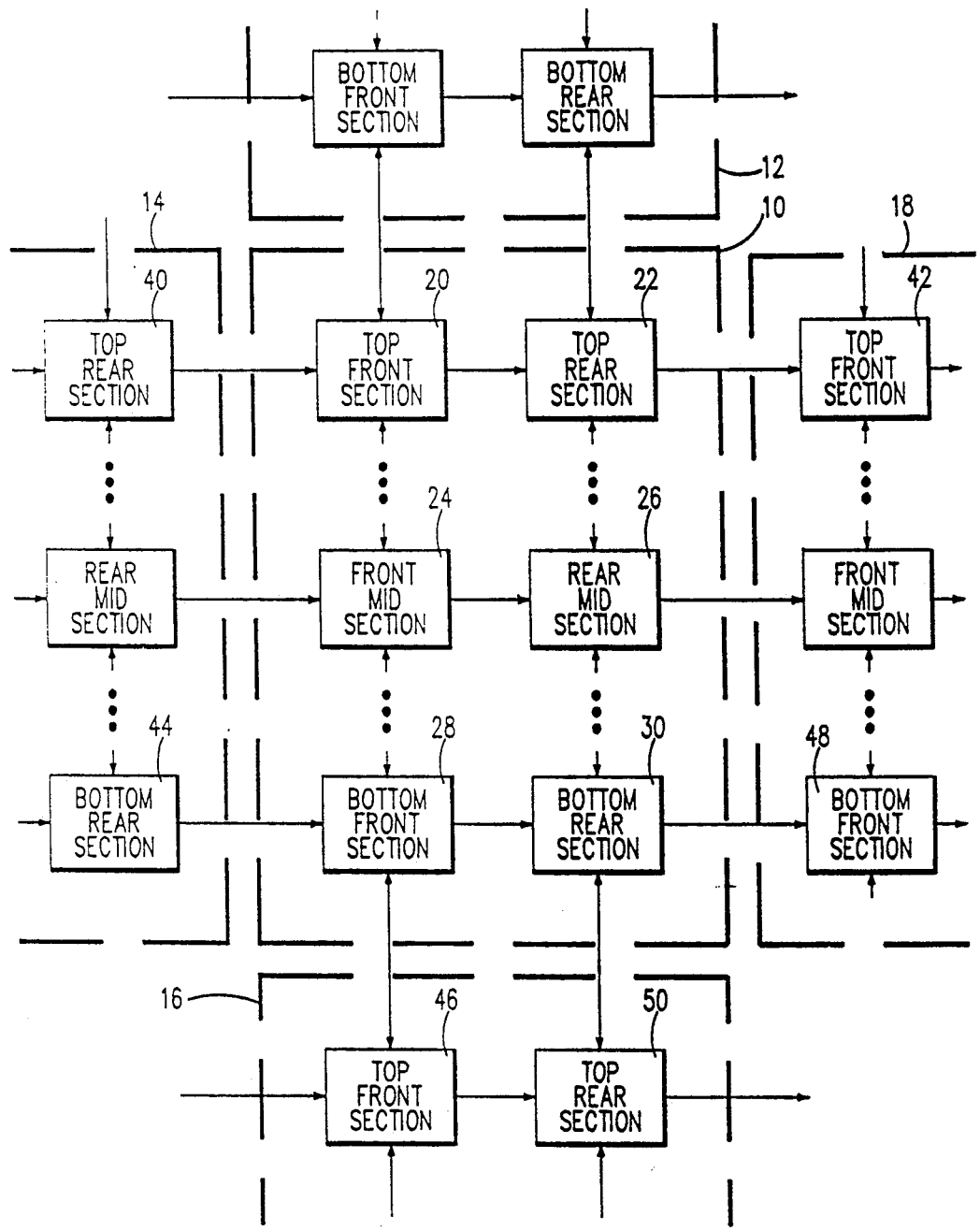
FIG. 6 illustrates the modularity of the image processing module of the present invention.

As has already been mentioned, the universal image processing module of the present invention is modular in design and is well suited to being installed in an array such as is illustrated in FIG. 6. In that figure, a plurality of modules are illustrated, each module being enclosed within a dotted line such as 10, 12, 14, 16, 18. In such an arrangement, each module typically is coupled to four other modules, 2 in each column of modules and 2 in each row of modules.

In the preferred embodiment of the present invention, each module, such as the module inside dotted line 10 has a plurality of image processing modules such as sections 20, 22, 24, 26, 28, 30. Section 20 and 22 are referred to as "top front section" and "top rear section" respectively. Since sections 20 and 22 are located at the top of their respective columns of sections on module 10, they must be coupled to the bottom most sections in their respective columns in the adjacent module 12 disposed above module 10. Section 20 has its input coupled to the output of the top rear section 40 in the same row on module 14. The output of section 22 couples to the input of section 42 located on module 18. Sections 20 and 22 also couple to a mid section on the same module disposed directly below and adjacent sections 20 and 22.

The bottom most sections 28 and 30 on module 10 couple to the adjacent sections on neighboring modules 14, 16 and 18 as well as to sections on module 10. For example, section 28 couples to sections 44 on module 14, section 46 on module 16, section 30 on module 10 and to a mid section disposed directly above section 28 on module 15. Section 30, in a similar fashion, couples to section 48 on module 18, section 50 on module 16 as well as to the mid section on module 10 disposed directly above section 30.

Figures 6A, 7, 8, 9, 10, 11, 12, 13:
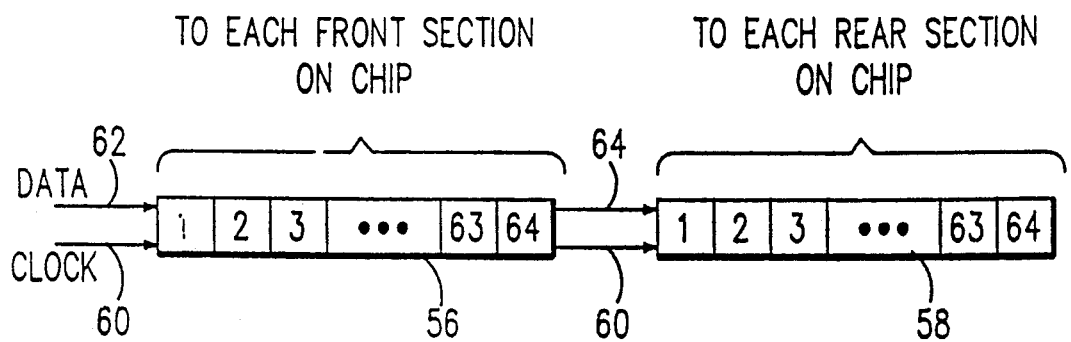
FIG. 6A illustrates the control register used in each module to control the operation of each of the processor front and rear sections of the invention.
FIGS. 7-12 are detailed block diagrams of various front and rear sections of a module of the present invention.
FIG. 13 illustrates how FIGS. 7-12 interfit with each other.
Figure 7:
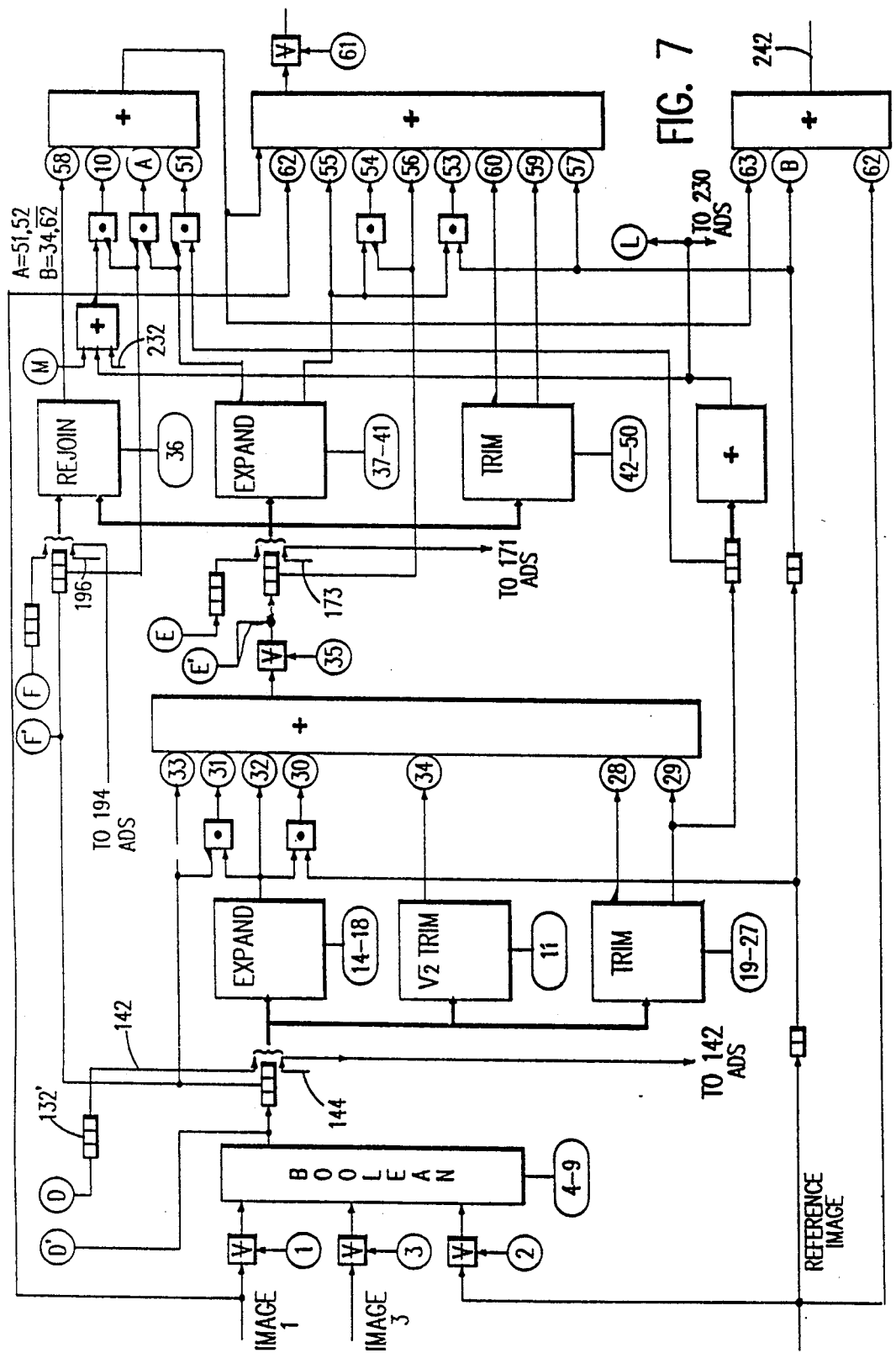
Figure 12:
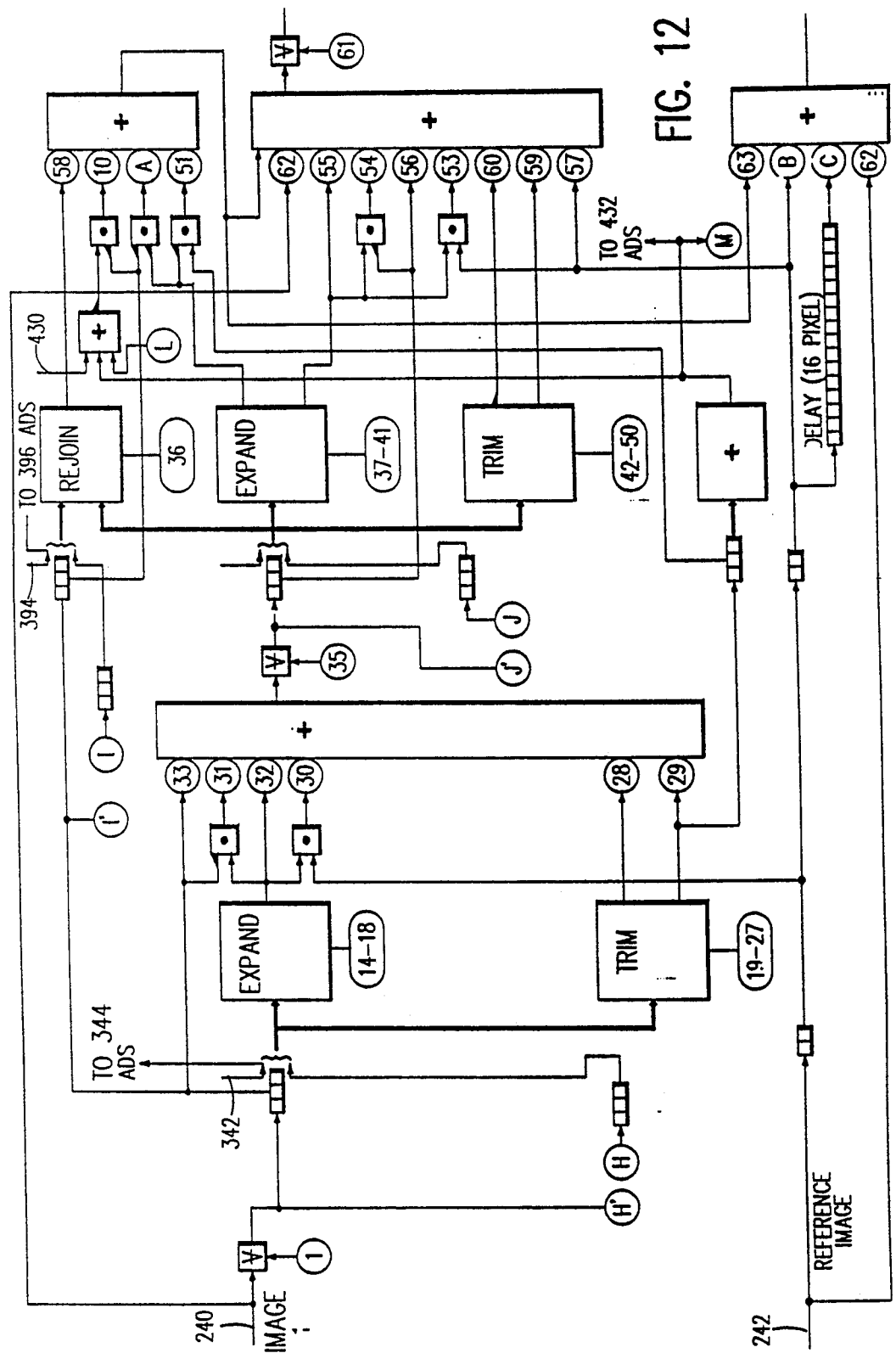

As the design of each section varies in some small respects depending on the section type, each of the six basic types of sections are illustrated in FIGS. 7-12. Top front sections are illustrated in FIG. 7. FIG. 8 illustrates a top rear section. Each module has a plurality of front mid sections 24, each of which is illustrated in FIG. 9 while the rear mid section 26 is illustrated in FIG. 10. The bottom front section 20 is illustrated in FIG. 11 and the bottom rear section 30 is illustrated in FIG. 12.

As will be more completely described, each section on each module is programmable to perform at least one selectable function among the plurality of possible functions which can be performed by a section. On each module, however, is a control register consisting of a front section control register 56 and a rear section control register 58 as illustrated in FIG. 6A. These registers 56 and 58 comprise shift registers which are gated by pulses received on a clock line 60. Register 56 receives externally entered control data on data line 62 which is gated into register 56 by clock pulses on line 60.

In the preferred embodiment, registers 56 and 58 are each 64 bits long. Data is first shifted into register 56. Then, after 64 bits have been entered, those bits are shifted a bit at a time from register 56 to register 58 over line 64 as each of the next 64 bits of control data is shifted into register 56. Once registers 56 and 58 are filled, the data therein controls the operation of all the sections on the chip. Specifically, the data in register 56 couples to all front sections on the chip and causes all front sections to perform the operation specified by the control bits contained therein. The data in register 58 couples to all rear sections on the chip and causes all rear sections on the chip to do the same operation. The particular operation selected by the data in registers 56 and 58 do not have to be but could be the same operation. By setting data into each of the control registers in each chip in an array of the type illustrated in FIG. 6, the sections are thereby programmed so the array as a whole will do the desired operation on an image.

A typical image processing array is illustrated in FIG. 6 includes, as mentioned above, a plurality of front mid sections one of which is illustrated in FIG. 9. Each front mid section has three image inputs 100, 102, 104. Input 100 is for receiving data relating to Image 1. Input 102 is for receiving data relating to a second image, namely Image 2. Input 104 receives a reference or third image data.

Each of the inputs 100, 102, 104 couples to a source of image data. The image data comprises a serial stream of data bits each representative of a pixel in an image input thereto. The row position of the particular section in the array of sections as illustrated in FIG. 6 determines the image data pixel row (scan line) position that is received and processed thereby. For example, if the circuitry of FIG. 9 were located 27 sections below the top most section in a given column of sections, then the section in FIG. 9 would receive at inputs 100, 102, 104 data related to the 28th pixel from the top edge of the image in the scanning direction of that image.

Input 100 is coupled via a wire 106 to an Exclusive Or circuit 108 and to a gated input to OR circuit 112 indicated by the circle with a 62 in it. The second input to the Exclusive OR circuit 108 is coupled to bit position 1 of the front section control register 56 (FIG. 6A) as indicated by the circle with a 1 in it coupled to the Exclusive OR 108. When this bit is a zero, the data stream appearing at input 100 passes directly to wire 110 which is the output of Exclusive OR 108. When bit 1 of the front section control register 56 is a 1, however, the data appearing on line 110 is the inverse of the data applied to input 100. Accordingly, Exclusive Or circuit 108 operates as a selectable inverter means to produce either an inverted or non-inverted output, depending on whether inversion was selected by the bit in position 1 of the front section control register or not.

Whenever bit 62 of the front section control register 56 (FIG. 6A) is 0, the data on line 106 is not gated into OR gate 112. Whenever bit 62 of the front section control register 56 (FIG. 6A) is a 1, however, the data on line 106 is gated into the OR gate 112. Accordingly, the gated inputs to OR gate 112 can be thought of as simple AND gates with data at one input thereto and a bit from the bit position identified in the circle from the front section control register 56 (FIG. 6A) comprising the second AND gate input. Hence, the OR gate 112 and the AND gates which gate bits into the OR gate 112 can be thought of as a gated or selectable combining means for selectively combining one or more of a plurality of selectable inputs to produce a combined output bit referred to in the claims as a second combined output bit.

Input 102 receives Image 3 data and couples it via a wire 114 to an Exclusive OR 116. The second input to Exclusive OR 116 comes from bit position 3 of the front section control register 56 (FIG. 6A). The output of the Exclusive OR 116 couples to line 118 and comprises the Image 3 data when bit position 3 of register 56 is a zero and comprises the inverted Image 3 data when bit position 3 of register 56 is a one.

The second input 104 is for receiving reference image data. This input is coupled by a line 120 to one input of an Exclusive OR gate 122. The second input to the Exclusive OR gate 122 is coupled to bit position 2 of the front section control register 56. The output of the Exclusive OR gate 122 is coupled to a line 124. The output appearing on line 124 comprises the reference image data when bit position 2 of register 56 is a zero and comprises the inverted reference image data when bit position 2 of register 56 is a 1.

The lines 110, 118 and 124 are coupled to a boolean function generator 126. The boolean function generator 126 is also coupled to bit positions 4-9 of the front section control register 56. The signals appearing at bit positions 4-9 of the front section control register 56 serve to select the boolean function which the boolean generator 126 performs on the data input thereto over lines 110, 118 and 122. The specific functions performed by the boolean function generator 126 will be described hereinafter when the structure of that generator is defined further.

The output of the boolean function generator 126 appears on line 128 which serves to connect the boolean function generator 126 to a three stage shift register 130. The shift register 130 is clocked at a rate commensurate with the rate which data is presented to the input of the boolean function generator 126.

The second stage of the three stage shift register 130 is coupled via a line 132 to other circuit elements of the system as illustrated in FIG. 9 which will be described hereinafter in greater detail. All three stages of the three stage shift register 130 couple via three lines of a 9 bit bus 134 to a first selectable expand unit 136, a square root of 2 trim unit 138 and a negative image trim unit 140. These units 136-140 will be described hereinafter in greater detail.

Three additional bits of bus 134 are illustrated by the arrow 142 which comprises 3 wires coming from the output of each stage of a corresponding three stage shift register 130 of the adjacent section for the image processing section disposed directly above the section of FIG. 9. The remaining 3 input lines to the bus 134 is illustrated by the arrow 144 which comprises 3 wires coming from the shift register 130 located adjacent and below the section of FIG. 9. As such, shift register 130 comprises a means for holding a 3 by 3 neighborhood of bits.

In sections such as the top most section on a chip as illustrated in FIG. 7, the three bits represented by line 142 must be fed from an auxiliary shift register 132' containing 3 bits. This auxiliary shift register 132' couples to a line D, as illustrated in FIG. 11, in the bottom most section of the adjacent chip disposed above the chip containing the section of FIG. 7. By use of such auxiliary shift registers, the need for I/0 pins to and from a chip is kept to a minimum. In sections such as the bottom most section as illustrated in FIG. 11, the bus 134 receives 3 data bits from a shift register disposed between bus 134 and line D'. Line D' couples to the output of the boolean unit of the top most channel of the adjacent section disposed below the section of FIG. 11.

Returning to FIG. 9, the expand unit 136 receives the 8 data bits from the bus 134 and is selectively controlled by bit positions 14-18 of the front section control register 56. The expand unit 136 performs one of many selectable functions on the data input thereto which will be described hereinafter in greater detail in connection with description of the expand unit 136.

The square root of 2 trim function unit 138 receives the 9 data bits from the bus 134 and is controlled by one of three bit positions, either position 11, 12 or 13 of the front section control register 56. Every third section as one progresses down a column of sections is controlled by the same bit. For example, the topmost square root of two trim unit is controlled by bit position 11. Therebelow, the 4th, seventh etc., square root of two trim units are also controlled by bit 11. The square root of 2 trim unit 138 will also be described later in connection with a more detailed description thereof.

The negative image trim unit 140 receives the 9 data bits comprising negative image data from the bus 134 and is controlled by bit positions 19-27 of the front section control register 56. This trim unit 140 and the trimming functions selectively performed thereby will be described later in greater detail.

The output of the expand unit 136 is coupled via the line 146 to the non-inverting input of two AND gates 148 and 150. The inverting input of AND gate 148 is coupled to the line 132. The output of the AND gate 148 comprises an edge bit which couples to a gated input to OR gate 152 which is indicated by a circle with the number 31 inside it. This element comprises an AND gate for ANDing the signal appearing at the output of the AND gate 148 with the value of bit position 31 of the front section control register 56. The AND signal of these two conditions then comprises one input to the OR circuit 152.

The output line 146 from the expand unit 136 also couples to a gated input indicated by a circle with the number 32 in it. This element is an AND gate for ANDing the signal appearing at the output of the expand unit 136 with the content of bit position 32 of the front section control register 56. The output of this AND comprises one further input to the OR gate 152.

AND gate 150 has a second input thereto which is derived from the line 154. The line 154 couples to a two stage shift register 156 whose input is derived directly from the input 104 which contains a serial bit stream of reference image data. The data bit appearing on line 154 comprises an intermediate delayed bit as it is not delayed as long as the delayed reference data bit on line 208. The output of the AND gate 150 comprises a grow bit which couples to a gated input indicated by a circle with a 30 in it which depicts an AND gate for ANDing the condition of the output of AND gate 150 with the content of bit position 30 of the front section control register 56. The output of this AND gate comprises yet another input to the OR gate 152.

The line 132 also couples to a gated input indicated by a circle with a 33 in it which also depicts an AND gate for ANDing the condition of the signal on the line 132 with bit position 33 of the front section control register 56. The output of this AND gate comprises an input to the OR gate 152.

The output of the square root of 2 trim unit 138 couples to a gated input indicated by a circle with a 34 in it which depicts an AND gate for ANDing the signal appearing at the output of unit 138 with bit position 34 of the front section control register 56. The output of this AND gate comprises a further input to the OR gate 152.

The negative image trim unit 140 has two outputs one of which couples to a gated input indicated by a circle with a 28 in it via line 158 (known as a secondary trim output) and the second output couples via the line 160 to a gated input indicated by a circle with 29 in it (known as a primary trim output). Line 160 also couples to a three stage shift register 162. The circle with the 28 in it depicts an AND gate for ANDing the secondary trim output on line 158 with the content of bit position 28 of the front section of control register 56. The output of this AND gate comprises an input to the OR gate 152. The circle with the 29 in it comprises an AND gate for ANDing the condition on line 160 with bit position 29 of the front section control register 56. The output of this AND gate also comprises an input to the OR circuit 152.

The output of the OR circuit 152 appears on the line 166 which couples to an input to the Exclusive OR gate 169. The second input to Exclusive OR gate 169 comes from bit position 35 of the front section control register 56. Accordingly, the Exclusive OR circuit 169 serves as a means to invert the signal appearing on line 166 and placing it on line 168 when bit position 35 is a 1 and to pass the signal from line 166 to line 168 when the bit position 35 of front section control register 56 is a 0.

The output line 168 from the Exclusive OR 169 couples to the first stage of a three stage shift register 170. The second stage of this shift register 170 couples via a line 172 to the inverting input of an AND gate 174 and also to an AND gate indicated as a circle with a 56 in it which ANDs the condition on line 172 with bit position 56 of the front section control register 56. The output of this AND gate couples to one input of the OR gate 112.

All three positions of the three stage shift register 170 couple to and become part of a three bit by three bit bus 176. The remaining 6 bits on bus 176 come from adjacent sections over busses 171 and 173. Bus 171 comprises the three bits from the shift register 170 in the section above and adjacent to that in FIG. 9. Bus 173 comprises the three bits from the shift register 170 in the section below and adjacent to that of FIG. 9. The nine bit bus 176 couples to a rejoin unit 178, an expand unit 180 and a positive image or second trim unit 182. Accordingly, the shift register 170 and those in adjacent sections comprise a second neighborhood means for storing a 3 by 3 bit neighborhood.

The line 132 couples to a three bit shift register 184. The second bit position of that shift register 184 is output over line 186 to an inverting input in each of two AND gates 188 and 190. In addition, all three of the bit positions of the three bit shift register 184 are output onto three of the bit positions for the three bit by three bit bus 192. This 9 bit bus 192 receives three additional bit positions from a three bit bus indicated by arrow 194 which come from the three bits in the corresponding shift register 184 in the immediately adjacent section disposed directly above the section illustrated in FIG. 9. In addition, three more data bits are received over the three bit bus 196 which comes from a corresponding three bit shift register 184 in the adjacent section disposed immediately below that illustrated in FIG. 9. The 9 bit positions which comprise the bus 192 are input to the rejoin unit 178. As such, the shift register 184 and similar ones in adjacent sections comprise a third neighborhood means for storing a 3 by 3 bit neighborhood.

The function of the selectively operable rejoin unit 178 is to produce a rejoin bit which may be lost during skeleton functions. The specific rejoin function produced by unit 178 is selected by the value of bit position 36 of the front section control register. The output of the rejoin unit 178 is placed on an output line 198 which connects between the rejoin unit 178 and a circle with a 58 in it. This circle with a 58 in it symbolizes an AND gate for gating the line 198 into an input to the OR gate 200 whenever bit position 58 of the front section control register is a 1.

The second selectively operable expand unit 180 receives over bus 176 nine bit inputs and performs a selectable expand function thereon, as defined by bit positions 37-41 of the front section control register, to produce a secondary expanded image on line 202 and a primary expanded image output on line 204. The secondary expanded image output on line 202 couples to a circle with a 55 in it, one input to AND gate 174 and to one input of AND gate 206. The circle with a 55 in it symbolizes a two input AND gate which is active to pass the signal of the line 202 to its output whenever bit position 55 of the front section control register is a 1. The output of this AND gate comprises one input to the OR gate 112.

The secondary expanded image on line 202 also couples to one input of AND gate 174. The second input to this AND gate comes from the second bit position of shift register 170 over line 172 and is inverted at the input to the AND gate 174. The output of AND gate 174 comprises an edge bit which couples to a circle with a 54 in it which symbolizes an AND gate which is gated by the condition of bit position 54 in the front section control register.

The secondary expanded image on line 202 is also coupled to an input to the AND gate 206. The second input to this AND gate 206 is coupled to a line 208 which receives the output of a two bit position shift register 210. The shift register 210 is coupled to line 154 for receiving the output of the two bit shift register 156.

The output of the AND gate 206 comprises a grow bit which couples to a circle with a 53 in it which is used to symbolize an AND gate which gates the output of the AND gate 206 to the OR gate 112 whenever bit position 53 of the front section control register is a 1.

The modified inverted image produced by the expand unit 180 couples via the line 204 to an input to AND gate 190 and another input to a different AND gate 212. The second input to AND gate 190 is the second bit position of shift register 184 as carried by line 186. The output of the AND gate 190 couples to a circle with an A in it which depicts a three input AND gate for gating the output of the AND gate 190 to the OR gate 200 whenever both bit position 51 and 52 of the front section control in both in a 1 position. Hence the OR gate 200 in combination with the AND gates which couple thereto comprises a selectable combining means for combining under control of bits from the front section control register a plurality of intermediate signals to produce a combined bit representative of the OR of the selected signals to be combined.

The second input to AND gate 212 is provided by line 187 which couples to the second position of shift register 162. The output of AND gate 212 couples to a circle with a 51 in it which depicts a two input AND gate. One input thereof is the output of AND gate 212 and the second input is bit position 51 of the front section control register 56. The output of that AND gate comprises an input to OR gate 200.

The second trim unit 182 performs selectable trim functions and is controlled by bit positions 42-50 in the front section control register 56. The trim unit 182 responds to the 3×3 data bus 176 which comprises positive image data and produces a primary trimmed output on the line 214 and a secondary trimmed output or trimmed point on line 216. The primary trimmed output on line 214 comprises one input to the AND gate indicated by the circle with a 59 in it. The other input to that AND gate is bit position 59 of the front section control register 56. The output of that AND gate comprises one input to the OR gate 112. The secondary trimmed output on line 216 is applied to an AND gate indicated by the circle with a 60 inside it. This AND gate is controlled by bit position 60 of the front section control register 56 and the output thereof comprises an input to the OR gate 112. OR gate 112 in combination with the AND gates at its input also comprises a selectable combining means for selectively combining one or many signals input thereto to produce a combined bit which is output to Exclusive OR 238.

The circuitry of FIG. 9 also includes a three way OR gate 218 which receives data from a 3 position bus 220. The data on this bus is comprised of the three data bits from the three bit shift register 162. The output of the OR gate 218 couples by a line 226 to one input of an NOR gate 228. The NOR gate 228 also has an input on line 230 from the line 226 of the above adjacent section and an input on line 232 from the OR gate 218 in the below adjacent section. The output of the NOR gate 228 couples to one input of AND gate 188. The output of this AND gate 188 is applied to a circle with a 10 in it which comprises a two input AND gate with one input being the output of AND gate 188 and the second input comprising bit 10 of the front section control register. The output of this AND gate comprises one input to OR gate 200.

The output of OR gate 200 is applied to line 234 which couples to one input to the OR gate 112 and also to a gated input to the OR gate 236. Specifically, the line 234 couples to a circle with a 63 in it which comprises an AND gate having one input comprising line 234 and the second input comprising bit position 63 of the front section control register. The output of this AND gate is one input to the OR gate 236. A second input to the OR gate 236 comprises the reference image which is received over line 120 at the input to an AND gate illustrated as a circle with a 62 in it. This AND gate has one input which comprises the reference image data on line 120 and a second input which comprises bit position 62 of the front section control register. The output of this AND gate comprises an input to the OR gate 236. A further gated input to the OR gate 236 is illustrated as a circle with a B in it and comprises a three input AND gate. One of the inputs to this AND gate comprises the data on line 208 while the other two inputs comprise the signal from bit position 34 and the inverse of bit position 62 from the front module control register. The output of this AND gate comprises an input to the OR gate 236.

The output of OR circuit 112 couples to one input of an Exclusive OR gate 238 which functions as a selectable inverter means. The second input to this Exclusive OR gate 238 comprises bit position 61 of the front section control register. When bit position 61 is a zero, the output of the OR gate 112 is coupled directly to output line 240. When bit position 61 is a one, however, the output on line 240 comprises the inverse of the output of OR gate 112.

FIG. 10 is a rear mid section which couples to a front mid section as illustrated in FIG. 9. The circuitry illustrated in block diagram form in FIG. 10 is representative of all rear sections and has many but not all of the functional units found in each front section such as illustrated in FIG. 9. The major difference is the fact that each rear section does not have a square root of 2 trim unit or a boolean function generator. Also, each rear section includes a delay line 401 which includes 16 bit positions where no such delay line is in any front section. The output of the delay line 401 comprises the input from line 398 delayed 16 pixels. This delay line is clocked by a clock signal (not shown) at a rate equal to the rate at which image data bits appear on line 242.

The output of the delay line 401 is gated into the OR gate 436 by a three input AND gate illustrated by a circle with a C in it. The output of the delay line 401 is gated by bit 63 and not bit 34 of the rear section control register 58 shown in FIG. 6A. The interconnection of the mid rear section illustrated in FIG. 10 with other adjacent sections (ADS) either above or below it is illustrated therein and in FIGS. 8 and 12.

Figure 14:
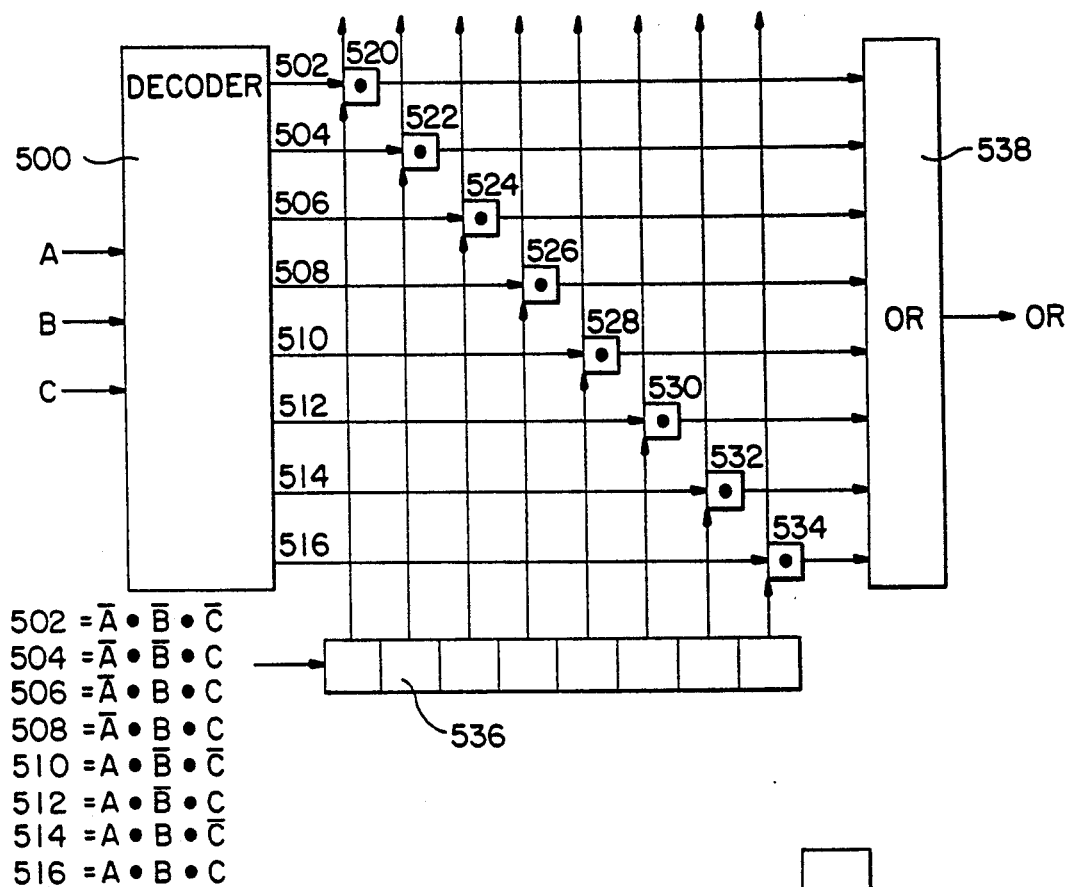
FIG. 14 is one embodiment of the boolean function generator of FIG. 9.

The boolean function generator 126 of FIG. 9 is illustrated in greater detail in FIG. 14. The boolean function generator illustrated in FIG. 14 comprises a decoder having three input lines A, B, C which can receive serial bit streams of data. The decoder serves to produce on each of the decoder output lines 502–516 a unique signal as specified in the table in FIG. 14. Each of the eight output lines 502–516 couples to one input of an AND gate such as AND gates 520–534. The second input to each AND couples to a unique position in a control register 536. The output of each AND gate 520–534 becomes one input to an eight way OR gate 538. The output of that OR gate 538 comprises the output of the boolean function generator of FIG. 14.

Figure 15:
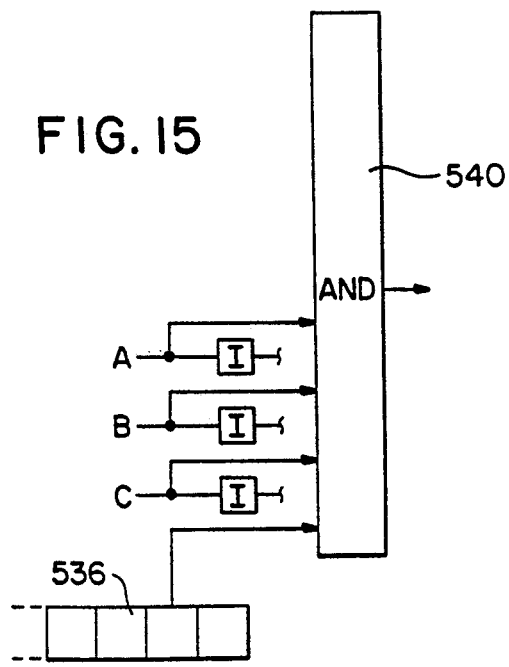
FIG. 15 illustrates an alternative circuit for a boolean function generator.

An alternative construction for the boolean function generator is illustrated in part in FIG. 15. In this alternative approach, the decoder and each two input AND gate is replaced by a single 4 input AND gate 540. Three of the inputs are connected to an image input line A-C or the inverse thereof. The fourth input is coupled to one unique bit position of control register 536. The output of each AND gate 540 couples to one input of an eight input OR gate (not shown) which serves the same function as OR gate 538 of FIG. 14.

Figure 16:
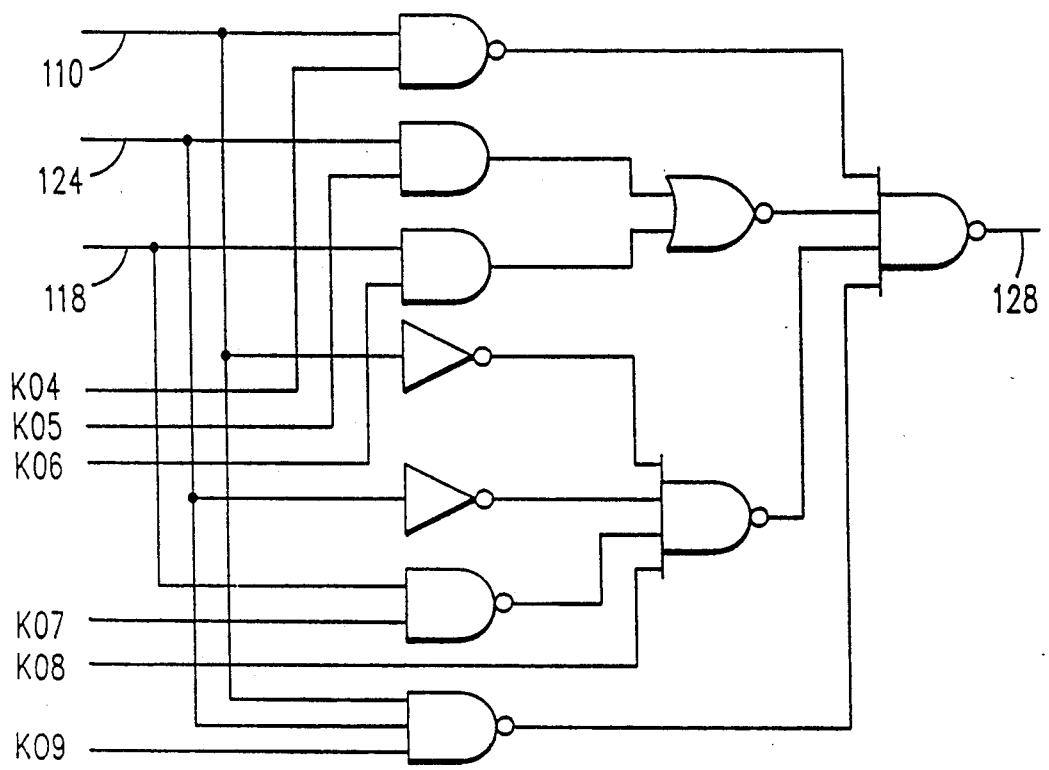
FIG. 16 illustrates the preferred embodiment of the boolean function generator of FIG. 9.

FIG. 16 shows the preferred embodiment for the boolean function generator of FIG. 9. The lines 110, 118, 124 and 128 in FIG. 16 correspond to the same lines in FIG. 9. The lines labeled in FIG. 16 as K04-K09 correspond to lines from bit positions 4-9 of the front section control register 56. The table of FIG. 17 illustrates the functions produced by the boolean function generator of FIG. 16 for many of but not all the possible control bit combinations where line 110 is designated A, line 118 is designated B and line 124 is designated C.

It will be recognized by those of skill in the art that the implementation of the boolean function generator as illustrated in FIG. 16 cannot perform as many different functions as the generator of FIG. 14. Despite that fact, the generator of FIG. 16 is very useful as it can implement many of the useful boolean functions desired as illustrated in part by FIG. 17. Those skilled in the art will readily perceive that the logic of FIG. 16 may be altered to produce other boolean functions as desired without departing from the spirit and scope of the present invention.

It should be noted that all front sections as illustrated in FIGS. 7, 9, 11 have boolean function generators. The rear sections, as illustrated in FIGS. 8, 10, 12 do not have boolean function generators. The reason for this is due to the fact that the frequency of boolean combinations in typical image processing is low. Hence, it was deemed appropriate, in the preferred embodiment of the present invention to provide a boolean function generator in every other section as one progresses across a row of sections. Those of skill in the art will readily recognize that the boolean function generators might be located in every section or in every second, third, fourth etc., section as desired by the equipment designer.

The expand unit 136 of FIG. 9 performs one of a plurality of selectable "expand" functions on the 8 pixels input thereto over bus 134 in accordance with the particular function selected by the control bits 14-18 from the front section control register 56. The pixel identification map in the upper right corner of FIG. 18 identifies the names of the pixel positions for the pixels appearing on the bus 134. The output of the expand unit 136 of FIG. 9, as noted earlier, is a single pixel on line 146. The value of that pixel is a function of the pixels A, B, C, D, E, F, G and H and of the function selected by bits 14-18 of the front section control register 56.

Figure 18:
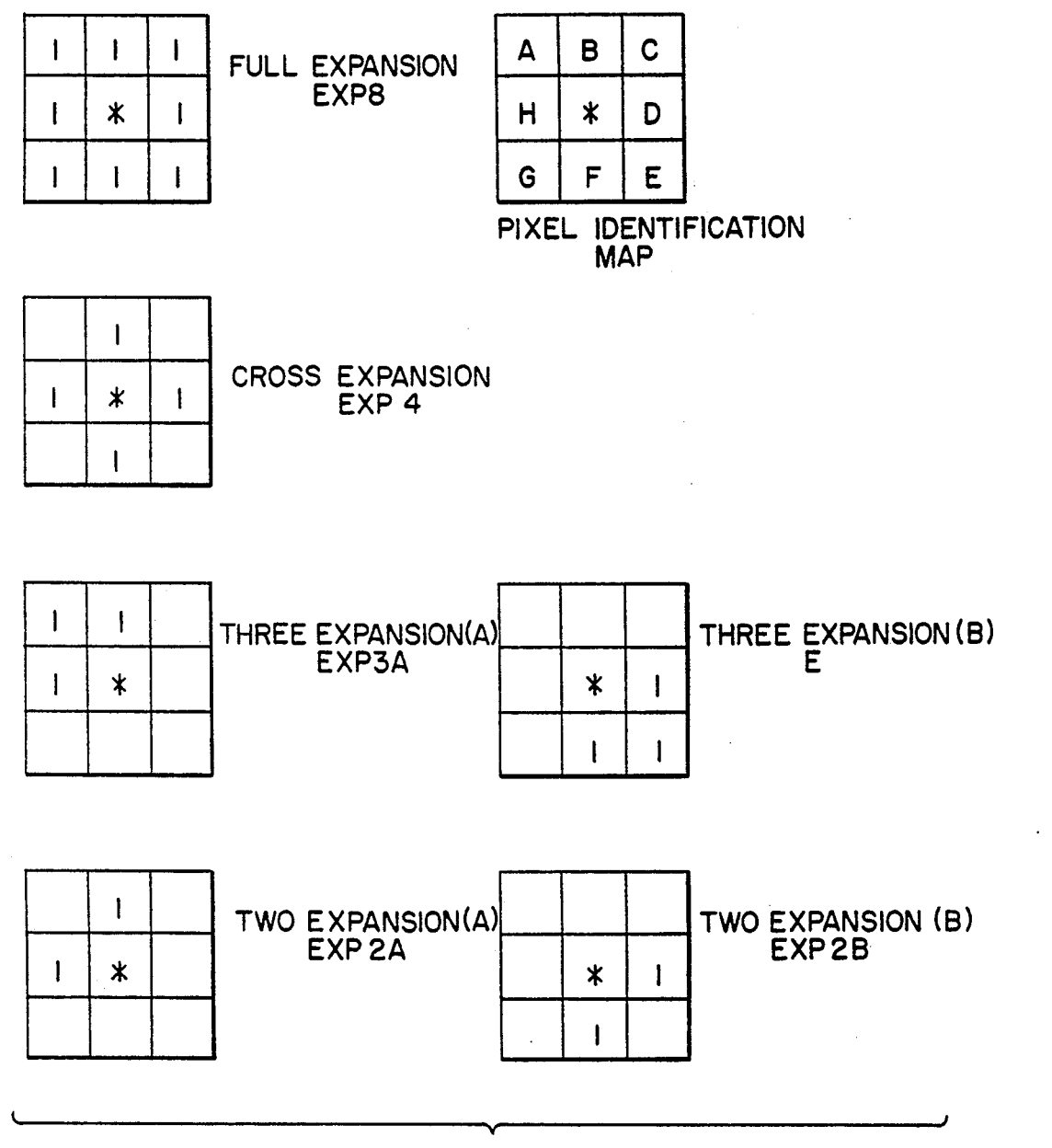

The expand unit 136 can selectively perform 6 different expand functions as illustrated in FIG. 18. The full expand or EXP8 function produces a one on the expand unit output whenever any one of pixels A, B, C, D, E, F, G or H is a one. The cross expand function or EXP4 produces a 1 whenever any one of pixels B, D, F or H is a one. The condition of pixels A, C, E and G does not affect the output of the expand unit for function EXP4.

There are two versions of the three expansion which can be selected. The first version or EXP3A produces a one when any input pixel A, B or H is a one. The condition of pixels C, D, E, F, or G does not affect the result of the first version of the three expansion. The second version or EXP3B produces a one when any input pixel D, E or F is a one. The condition of pixels G, H, A, B or C does not affect the result of the second version to the three expansion.

There are also two versions of the two expansions. The first version EXP2A produces a one when either input pixel B or H is one. The second version EXP2B produces a one when either input pixel D or F is a one.

Figure 19A:
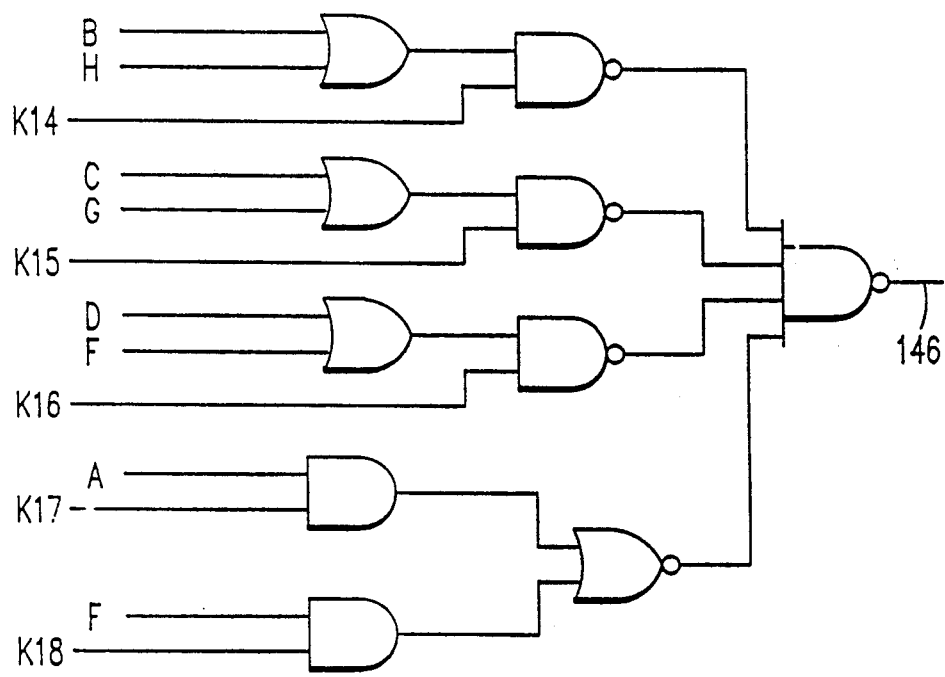
FIG. 19A illustrates the digital logic for producing the functions of FIG. 18.

The actual logic for producing the functions described above for the expand unit is shown in FIG. 19A. The required content for the front section control register 56 for bit positions 14-18 for each function available for the circuitry of FIG. 19A is illustrated in FIG. 19B. The lines labeled K14-K18 correspond to lines from the front section control register bit positions 14-18, respectively.

Those of skill in the art will recognize that other expand functions could be defined as compared to the limited set of expand functions defined in FIG. 18. The set of expand functions illustrated in FIG. 18, while not encompassing every possible expand function possible for a 3×3 pixel matrix, is a sufficiently robust set of 8 bit expansion functions so that the image processing module of the present invention can perform most,, if not all, of the useful 8 bit expand functions.

Figure 19D:
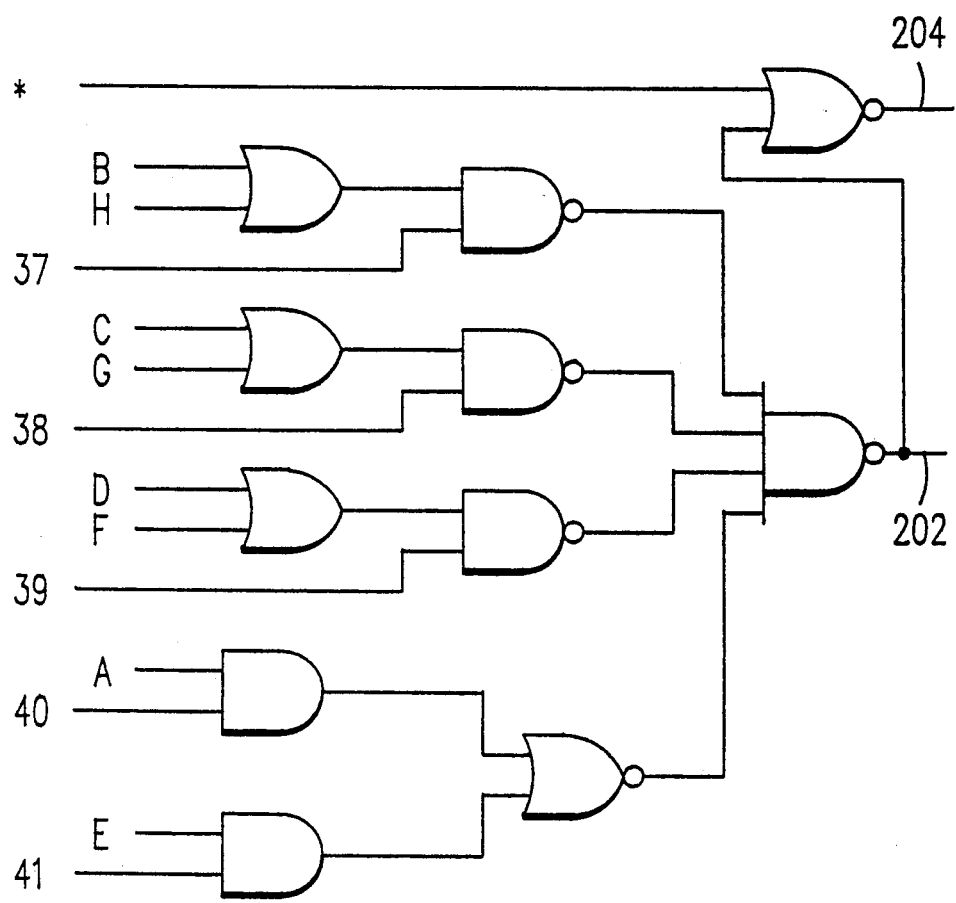
FIG. 19D illustrates the circuits needed to produce an expand unit such as 180 in FIG. 9.

The circuit of FIG. 19D can be used for the expand unit 180 of FIG. 9. In this case, however, the control lines are different from FIG. 19A. The expand unit 180 is controlled by the control register 56 bit positions 37-41. The specific control bits for controlling the function of expand unit 180 are shown in FIG. 19C. It should also be noted that the expand unit 180 has its primary expand output coupled to line 204. This output comprises the inversion of the secondary expanded image on line 202 ORed with the * pixel input to the expand unit 180.

Those of skill in the art will recognize that the functions defined above for expand units 136 or 180 could be controlled by only 3 control register bits as opposed to the 5 illustrated in the preferred embodiment. The preferred approach uses a greater number of control bits than is required as it saves logic on the chip. If chip space is not a concern, then the function selection can be done in virtually any possible configuration of control bits.

Each front section, such as illustrated in FIG. 9 include a square root of two trim unit 138. The four functions performed by the square root of two trim unit 138 are illustrated in FIG. 20. In the case of the first function (a), the input pixels required to produce a one at the output of the square root of two trim unit are A=0, B=1, D=0, E=0, F=0 and H=1. The second function (b) produces a one output when B=1, C=0, D=1, F=0, G=0 and H=0. The third function (c) produces a one output when A=1, B=1, C=1, E=0, F=0 and G=0. The fourth function (d) produces a one output when A=1, C=0, D=0, E=0, G=1 and H=1. The first two functions perform a trimming operation along diagonal lines. The third function performs trimming on horizontal lines and the fourth function performs trimming on vertical lines.

Figure 21:
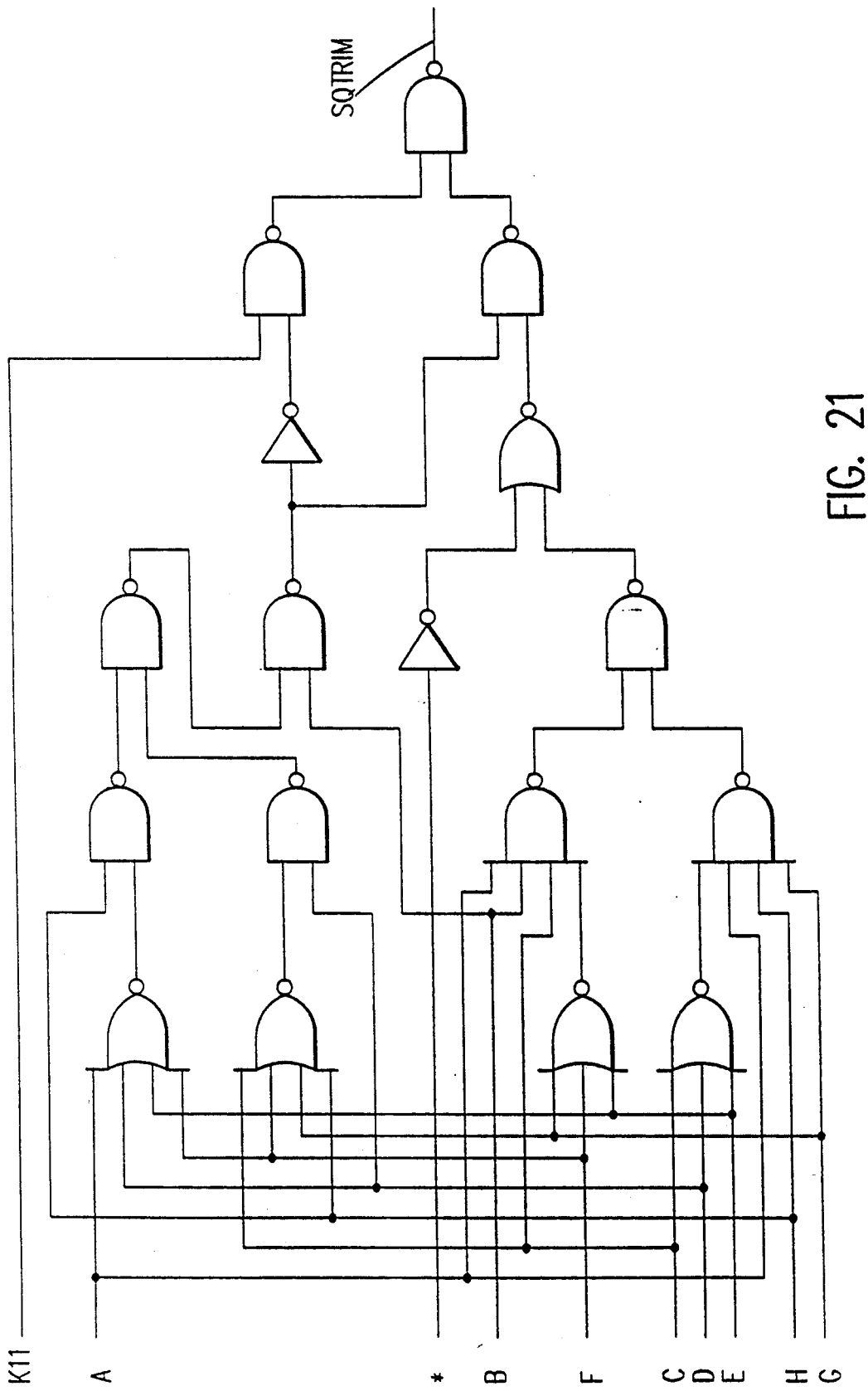
FIG. 21 shows the digital logic for producing the functions illustrated in FIG. 20.

FIG. 21 illustrates the digital logic to perform the functions of FIG. 20 whenever control bit K11 is a one. As noted above, the square root of two trim units are gated by either bit 11, 12 or 13 from the front section control register. For a square root of two trim unit disposed directly below that illustrated in FIG. 21, the line labeled K11 in FIG. 21 would become K12 to indicate that this square root of two trim unit is controlled by bit K12. The next lower square root of two trim unit is controlled by line K13.

Figure 22:
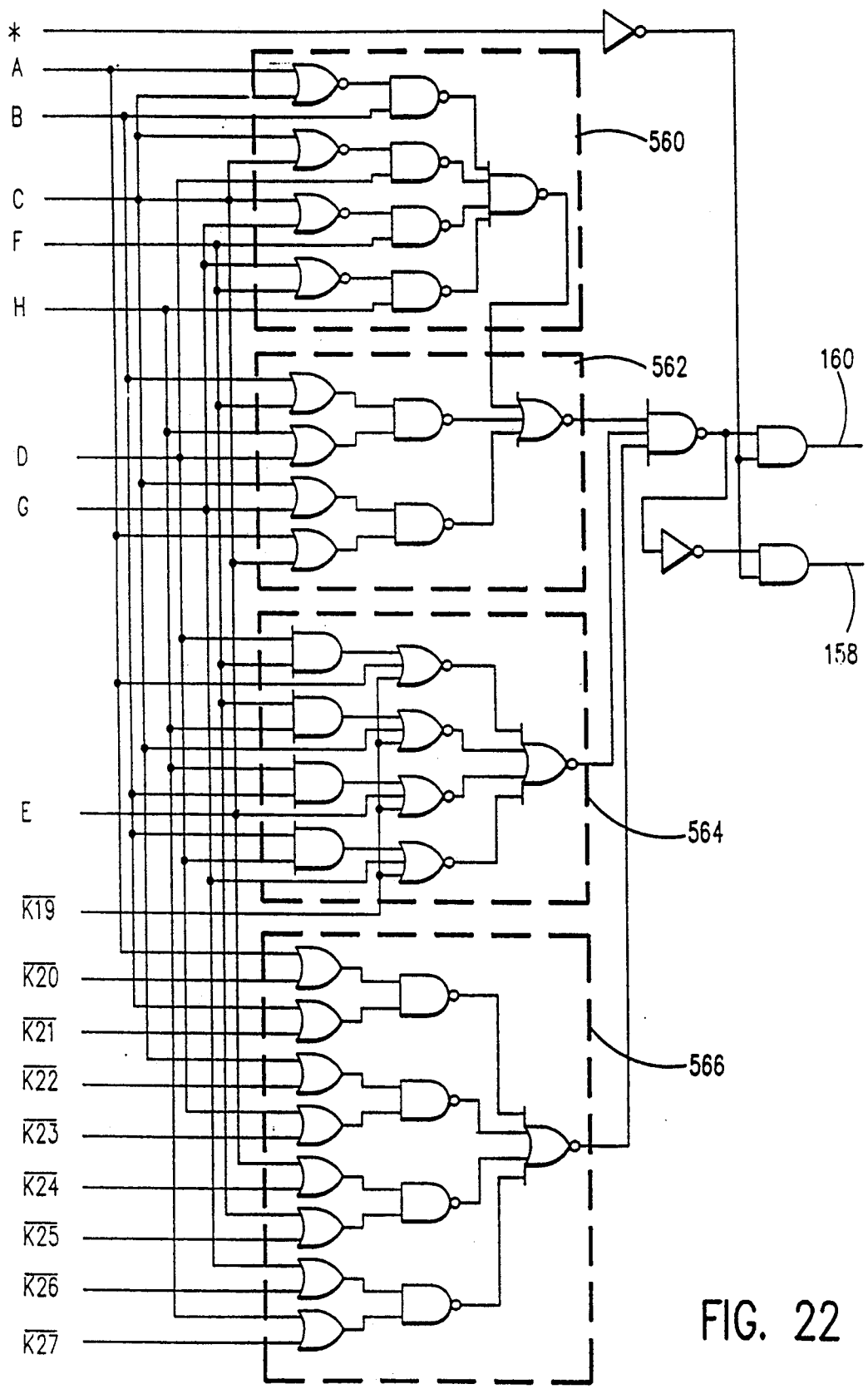
FIG. 22 is a logic diagram for the preferred embodiment of an inverted image trim unit.

The negative image trim unit of FIG. 22 is a logic diagram of the negative image trim unit 140 of FIGS. 7-12. It is particularly advantageous for the trim unit 140 of FIGS. 7-12 to act on negative image data. Whenever the data on bus 134 comprises a negative image, the same image data can be used by the Expand unit 136. This will cause the expand unit 136 to perform a contraction at the same time that trim unit 140 is doing a trim operation so long as the second selectable inverter 169 is conditioned by bit 35 to perform the inversion of the signal on line 166. However, the trimmed image output is in the positive sense on line 160 (FIG. 9).

It should be noted here that the inverter 108, inverter 169 and the expand unit 136 operate together to perform an contraction operation. As will be noted again later, DeMorgan's Law can be used to show that the elements 108, 169 and 136 can be replaced by a contractor while retaining the functional equivalence of that which is shown in FIG. 9. It should also be observed that the functional units described herein can be implemented by numerous other logic configurations which should be considered to be equivalent thereto if they perform one or more of the functions performed by the units shown herein.

The negative image or first trim unit of FIG. 22 is a bit preserving unit. That is, whenever any of the selected test conditions on the data input thereto exist and the central or * pixel input thereto is a zero (0), the output on line 160 is a one (1). Whenever the * pixel is a one (1), the primary trim output on line 160 is always a zero (0) and the secondary trim output on line 158 is also a zero (0).

Figures 24, 25, 26, 27:
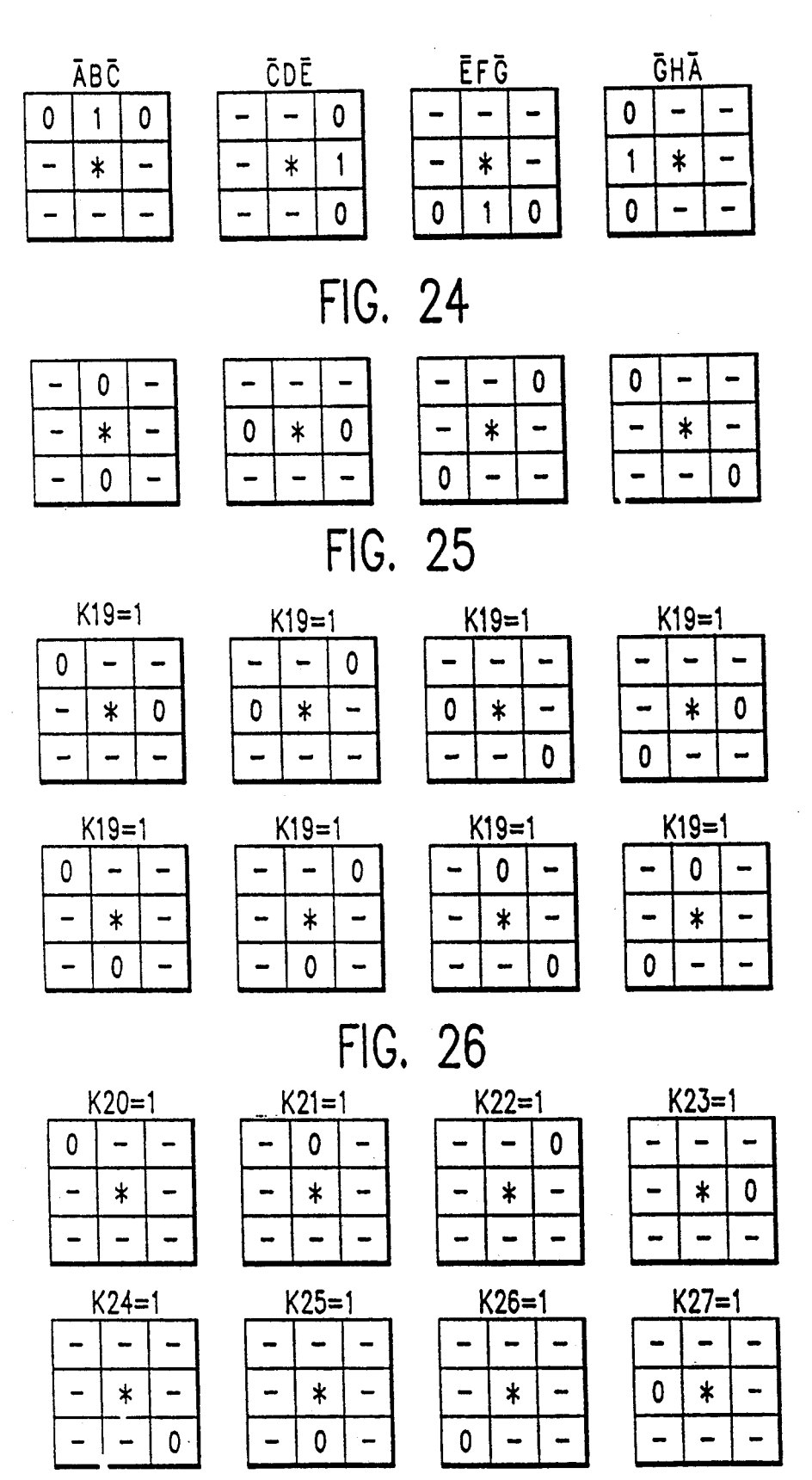

The trim unit of FIG. 22 performs several classes of functions some of which depend on the condition of several control register bit positions labelled as K19-K27. The first set of four functions are illustrated in FIG. 24. These functions are controlled by the logic inside the dotted line 560. A second set of functions are illustrated in FIG. 25. These functions are controlled by the logic inside the dotted line 562. A third set of functions are illustrated in FIG. 26 and are controlled by the logic inside dotted line 564. The remaining functions are illustrated in FIG. 27 and are controlled by the hardware inside the dotted line 566.

It will be noted that the functions of the first and second set are not gated functions. That is, these functions will always be operative on the image. The functions of the third set are all gated by control bit 19. If control bit 19 is a zero, the functions of the third set are activated. The fourth set of functions comprises 8 individual function each of which is activated by a single control bit K20-K27. Whenever the controlling bit line is a zero, the function associated therewith is activated.

Figure 23:
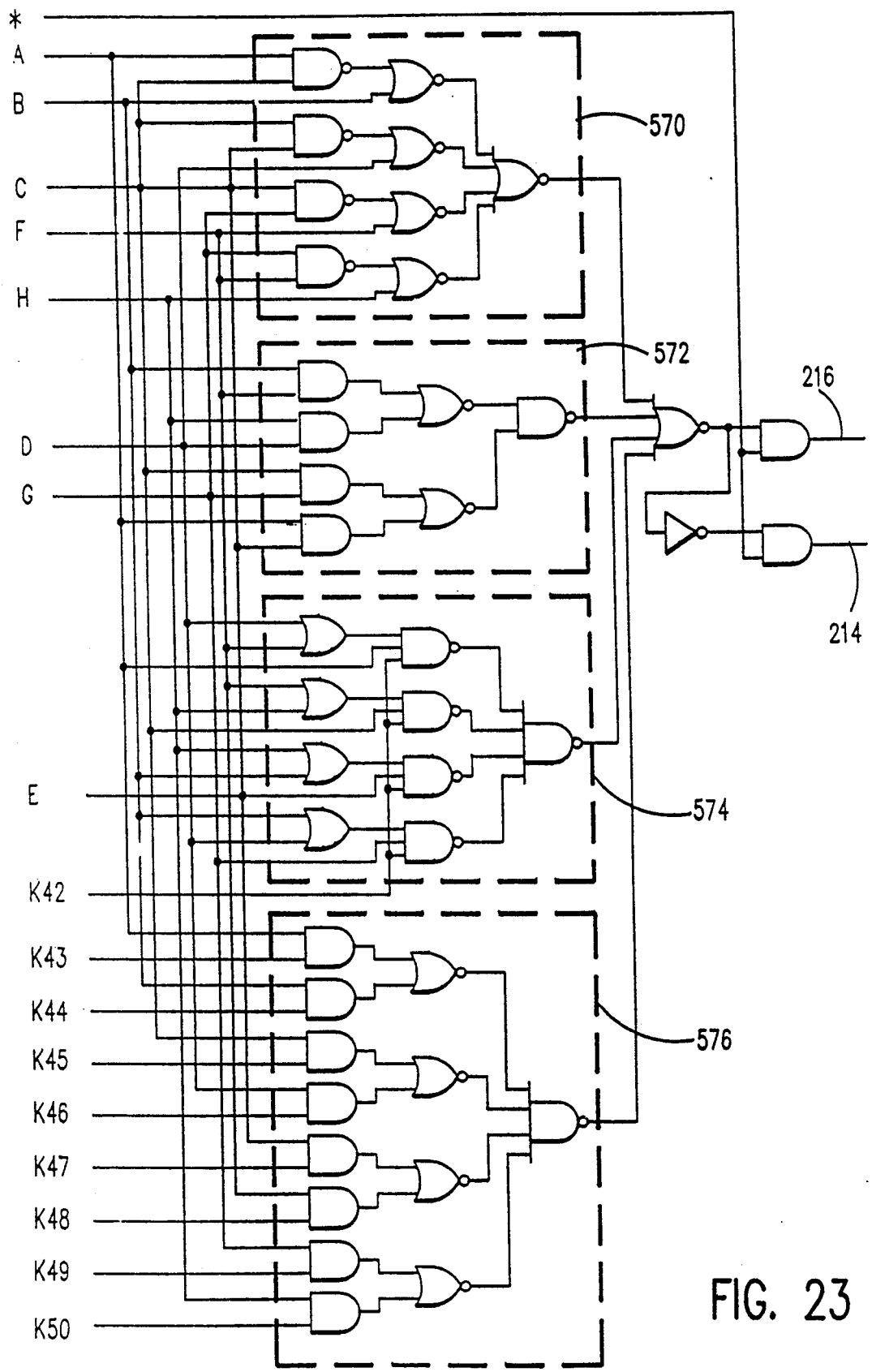
FIG. 23 is a logic diagram for the preferred embodiment of a positive image trim unit.

Referring now to FIG. 23, the second or positive image trim unit 182 of FIG. 9 is illustrated. The second trim unit 182 can perform the same functions as the first trim unit 140 but the operations are controlled by different control bits and the second trim unit 182 operates on positive data images from the bus 176.

Figures 28, 29, 30, 31:
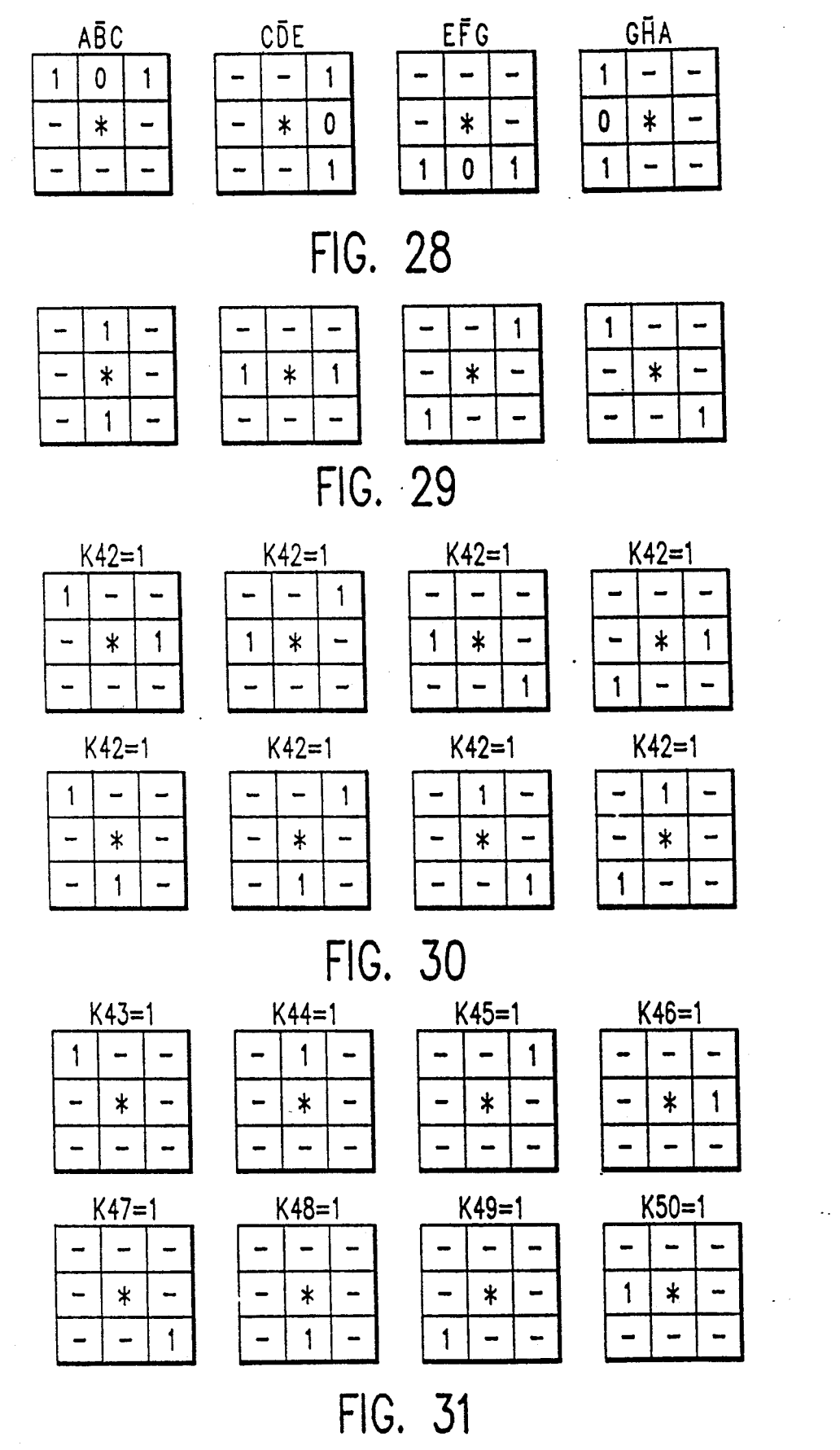

The trim unit of FIG. 23 has a section disposed within dotted line 570 which controls the function illustrated in FIG. 28. As this trim unit operates on a positive image, the * pixel is preserved whenever one of the control functions is met. As illustrated in one example in FIG. 28, if the A bit on bus 176 is a one (1) and bits B and C are respectively zero (0) and (1), then the * pixel appearing at the input thereto is preserved at the output line 214.

The trim unit of FIG. 23 has additional logic contained within dotted line 572. This logic, as it is not gated by control lines, is always active. The four functions produced by the logic inside line 572 in FIG. 23 is illustrated in FIG. 28.

The logic inside dotted line 574 is capable of producing up to 8 functions. These functions are illustrated in FIG. 29 and is controlled by the front section control register bit position 42.

Eight other functions can be produced by the logic inside dotted line 576. Each of these functions is gated by a unique bit position from the front section control register. The eight functions so produced are illustrated in FIG. 31. Accordingly, a plurality of functions can be produced by the logic in FIG. 23 at least some of which are controlled by gate lines and at least some of the functions are always present as no gate lines are used to control these functions.

As illustrated in FIG. 9, there is a rejoin unit 178 which couples to two 3 by 3 buses 176 and 192. The image on bus 192 comprises the "negative sense original" image and the image on bus 176 comprises a contracted image which has been contracted by the operation of the expand unit 136 when working on an inverted image. The rejoin unit 178 has particular value in creating skeletons as will be illustrated later.

Figure 32:
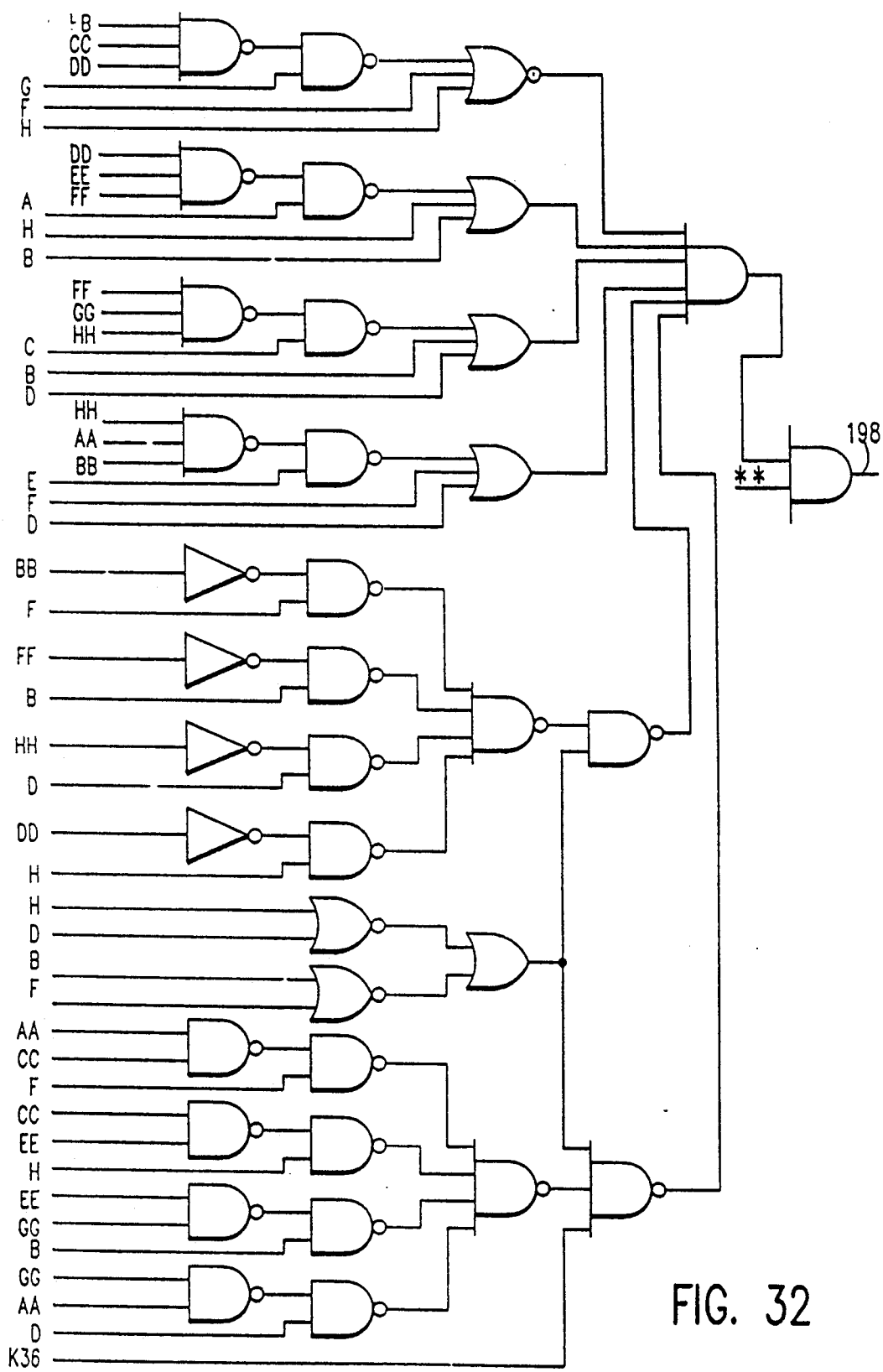
FIG. 32 is a logic diagram for the preferred embodiment of the rejoin unit.
Figures 33, 34:
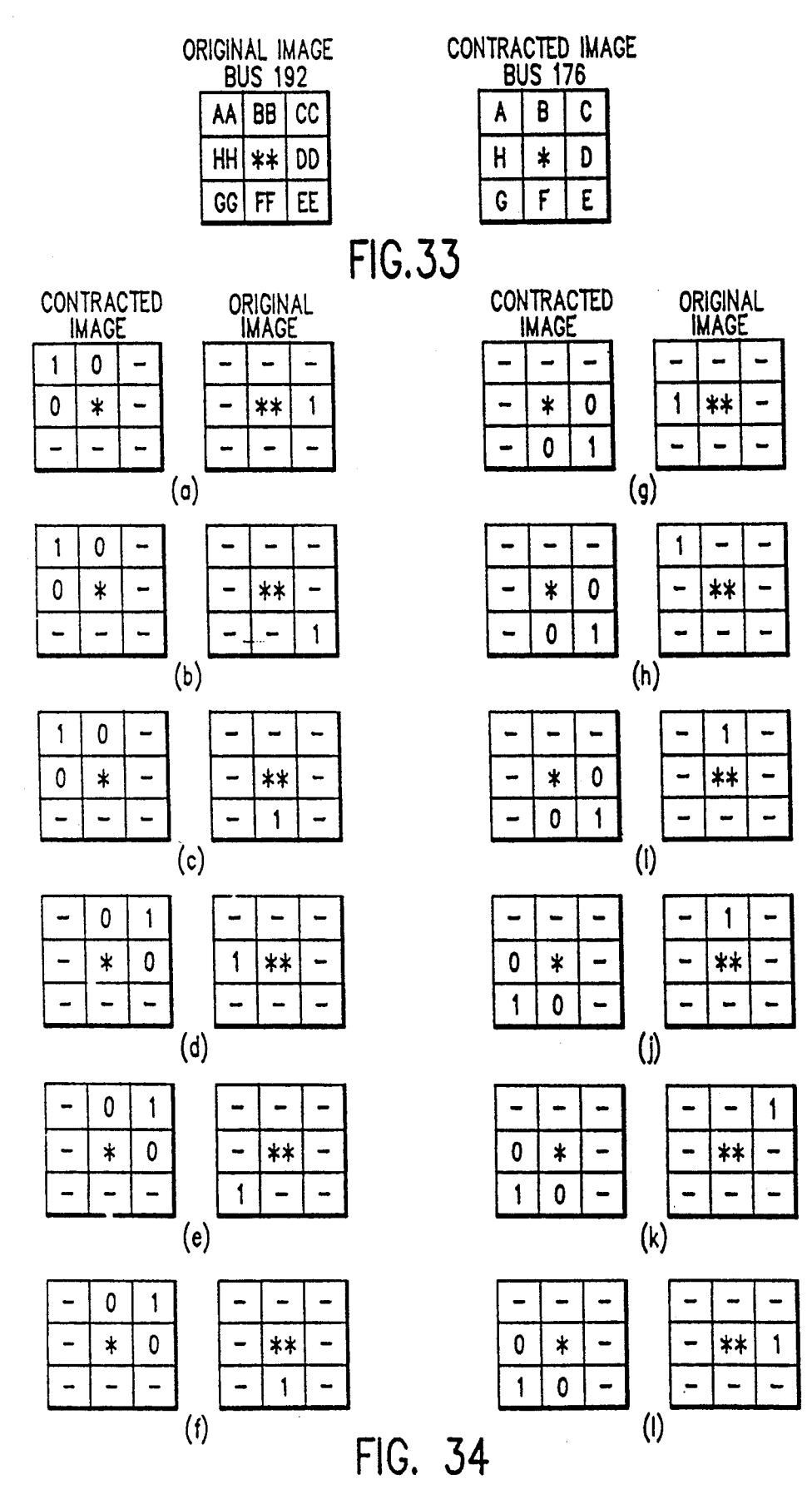
Figures 35, 36:
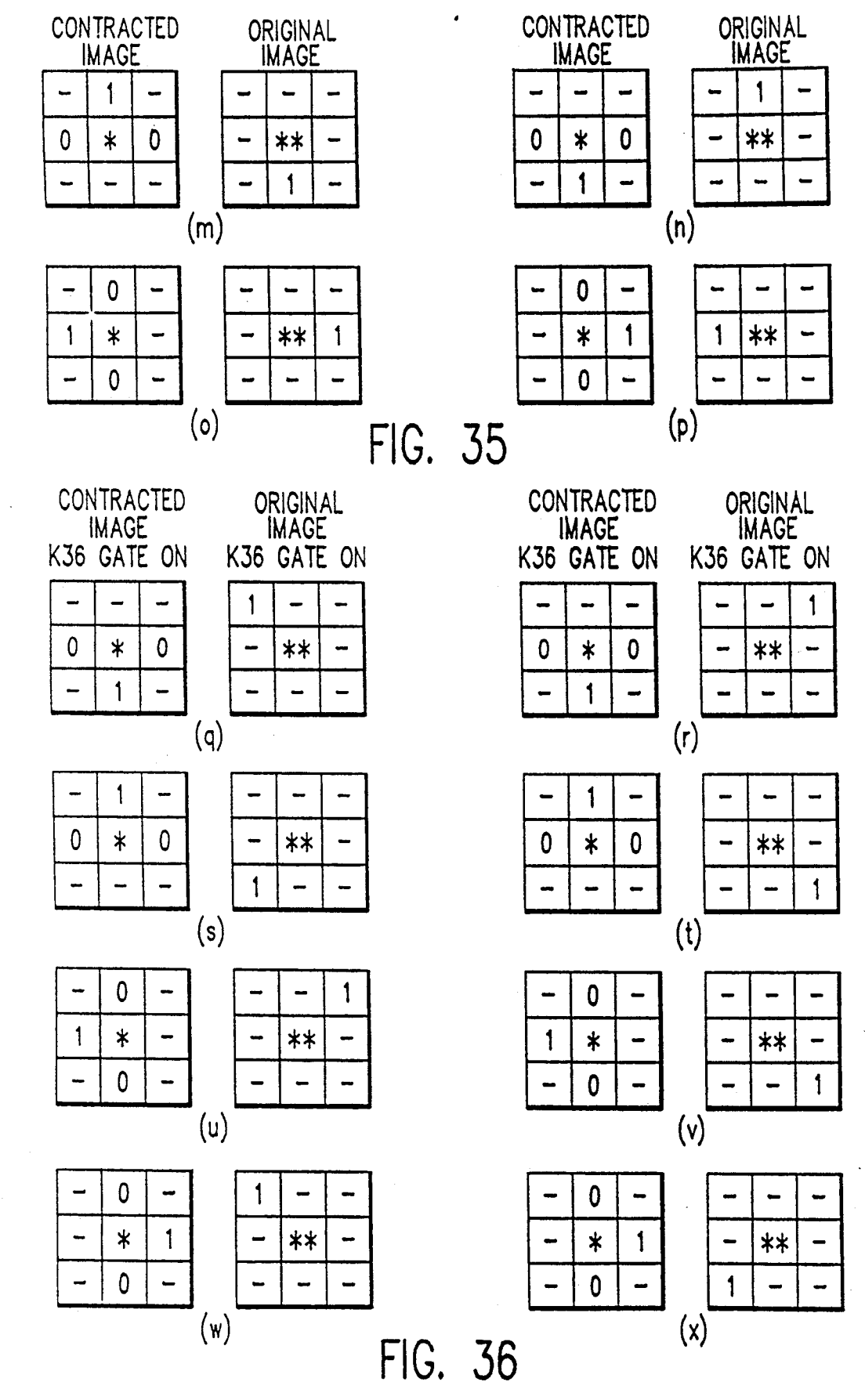

The circuitry for making a rejoin unit is illustrated in FIG. 32. The bit designation for the inputs to this circuitry is illustrated in FIG. 33. The specific functions produced by the circuitry of FIG. 32 is illustrated in FIG. 34-36. The functions of FIGS. 34 and 35 are always operational while the functions of FIG. 36 are available only when control register bit position 36 is a one.

Since the rejoin unit of FIG. 32 operates on bits from two different 3 by 3 buses (176 and 192), FIGS. 34-36 illustrate the value for signals on both buses which cause the negative sense  pixel on bus 192 to be transmitted in the positive sense to the output 198. If none of the functions available for the rejoin are operative because the input data pattern does not activate one of the functions, the  pixel output on line 198 is always a zero, regardless of the state of the ** pixel input to the circuitry of FIG. 32.

Figure 37:
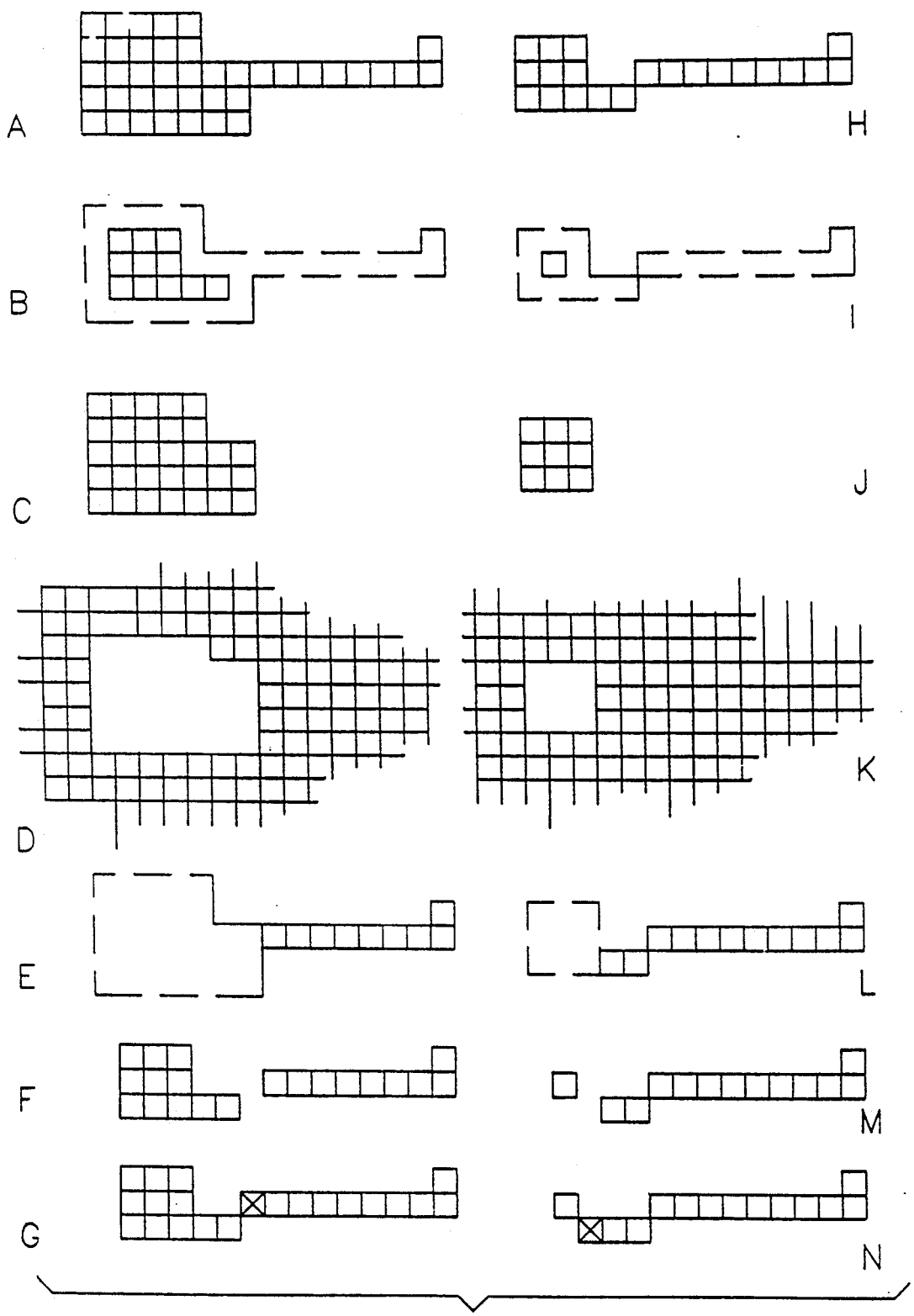
FIG. 37 illustrates how the universal image processing module of the present invention may be utilized to skeletonize an image.

An example of how the universal image processing module of the present invention is utilized is illustrated in FIG. 37. That figure illustrates the manner in which image features are skeletonized. FIG. 37A illustrates the pixels of a feature to be skeletonized. By performing a contraction on the image of FIG. 37A, a contracted image is formed as illustrated in FIG. 37B. Thereafter, the image is expanded to form that illustrated in FIG. 37C. By inverting the image of 37C, the image of FIG. 37D is formed. By ANDing pixel by pixel the image of FIG. 37A with the image of FIG. 37D, the image of FIG. 37E is formed. If the image of FIG. 37B is ORed with the image of FIG. 37E, the divided image of FIG. 37F is formed. By performing the rejoin function on the images of FIG. 37A and B, and ORing with the image of FIG. 37F, the image of FIG. 37G is formed where the square with an x in it represents the rejoin pixel with a "1" on it.

As the image of FIG. 37G is not entirely comprised of a line or lines of single or double pixels, the data of FIG. 37G can be thinned further. Accordingly, the image of FIG. 37G is contracted to form the image of FIG. 37I. That image is then expanded to form the image of FIG. 37J. Then, the image of FIG. 37J is inverted to form the image of FIG. 37K. By ANDing the image of FIG. 37G and FIG. 37K, the image of FIG. 37L is formed which comprises the fine line elements of FIG. 37G. By ORing the image of FIG. 37I with the image of FIG. 37L, the image of FIG. 37M is formed. Connectivity is restored by the dual neighborhood rejoin function operated on the images of FIG. 37H (the same as FIG. 37G) and FIG. 37I which forms a single rejoin pixel which is ORed with the image of FIG. 37M to form the image of FIG. 37N. The single pixel just referred to is illustrated by the pixel with an x in it in FIG. 37N. The image of FIG. 37N is the skeleton of the images in either FIG. 37A or FIG. 37H.

Figure 38:
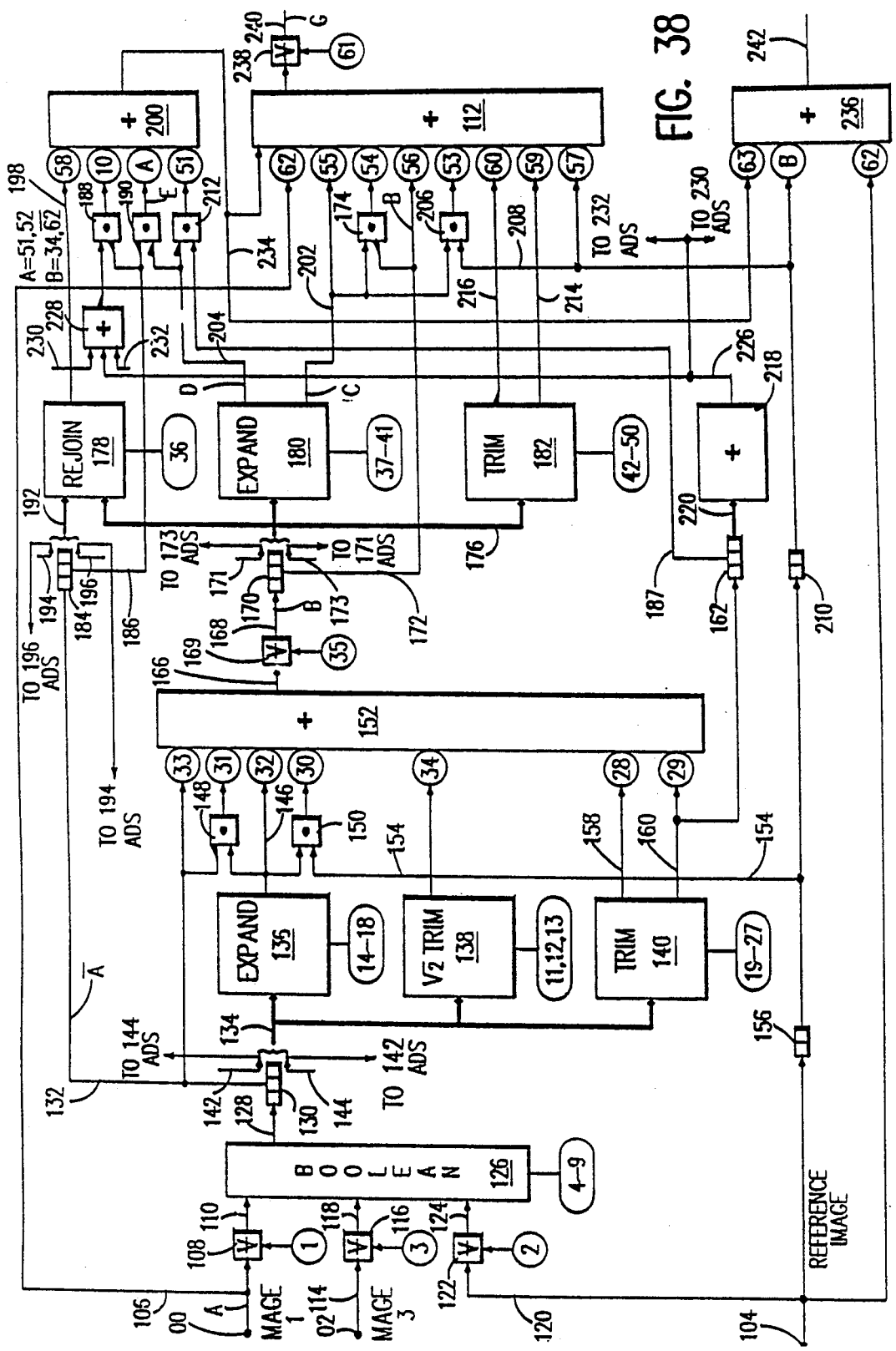
FIG. 38 is similar to FIG. 9 and is presented to illustrate the location of various images shown on FIG. 37.
Figure 39:
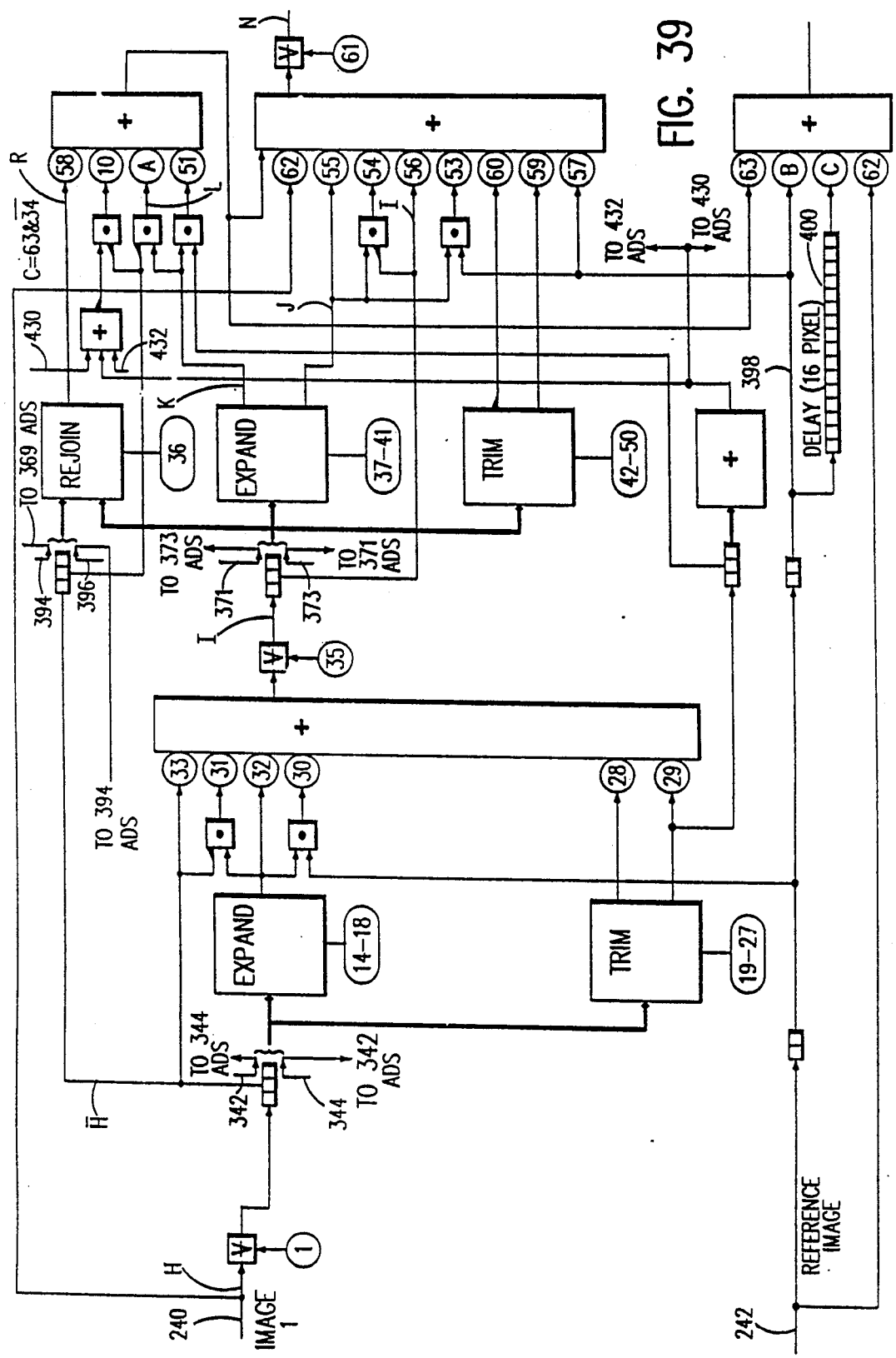
FIG. 39 is similar to FIG. 10 and is presented to illustrate the location of various images shown on FIG. 37.

In order to produce the skeleton function illustrated in FIG. 37 with circuitry of the type illustrated in FIGS. 7-12, the following must be done as is illustrated in FIGS. 38 and 39. The original input image as illustrated in FIG. 37A is input into the universal image processing module on the line labeled A in FIG. 38. Control register bit position 1 is a one so that the Exclusive Or 108 will invert the input image and place it on line 110. The Boolean Function Generator 126 is conditioned to pass the inverted image unchanged from line 110 to line 128 by having bits 4-9 of the control register set to 100000.

The inverted input image is then applied to the Expand Unit 136. The control bits 14-18 are set to all is to produce an 8 way expand function. Since the image input to the Expand Unit 136 is a negative image, the Expand Unit 136 produces an expanded negative or inverted image on line 146. Control bit 32 is a 1 to causes the expanded inverted image to be input to OR 152. Control bit 33 is also 1 so the * pixel in the 3 by 3 neighborhood input to the Expand Unit 136 is also gated into the OR 152. Bit 35 is also a 1 so that the output of OR 152 is inverted by Exclusive OR 169. As such, the contracted image of FIG. 37B appears at the point on FIG. 38 indicated by lead line B.

The contracted image of FIG. 37B is applied to the rejoin unit 178 and the expand unit 180 via bus 176. The rejoin unit 178 also receives the inverted original image over bus 192. With control register bit 36 being a 0, the rejoin unit 178 produces a rejoin partial image as illustrated in FIG. 37G by the bit position with an X in it. This rejoin partial image is produced on line 198 and input to Or Gate 200 by control bit 58 being a 1.

The expand unit 180 operates in response to control bits 37-41 all being 1 to produce on line 202 the 8 way expanded image C and on line 204 the 9 way expand image D of FIG. 37. Image D is ANDed with the original image A by AND gate 190 to form the partial image of FIG. 37E at the line labeled E. As bits 51 and 52 are a 1, image E is ORed with the rejoin bit in OR 200. That image is input directly to OR 112. The contracted image B is gated by bit 56 being a 1 to OR 112 thereby forming the output image of FIG. 37G or 37H at the output thereof. With bit 61 being a 0, the image of FIG. 37G appears on the the line labeled G.

All the control bits mentioned above with respect to the example illustrated in FIG. 37 are bits in the front section control register 56. All bits not specifically mentioned are set to a 0. For the remaining discussion, the control register bits are those from the rear section control register 58. For this example, however, the bits in the front section control register 56 are the same as those in the rear section control register 58. In most situations, the bits in one section of the control register will not be the same as those in the other section.

Referring now to a rear section illustrated in FIG. 39, the image of FIG. 37H is input to the rear section on the line labeled H. The hardware is operative to produce the image of FIG. 37I on the line labeled I. This image is rejoined with the inverse original image to produce the rejoin bit on the line labeled R. The image of FIG. 37K appears on the line labeled K. That image is ANDed with the original image of FIG. 37H to form the image of FIG. 37L on the line labeled L. The images on line L and R are first ORed and the resulting image is ORed with the image on line I to form the image of FIG. 37N on the line N.

To summarize the operation of a single front section and a single rear section of the universal image processing module of the present invention, the module can be programmed to perform a skeleton operation on an image such as illustrated in FIG. 37A. By proper selection of the control signals, the contract-expand-join method of producing a skeleton as illustrated in FIG. 37 can be produced. It should be noted here as well that the image of FIGS. 37F and 37M are not actually produced by the hardware of FIGS. 38 and 39. However, the logic of those Figures could easily be modified by those skilled in the art to do so if such were desired.

Figure 40:
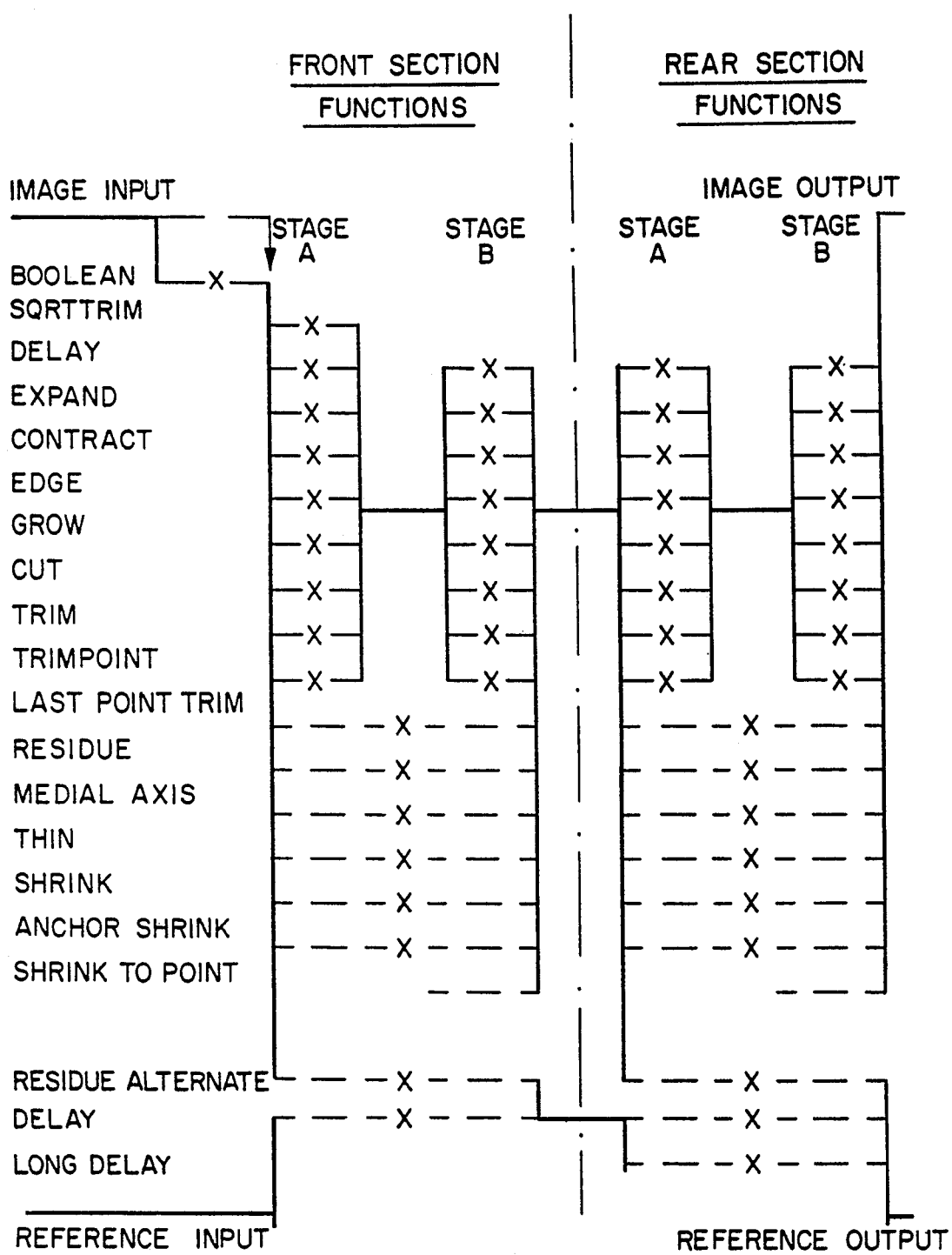
FIG. 40 illustrates various operations which may be performed using the circuit configuration of the present invention.

In addition to the foregoing function relating to skeletonizing an image feature, numerous other functions can be performed by the universal image module of the present invention. Some of these functions are illustrated in FIG. 40. More particularly, FIG. 40 illustrates the some useful combinations of functions that are possible to program in the front and rear sections. This figure should be interpreted as defining a path starting on the left or input side and extending to the right or output side where no more than one line can be drawn from left to right in any stage.

Boolean Function

Referring again to FIG. 9, Image 1, Image 3 and the reference image at inputs 100, 102 and 104 respectively are conveyed by wires 106, 114 and 120 to Exclusive OR gates 108, 116 and 122. These Exclusive OR gates 108, 116 and 122 provide for the inversion of the input images whenever the second input thereto is a logical one. The output of the Exclusive OR gates 110, 118 and 124 pass the respective image or inverted image to the Boolean function block 126 in Stage A which has been illustrated in FIG. 16 and was previously discussed in connection therewith. The output of the Boolean function block 126 appears at 128. The list of functions available for the Boolean function block 126 has previously been illustrated with respect to FIG. 17 for a positive sense image. The output connection 128 feeds a 3×3 shift register 130 which provides the input to all of the other functions outlined in FIG. 40.

Delay Function Stage A

In some applications, there may be a need to simply delay an image as it flows through a pipeline of concatenated image processing modules of the present invention, to keep the image in spatial coincidence with another image synchronously flowing through another parallel pipeline. The image is available in the center pixel of the 3×3 neighborhood window 130 which is coupled via line 132 to the gated OR block 152. The second input to the gate comprises bit 33 of the front section control register. When bit 33 is a 1, the image on the line 128 is available at the OR block output line 166. The output at line 166 has been delayed by the amount of time for two successive pixels to appear at line 128. This delay is produced by the arrangement of the 3×3 window 130. It will be understood that, since only a delay function is desired, the bit positions 28–32 of the front section control register are 0 so as to assure that the OR circuit 152 is active solely on the pixel data appearing on line 132.

Expand Function Stage A

The Expand function operates on the 3×3 neighborhood window in shift register 130 to provide a plurality of dilation functions at the gated OR output 166. The expand block 136 receives 8 of the pixels appearing on bus 134. The function is selected by the front section control register bits 14–18. FIG. 19A illustrates the logic network of the expand block 136 and FIG. 18 illustrates the various dilation functions available through the programming of bits 14–18 of the front section control register. A full expansion operation will provide a 1 for the central pixel when any of the contiguous pixels in the window is a 1. A cross or four connected expansion will provide a 1 in the center pixel when any of the horizontal or vertical adjacent pixels are a 1. A three way and two way expansion operates in a similar manner and are provided in complementary form to provide symmetry for successive similar operations. As previously noted, the expand function generator 136 does not provide for transfer of the input image center pixel. The contiguous expand image at the output line 146, however, is gated by the front section control register bit 32 into the gated OR block 152. The input image center pixel is gated into the OR block 152 via the control provided by the front section control register bit 33 as previously described. Bits 28–31 and 34 are set to a 0 whenever only an expand function is selected as the operation of Stage A of the circuitry illustrated in FIG. 9.

Contract Function Stage A

The previously defined expand functions are operative on a positive sense image. However, if a negative sense image is applied thereto, the expand unit 136 performs a contraction operation. This is accomplished in accordance with the configuration of FIG. 9 by setting either front section control register 1, 2 or 3 to a 1 and at the same time having bit 35 a 1 as well.

Edge Function Stage A

The edge function produces a 1 in the output image at 166 whenever there is a 0 in the input image and the contiguous neighborhood contains a 1 in the full, cross, 3-way or 2-way selected regions. This is accomplished by having a positive sense image available at 130, ANDing the contiguous expand function 146 with the inverse of the window center pixel found on line 132 in gate 148 and gating the result into the OR block 152 via the control register bit 31 being set to a 1. This provides the "outside edge" of the feature in the image. The inside edge can be provided by operating on the inverse of the input image.

Grow Function Stage A

The grow function expands the input image only in regions designated by a reference image. This function is similar in circuit connection and control to that in the expand functions except that the contiguous expand image output on line 146 is gated at AND block 150 with the delayed reference image on line 154. The reference image on line 104 is synchronized with the input image window 130 by data from the shift register 156. The AND block 150 output line containing the designated region expansion image is gated with the front section control register bit position 30 into the OR block 152. The input image on the line 132 is also gated with control register bit 33 into the OR block 152. The grow image is available at line 166.

Cut Function Stage A

The cut function is the inverse of the grow function. The input image is contracted in regions under control of the reference image. By inverting the input images at inputs 100 and/or 102 but not the reference image, a controlled growth of the inverse image takes place as above. The output image on line 166 is then inverted by Exclusive OR gate 169 when the control register bit position 35 is set to a 1, thereby providing the cut function on line 168.

Square Root of 2 Trim Stage A

The square root of 2 trim function (SQRTTRIM) is a special function in Stage A of each front section that generates a single pixel horizontal and vertical lines from skeletonized lines. Further, it adds or removes double pixels along skeletonized diagonal lines under the control of front section control register bits 11, 12 and 13. The trim function, to be described below, will end trim these lines such that the length of the lines can be determined by counting the number of trimming operations required to delete the line. Therefore, diagonal lines must be approximately 1.4 times the length of the line in pixels. This is accomplished by use of the circuit found in FIG. 21. The full 3×3 window 130 is presented at the inputs, A, B, C, D, E, F, G, H and *. The front section control register bit 11 when set to a 1, will cause the additional diagonal pixel to be added to the input image diagonal skeleton. If front section control register bit 11 is a 0, however, the addition to the diagonal is not made and may be deleted.

As previously mentioned, there are three control lines for controlling the square root of two trim unit.

Control line 11 controls the topmost section and every 3rd section below it. Control line 12 controls the second from the top section and every third section thereafter. Control line 13 controls the third from the top section and every third section there below. Typically, however, only 2 such control lines are set for controlling the square root of 2 trim units 138 of different sections. The output of the square root of 2 trim units 138 is gated by front section control register bit 34 into the OR gate 152.

Trim and Trimpoint Function Stage A

The image in the 3×3 shift register 130 is available to the trim unit 140 over bus 134. The front section control register bits 19-27 control the various trim options available in the trim logic which is illustrated in FIG. 22. This trim unit operates on the inverse image found in the shift register 130 because the skeleton functions described later use the trim block and the expand block in contraction mode simultaneously. The trim operation is based upon saving desired portions of the image feature and discarding the remainder. FIG. 22 blocks 560, 562, 564 and 566 respectively perform the center pixel saving illustrated in FIGS. 24-27. The saved pixel appears on the output line 160 and the trimmed pixel appears on the output line 158. As illustrated in FIG. 9, the trimmed pixel appearing on line 158 is gated by control register bit 28 and the saved pixel line 160 is gated by front section control register bit 29 into OR block 152. Accordingly, the desired image can be selected.

FIG. 40 is illustrates that the above mentioned functions can be produced by the circuitry in the first or A stage of a section and, except for the square root of 2 trim and boolean functions, the same functions can also be produced by the second or B stage of a section. The expand unit 136 and the trim unit 140 are essentially repeated in the second stage of a section and comprise expand unit 180 and trim unit 182.

The first stage output image appears on line 168 and is fed into a 3×3 shift register 170. The window contained thereby is available on the bus 176 for the expand, trim and rejoin units of the second stage.

Delay Function Stage B

The image appearing on the line 168 can be delayed by placing it into shift register 170 and gating the center pixel thereof on line 172 to OR gate 112 under the control of front section control register bit 56. The delayed output appears at the output of OR gate 112 and is passed by Exclusive OR gate 238 to the output line 240 when the front section control register bit 61 is a 0.

Function Stage B

The expand unit 180 is illustrated in detail in FIG. 19D and is controlled by the front section control register bit positions 37-41. The contiguous neighborhood expansion function appears on the output line 202 in a similar manner as the first or A stage expansion function appears on line 146. The image is gated into the second stage OR block 112 by means of the gate controlled by bit position 55 of the front section control register. The image in the shift register 170 is also gated into block 112 via a gate controlled by bit position 56 of the front section control register. The OR block expanded image output is maintained in the positive sense on line 240 by having bit position 61 of the front section control register a 0.

Contract Function Stage B

The contraction function is the same as the expansion function set forth above except that the Exclusive OR blocks 169 and 238 require their respective control register bits 35 and 61 to be set to a 1 to provide a negative sense image.

Edge Function Stage B

The edge function is obtained by joining the expand block 180 output image on line 202 with the inverse of the image in the shift register 170 at gate 174 and gating its output into OR block 112 utilizing control register bit 54.

Grow Function Stage B

The grow function of the B stage is similar to that of the first or A stage. The reference image on line 104 passes through the shift register delays 156 and 210. This delaying of the reference image is required to synchronize the reference image on line 208 with the modified input image as it emerges from the expand unit 180 on line 202. The image on lines 202 and 208 are ANDed together in AND gate 206 and gated into OR 112 by front section control register bit position 53. The image on line 172 under control of bit position 56 is also gated into OR 112. The ORed images appear in the positive sense at the output line 240 when control register bit 61 is a zero.

Cut Function Stage B

By setting control register bits 35 and 61 to a one to provide a negative sense image, the grow function as described above becomes a Cut function.

Trim and Trimpoint Function Stage B

The second or B stage window bus 176 feeds the trim unit 182. This block is illustrated in greater detail in FIG. 23. The respective blocks 570, 572, 574, and 576 of FIG. 23 contain the logic to save the center pixel of the window for the combinations respectively found in FIGS. 28-31. Output 214 carries the saved pixels and the output on line 216 represents the trimmed pixels. This trim logic is implemented in positive sense since the second stage trim unit 182 is not intended to operate simultaneously in connection with the expand unit 180.

The trim outputs 214 and 216 are respectively gated into the OR circuit 112 under control of control register bit positions 59 and 60 respectively. The output appears on line 240 in the positive sense when the control bit 61 is a zero.

Double Stage Functions

FIG. 40 illustrates that the output from the Boolean function generator 126 can be followed by several functions which require the logic of both stage A and stage B. These functions require a specific operation to be specified for each stage.

Residue

The fine features of an image can be extracted by placing the inverse of image 1 or the inverse combination of image 1 and image 2 on line 128 and into the shift register 130. By performing a contraction operation, the contracted image will appear on line 168. This image is then expanded in the second or B stage and appears on line 204 in inverse form. Shift register 130 has its center pixel on line 132 which couples to another shift register 184 the central pixel of which is synchronized with the contracted-expanded-negated image on line 204. These two images are ANDed in gate 190 to form the residue or small feature image which is gated into OR gate 200 when control register bits 51 and 52 are a one. The residue image passes over line 234 to OR gate 112 and the residue image is available on line 240 when control register bit position 61 is a zero.

Medial Axis

This function provides the joining of the residue fine features with the contracted image. A series of these operations will retain the fine features and extract further fine features as they are produced from the continually contracted image. The resulting image is a symmetric unconnected skeleton. This is accomplished by ORing the image on line 234 with the contracted image appearing on line 172 which will occur when control register bit position 56 is a one.

Thin

This function provides the joining of the medial axis image features as they are formed by saving the input pixels satisfying a minimal connection between the contraction features or between the contraction and residue features. This is accomplished in the dual neighborhood rejoin unit 178. The second input image holding shift register 184 provides synchronization of the input image on bus 192 with the contracted input image from shift register 170 which is available on bus 176. The logic of the rejoin unit 178 provides a save pixel for the dual window cases illustrated in FIGS. 33-36. Control register bit 36 is set to a one to activate the additional rejoin coverage required in the 4 way contracted skeletons. The rejoin pixel on line 198 is gated into OR 200 by control register bit position 58 being a one and is ORed with the residue coming from AND gate 190 when control register bit positions 51 and 52 are a one. The output of OR gate 200 on line 234 is further combined in OR gate 112 with the contracted image appearing on line 176 when control bit position 56 is a one. With control bit position 61 being a zero, the thin function output will appear on line 240.

Shrink

Shrinking of an image comprises the trimming of the residue or fine features produced during the above mentioned thinning operations. To accomplish this, the input on line 198 to the OR gate 200 for the thinning operation described above is ORed with a trimmed input image residue appearing at the output of AND gate 212, control register bit positions 51 and 58 being a one and bit position 52 is a zero. This trimmed input image residue is produced by first trimming the input image in trim unit 140. The trimmed image on line 160 is delayed by shift register 162 and appears on line 187 which comprises one input of gate 212. The second input thereto comprises the contracted-expanded-negated image on line 204. Gate 212 produces the residue of the trimmed input image in the same manner as gate 190 produces the residue of the original input image.

Shrink To A Point

Use of the above Shrink function can result in an image feature being shrunk to extinction. It may sometimes be desirable to retain the last pixel of the shrinking image. This is accomplished by further testing of the trimmed input image found on line 160. The trimmed input image is effectively expanded horizontally via the OR gate 218 which operates on row bus 220 and then expanded vertically by NOR gate 228 operating on input lines 226, 230 and 232. The expanded trimmed image is inverted to inhibit the original input image from line 186 at gate 188. If the trimmed image is null because the last pixel of a feature was trimmed, that pixel would be enabled to pass through block 188. Control register bit 10 being set to a one will gate the last bit of the skeleton into OR gate 200. This last bit is also referred to as the "shrink to a point bit."

Anchored Shrink

In a similar fashion, it may be desirable to limit the shrinking operation to certain regions defined by a second image. This can be accomplished by two means. The first is to use the abovementioned first stage Cut function under control of an inverse reference image. The second means is to OR back into the shrinking image, the reference image pixels that may have been deleted. This is accomplished when the reference image at input 104 delayed by shift registers 156 and 210 is applied to the OR gate 112 when the control register bit 57 is a one.

Last Point Trim

The above mentioned first or stage A trim operation can trim the last pixel or pixels from an image feature. It sometimes is desirable to save and record this information. The first stage trimmed image is tested in the second stage for being null and the original image pixels are restored. This can be accomplished by two means. The first is by employing the abovementioned Last Point Shrink operation utilizing OR gates 218 and 228 and AND gate 188 with the appropriate control register bits set. The second approach is to pass the trimmed image on line 160 gated by control bit 29 through OR gate 152 to the Expand unit 180. The expanded null image is a null image which is inverted on line 204. This enables gate 190 to pass the original image to OR gate 200 when control register bits 51 and 52 are set to one.

Reference Image Functions

The normal function of output line 242 is to carry the reference image forward into the next section of logic. However, it can be used as the alternate output of the partial image from OR gate 200 when control register bit position 63 is a 1.

FIG. 9A illustrates an alternative section to that shown in FIG. 9. This alternative is reduced in function compared to the section of FIG. 9 in that FIG. 9A does not have the Boolean function, the Square Root of Two Trim function or the second Trim function found in the section of FIG. 9. Additionally, the wiring is considerably simplified as the first combiner is no longer needed and other simplifications have been made. The functionality that remains, however, is the same as provided by the portions of FIG. 9A which are in FIG. 9 when not actuated in concert with functions of FIG. 9 that are not present in FIG. 9A. In other words, the circuit of FIG. 9A provides a meaningful subset of the functions of the section illustrated in FIG. 9. Those of skill in the art can readily discern from the circuitry of FIG. 9A and knowledge of the circuitry of FIG. 9 exactly the functions made available in a section of the type illustrated in FIG. 9A.

Referring now to FIG. 41, a typical scanner of the type used in connection with the present invention is illustrated at 400. The scanner 400 includes a plurality of optical scanner devices 402. Each scanner device 402 is focused on a point on a sheet like article 404 which is moved under the scanner devices 402 in a direction indicated by arrow 406 by any suitable sheet moving apparatus(not shown). Accordingly, as the article 404 is moved, each of the scanner devices 402 scans the portion of the article 404 along a scan line 408 disposed thereunder. If the scanner devices 402 are disposed close enough together, the area scanned by one scanner device 402 will border on the area scanned by each adjacent scanner so that the area scanned by all of the scanner devices 402 encompasses all of the surface of the article 406. By strobing the output of the scanner devices 402 at a rate commensurate with the rate of article 404 movement relative to the scanner, the data appearing on the lines 410 comprises a digital representation of the value of the scanner means 402 output at the time of the strobe. Each such digital representation has been referred to elsewhere in this patent application as a pixel. The pixels are gated into the first image processing stage which is illustrated in part by the circuitry inside dotted line 412. That circuitry is more particularly illustrated in FIG. 9 or in FIG. 44.

Referring now to FIG. 42, three (3) simplified stages each including a contractor (CON.), an expander (EXP.) and a joiner (JOIN) are shown in a concatenated configuration. With this hardware configuration, a shrink operation as illustrated in FIG. 43 can be performed in fewer stages than could be achieved using a configuration such as in FIG. 9.

It should be noted that many of the lines drawn in FIG. 42 are actually buses that can be readily identified by looking at FIG. 9 which is a similar configuration. It should also be noted that some of the buses in FIG. 42 may require delay elements therein which have not been illustrated. This has been done deliberately as those of skill in the art of image processing will readily recognize when such delays are required in order to align, in time, one image with another.

In FIG. 44, an alternative image processing stage in accordance with the present invention is illustrated. This image processing stage is easily concatenated and operates in a manner so that the image processing operation desired can frequently be achieved by fewer stages than is possible using a configuration as typified by FIG. 9.

The image processing stage illustrated in FIG. 44 has an image input illustrated at 430 and an image-1 contract input illustrated at 432. Input 434 comprises an image-1 and input 436 comprises a reference input. In the case of the first image processing stage in a chain of image processing stages concatenated together, the input 434 would be coupled to either an up or down level signal as the state of this line is not critical and the input 432 would be coupled to input 430. Input 430 would be coupled to a source for image data such as one line 410 as illustrated in FIG. 41 while the input on line 436 would be coupled to a source of reference image data which may comprise another scanner as illustrated in FIG. 41 which is scanning a master having a known perfect pattern. The reference data on line 436 may come from any other suitable source such as a digital memory or the like which stores all of the pixel information for the reference image.

The original image on line 430 is coupled to an Exclusive OR gate 438 which serves as a gateable inverter to allow the original image on line 430 to either be gated to line 440 or to be inverted and applied to line 440 depending on whether bit position 1 of the control register, indicated by the circle with a 1 in it, is a 0 or a 1 respectively. The line 440 couples to a suitable neighborhood delay line 442 which is coupled to adjacent stages in a manner as illustrated in FIG. 9, for example, to form a neighborhood storing means for storing a 3 by 3 array of pixels. This array is applied to 3 by 3 bus 444 and comprises the data input to the expander 446, the square root of two trim unit 448, the trim unit 450 and the image input of the rejoin unit 452.

The image-1 contract input on line 432 is coupled to a neighborhood delay line means 454. This neighborhood delay line means 454 is also appropriately coupled to adjacent stages as illustrated in FIG. 9 to produce on bus 455 a 3 by 3 pixel image. The image-1 contract on bus 455 is applied to a second input to the rejoin unit 452, the expander 456 and the contractor 458.

The expand unit 446 comprises a circuit of the type illustrated in FIG. 45. This expand unit 446 is capable of performing all the functions illustrated in FIG. 18 under the control of control bit positions 14-18 as illustrated in FIG. 19B. The first output 500 from the expand unit 446 couples to the gated AND gate illustrated as a circle with a 32 in it which denotes an AND gate which has two inputs thereto, one being the data on line 500 and the other being the control bit 32. The first output 500 also couples to two other AND gates 502 and 504. The second output 506 of the expand unit 446 couples to one input to a two input AND gate 508. The second input to AND gate 508 couples to the output of the two pixel delay 510 which responds to input 434. The output of the AND gate 508 couples to the gated input illustrated as a circle with a 10 in it indicating that the AND gate 508 output is gated into the combiner 512 when control bit 10 is a one.

The central or * pixel of the neighborhood in neighborhood delay line 442 is coupled by line 514 to the input 434(not shown) of the next image processing stage concatenated with the stage illustrated in FIG. 44. The * pixel is also coupled to the gated AND illustrated by the circle with a 33 in it so that when the control bit 33 is a 1, the * pixel will be gated into the combiner 512. The * pixel from delay line 442 also couples to one input of a 2 input AND gate 516. The * pixel from the delay line 442 also couples to the inverting input to the AND gate 502. The output of this AND gate 502 couples to the gated input illustrated as a circle with a 31 in it which, when control bit 31 is a one, gates the output of AND gate 502 into the combiner 512.

The input 436 couples to a 2 pixel delay line 518 whose output couples via line 520 to the AND gate 504, the gated input comprising a circle with a 57 in it and to the input line 436 of the next stage(not shown) which couples to point 522. The AND gate 504 has its output coupled to a gated input illustrated as a circle with a 30 in it. This gated input serves to produce an active output of the combiner 512 whenever the two inputs to the AND gate 504 are both a 1 and the control register bit position 30 is also a 1 which will be the case when a "GROW" function is desired. When the delayed reference signal is desired to be output from the combiner 512, the signal on line 520 is gated by the gated input with a 57 in it into the combiner 512 to produce the reference signal delayed by two pixels at the combiner output 524.

When a square root of two trim is specified, the control register bit positions 11,12 or 13 are set to the particular function desired to be selected in the manner discussed above in connection with FIG. 21. Indeed, the square root of two trim unit 448 is the same as that illustrated in FIG. 21. The output of the square root of two trim unit 448 is gated into the combiner 512 by the bit position 34 from the control register by the AND gate indicated as a circle with a 34 in it.

The trim unit 450 is illustrated in FIG. 23. The output 216 thereof is coupled to the combiner 512 by an AND gate indicated by a circle with a 60 in it. Under the convention established herein, the signal on output 216 is gated into the combiner 512 when bit 60 from the control register is a 1. Similarly, output 214 from the trim unit 450 is coupled to the combiner 512 by the AND gate indicated by the circle with a 59 in it. The output 214 is gated into the combiner 512 when control register bit position 59 is a 1.

The rejoin unit 452 is illustrated in FIG. 46. This rejoin unit 452 is somewhat similar in design and is connected somewhat differently from the rejoin unit of FIG. 32. Additionally, the function performed by the rejoin unit 452 is somewhat different from that illustrated in FIGS. 33–36 for the rejoin unit of FIG. 32. Specifically, the rejoin unit 452 as illustrated in FIG. 46 operates in a manner so that where the "negative original image" appears in FIGS. 34–36, the positive sense original image is applied to the circuitry of FIG. 46. Additionally, wherever there is a zero (0) in the negative original image of FIGS. 34–36, for the operation of FIG. 46, a one (1) should appear. As a result as illustrated by FIG. 34 (a) as modified as indicated above if the A bit position for the contracted image is 1, the B and H bit positions of the contracted image is 0 and the DD position of the original image on bus 444 is a 1, then the  pixel on the bus 444 is passed unchanged to line 530. The other possible outputs on line 530 can be easily figured out considering the above described modifications to the illustrations of operation as found in FIGS. 33-36**.

The output of the rejoin unit 452 on line 530 couples to the combiner 512 via the AND gate illustrated as a circle with a 58 in it. In keeping with the convention herein established, the output of the rejoin unit 452 is gated into the combiner 512 whenever bit position 58 of the control register is a one(1).

The * pixel from the neighborhood means 454 is coupled via a wire 531 to an AND gate indicated as a circle with a 56 in it. When the bit position 56 of the control register is a one(1), the * pixel on line 530 is gated into the combiner 512.

The output of the expand unit 456 on line 536 couples to an input of AND gate 516 and an input to AND gate 538. The other input to AND gate 516 couples to the * pixel of neighborhood 442. The output of AND gate 516 couples to a circle with an A in it which by convention comprises an AND gate which, in this case is a 3 input AND gate. The other two inputs, as mentioned in FIG. 5, comprise control register bits 51 and 52. Hence, when the output on line 536 is a 1 and control register bits 51 and 52 are also a 1, the * pixel (a 1 in this case) is gated into the combiner 512.

The output of the expand unit 456 which couples to AND gate 538 is ANDed with the output of the Trim unit on line 214 to form an input to the AND gate indicated as a circle with a 51 in it. When control register bit position 51 is a one and the output of AND gate 538 is a one, the trimmed pixel (a 1 in this case) is gated into the combiner 512.

The expand unit 456 is illustrated in FIG. 47. The expand operations that this unit 456 can perform are illustrated in FIG. 18 and the particular control bit combinations for control bits 37–41 to accomplish these functions is illustrated in FIG. 19C. In the event that only 8 way logic were desired, the expand unit 456 could be replaced by a 9 input NOR gate of the inputs A, B, C, D, E, F, G, H and *.

The contractor 458 of FIG. 44 has an output on line 540 which comprises one output of the image processor stage. The circuit of FIG. 48A illustrates a simple form of contractor which performs an 8 way contract- (CON8). The circuit of FIG. 48B comprises a programmable contracter which performs the various contract functions labeled in FIG. 49A for the indicated values of control bits 19–23. The labeled contract functions are illustrated in FIG. 49B. This figure should be interpreted in the following manner using the CON4 function as an example. In this case, when the input neighborhood has a one for bits B, D, F, and H, the * pixel is transmitted to the output of the contracter 458 on line 540. The remaining bits in the neighborhood which are unmarked in FIG. 49B for the CON4 function have no effect on the state of the output on line 540 as will be clear from the circuit of FIG. 48B.

As mentioned above, the image processing stages of the type illustrated in FIG. 44 can easily be coupled together to perform various image processing functions. FIG. 50 illustrates how FIGS. 50A and 50B are to be connected together to show four series connected stages of the type shown in FIG. 44. The operation of these coupled stages is illustrated in FIGS. 51A–51V. The lead lines in FIGS. 50A and 50B identify the points of interest in the circuit and those points have images thereat which correspond to one of the images illustrated in FIGS. 51A–51V. For example, the input image A in FIG. 50A is illustrated in FIG. 51A. The output of the last stage for the input image and the identified control bits being on is illustrated in FIG. 51V. The images at selected points between the input and the output are illustrated in FIGS. 51B-51U.

From this discussion, those of skill in the art will readily recognize that the image processing stage illustrated in FIG. 44 can be coupled together with other stages of the same design to perform many different image processing functions which can be utilized in many well known applications for image processors. It will also be recognized that the design of the image processing stages as illustrated in FIG. 44 are suitable for performing many programably selected image processing functions thereby making the image processor of the present invention highly flexible and thus suitable for multiple applications without requiring any hardware changes.

Those of skill in the art will readily recognize that the logic configuration of the present invention illustrated in the Figures represent the preferred embodiment of the invention and that modifications, other than those already suggested above, can be easily made without departing from the spirit and scope of the present invention as defined by the following claims.

What is claimed is:

1. An image processing section suitable to be arranged in an array and capable of performing an image processing function, each said image processing section comprising, in combination:

means to receive in sequence a stream of bits, one bit at a time, from one of a plurality of scan lines, each scan line comprising a plurality of bits representative of a line of pixels of an input image;

first neighborhood means responsive to said means to receive and the means to receive from the sections adjacent thereto in said array to produce a first neighborhood of bits with a central bit;

a contraction means responsive to said first neighborhood of bits to produce a contract bit which is related to said neighborhood of bits input thereto by a contract function performed by said contract means;

second neighborhood means responsive to said contract bit and to said contract bit from the sections adjacent thereto in said array to produce a second neighborhood of bits with a central bit;

an expand means responsive to said second neighborhood of bits to produce an expand bit which is related to said second neighborhood of bits input thereto by the expand function performed by said expand means;

third neighborhood means responsive to said stream of bits to produce a third neighborhood of bits with a central bit;

said expand means including means to produce the inverse of said expand bit; and AND gate responsive to said central bit of said third neighborhood and to the inverse of said expand bit to produce a fine image bit, whereby said fine image bit is related to the bits input to said section by the image processing operation which is performed by the section.

2. The image processing section of claim 1 additionally including:

an OR gate combiner means responsive to said fine image bit and said contract bit for combining said inputs thereto to produce a second combined bit whereby said second combined bit comprises the output of said section which is related to the bits input to said section by the image processing operation which is performed by the section.

3. The image processing sections of claim 2 additionally including:

said third neighborhood means being additionally responsive to the stream of bits entering the sections adjacent thereto to produce a third neighborhood of bits with a central bit;

a rejoin means responsive to said second and third neighborhoods of bits to produce a rejoin bit which is related to the second and third neighborhoods of bits input thereto by the rejoin function performed by the rejoin means; and said OR gate combiner means additionally responsive to the rejoin bit for combining said inputs thereto to produce a second combined bit.

4. An image processing section suitable to be arranged in an array and capable of performing an image processing function, each said image processing section comprising, in combination:

means to receive in sequence a stream of bits, one bit at a time, from one of a plurality of scan lines, each scan line comprising a plurality of bits representative of a line of pixels of an input image;

first neighborhood means responsive to said means to receive and the means to receive from the sections adjacent thereto in said array to produce a first neighborhood of bits with a central bit;

a contraction means responsive to said first neighborhood of bits to produce a contract which is related to said neighborhood of bits input thereto by a contract function performed by said contract means;

a second neighborhood means responsive to said contract bit and to said contract bit from the sections adjacent thereto in said array to produce a second neighborhood of bits with a central bit;

an expand means responsive to said second neighborhood of bits to produce an expand bit which is related to said second neighborhood of bits input thereto by the expand function performed by said expand means;

a trim means responsive to said first neighborhood of bits to produce a trim bit which is related to said neighborhood of bits input thereto by a trim function performed by said trim means;

third neighborhood means responsive to said stream of bits and the stream of bits entering the sections adjacent thereto produce a third neighborhood of bits with a central bit;

fourth neighborhood means responsive to said trim bit to produce a fourth neighborhood of bits with a central bit;

AND gate responsive to said fourth neighborhood central bit and to the inverse of said expand bit to produce a trimmed fine image bit;

a rejoin means responsive to said second and third neighborhood of bits to produce a rejoin bit which is related to the second and third neighborhood of bits input thereto by the rejoin function performed by said rejoin means; and OR gate combiner means responsive to said trimmed fine image bit, said contract bit and rejoin bit for combining said inputs thereto to produce a second combined bit whereby said second combined bit comprises the output of said section which is related to the bits input to said section by the image processing operation which is performed by the section.

5. The image processing sections of claim 4 wherein:

said fourth neighborhood means is additionally responsive to said trim bits from the sections adjacent thereto to produce a fourth neighborhood of bits with a central bit;

said trim means additionally including means to produce an inverse of said expanded trim bit;

said image processing sections additionally including:

a second expand OR gate responsive to said fourth neighborhood of bits to produce an expanded trim bit;

AND gate responsive to the inverse of said expanded trim bit and the central bit of the third neighborhood of bits to produce a last trim bit; and said OR gate combiner means is additionally responsive to said last trim bit for combining said inputs thereto to produce a second combined bit.

6. The image processing sections of claim 4 additionally including:

second means to receive in sequence a second stream of bits, one bit at a time, from one of a plurality of scan lines, each scan line comprising a plurality of bits representative of a line of pixels of a second input image;

a delay means responsive to said second receiving means to to produce a delayed second image bit thereby forming an input for a following image processing section; and said OR gate combiner means is additionally responsive to the delayed second image bit for combining said inputs thereto to produce a second combined bit.

7. An image processing section suitable to be arranged in an array and capable of performing an image processing function, each said image processing section comprising, in combination:

means to receive in sequence a stream of bits, one bit at a time, from one of a plurality of scan lines, each scan line comprising a plurality of bits representative of a line of pixels of an input image;

first neighborhood means responsive to said means to receive and the means to receive from the sections adjacent thereto in said array to produce a first neighborhood of bits with a central bit;

a selectable contraction means responsive to said first neighborhood of bits to produce a contract bit which is related to said neighborhood of bits input thereto by a selectable one of a plurality of contract functions;

second neighborhood means responsive to said contract bit and to said contract bit from the sections adjacent thereto in said array to produce a second neighborhood of bits with a central bit;

a selectable expand means responsive to said second neighborhood of bits to produce an expand bit which is related to said second neighborhood of bits input thereto by a selected on of a plurality of selectable expand function performed by said selectable expand means;

third neighborhood means responsive to said stream of bits to produce a third neighborhood of bits with a central bit; and AND gate responsive to said central bit of said third neighborhood and to the inverse of said expand bit to produce a fine image bit, whereby said fine image bit is related to the bits input to said section by the image processing operation which is performed by the section.

8. The image processing sections of claim 7 additionally including:

a selectable AND/OR gate second combiner means responsive to said fine image bit and said contract bit for combining said inputs thereto to produce a combined bit whereby said second combined bit comprises the output of said section which is related to the bits input to said section by the image processing operation which is performed by the section.

9. The image processing sections of claim 8 additionally including:

said third neighborhood means being additionally responsive to the stream of bits entering the sections adjacent thereto to produce a third neighborhood of bits with a central bit;

a selectable rejoin means responsive to said second and third neighborhoods of bits to produce a rejoin bit which is related to the second and third neighborhoods of bits input thereto by the selectable rejoin function performed by the selectable rejoin means; and said selectable AND/OR gate combiner means additionally responsive to the rejoin bit for combining said inputs thereto to produce a second combined bit.

10. An image processing section suitable to be arranged in an array and capable of performing an image processing function, each said image processing section comprising, in combination:

means to receive in sequence a stream of bits, one bit at a time, from one of a plurality of scan lines, each scan line comprising a plurality of bits representative of a line of pixels of an input image;

first neighborhood means responsive to said means to receive and the means to receive from the sections adjacent thereto in said array to produce a first neighborhood of bits with a central bit;

a selectable contraction means responsive to said first neighborhood of bits to produce a contract bit which is related to said neighborhood of bits input thereto by a selectable one of a plurality of contract functions;

second neighborhood means responsive to said contract bit and to said contract bit from the sections adjacent thereto in said array to produce a second neighborhood of bits with a central bit;

a selectable expand means responsive to said second neighborhood of bits to produce an expand bit which is related to said second neighborhood of bits input thereto by a selected on a plurality of selectable expand function performed by said selectable expand means;

a selectable trim means responsive to said first neighborhood of bits to produce a trim bit which is related to said neighborhood of bits input thereto by a selectable trim function performed by said trim means;

third neighborhood means responsive to said stream of bits and the stream of bits entering the sections adjacent thereto to produce a third neighborhood of bits with a central bit;

fourth neighborhood means responsive to said trim bit to produce a fourth neighborhood of bits with a central bit;

AND gate responsive to said fourth neighborhood central bit and to the inverse of said expand bit to produce a trimmed fine image bit;

a selectable rejoin means responsive to said second and third neighborhood of bits to produce a rejoin bit which is related to the second and third neighborhood of bits input thereto by the selectable rejoin function performed by said rejoin means; and a selectable AND/OR gate combiner means responsive to said trimmed fine image bit, said contract bit and rejoin bit for combining said inputs thereto to produce a second combined bit whereby said second combined bit comprises the output of said section which is related to the bits input to said section by the image processing operation which is performed by the section.

11. The image processing sections of claim 10 additionally including:

fourth neighborhood means additionally responsive to said trim bits from the sections adjacent thereto to produce a fourth neighborhood of bits with a central bit;

a second expand OR gate responsive to said fourth neighborhood of bits to produce an expanded trim bit;

AND gate responsive to the inverse of said expanded trim bit and the central bit of the third neighborhood of bits to produce a last trim bit; and said selectable AND/OR gate combiner means is additionally responsive to said last trim bit for combining said inputs thereto to produce a second combined bit.

12. The image processing sections of claim 10 additionally including:

second means to receive in sequence a second stream of bits, one bit at a time, from one of a plurality of scan lines, each scan line comprising a plurality of bits representative of a line of pixels of a second related input image;

a delay means responsive to said second receiving means to to produce a delayed second image bit thereby forming an input to the following image processing section; and said selectable AND/OR gate combiner means is additionally responsive to the delayed second image bit for combining said inputs thereto to produce a second combined bit.

13. An image processing section suitable to be arranged in an array and capable of performing an image processing function, each said image processing section comprising, in combination:

first means to receive in sequence a first stream of bits, one bit at a time, from one of a plurality of scan lines, each scan line comprising a plurality of bits representative of a line of pixels of an input image;

second means to receive in sequence a second stream of bits, one bit at a time, from one of a plurality of scan lines, each scan line comprising a plurality of bits representative of a line of pixels of a second related input image;

first selectable inverter means responsive to said means to receive to selectively invert said first stream of bits;

first neighborhood means responsive to said first selectable inverter output bit and the first selectable inverter output from the sections adjacent thereto in said array to produce a first neighborhood of bits with a central bit;

a first selectable expand means responsive to said first neighborhood of bits to produce a first expand bit which is related to said neighborhood of bits input thereto by a selectable expand function performed by said selectable expand means;

a first selectable combiner means responsive to the first expand bit and the the central bit of the the first neighborhood to produce a first combined bit;

second selectable inverter means responsive to said first selectable combiner output to selectively invert said first combined bit;

second neighborhood means responsive to said second selectable inverter output bit and to said second selectable inverter output bit from the sections adjacent thereto in said array to produce a second neighborhood of bits with a central bit;

a second selectable expand means responsive to said second neighborhood of bits to produce a second expand bit which is related to said second neighborhood of bits input thereto by the selectable expand function performed by said selectable expand means;

third neighborhood means responsive to said first selectable inverter output bit and to the said first selectable inverter output bits from the sections adjacent thereto to produce a third neighborhood of bits with a central bit;

AND gate responsive to the inverse of said central bit of said third neighborhood and to the inverse of said second expand bit to produce a fine image bit;

a selectable rejoin means responsive to said second and third neighborhoods of bits to produce a rejoin bit which is related to the second and third neighborhoods of bits input thereto by the selectable rejoin function performed by the selectable rejoin means;

a first selectable trim means responsive to said first neighborhood of bits to produce a first trim bit which is related to said neighborhood of bits input thereto by a selectable trim function performed by said trim means;

fourth neighborhood means responsive to said first trim bit and to the said trim bits from the sections adjacent thereto to produce a fourth neighborhood of bits with a central bit;

AND gate responsive to said fourth neighborhood central bit and to the inverse of said second expand bit to produce a trimmed fine image bit;

an expand OR gate responsive to said fourth neighborhood of bits to produce an expanded trim bit;

AND gate responsive to the inverse of said expanded trim bit and the central bit of the third neighborhood of bits to produce a last trim bit;

a selectable second combiner means responsive to said fine image bit, said trimmed fine image bit, said rejoin bit, said last trim bit, the central bit of the second neighborhood and the said delayed second image bit, for combining said inputs thereto to produce a second combined bit;

third selectable inverter means responsive to said first selectable combiner bit to selectively invert said second combined bit; whereby said third inverter bit comprises the first output of said section which is related to the bits input to said section by the image processing operation which is performed by the section; and a delay means responsive to said second receiving means to produce a delayed second image bit thereby forming a second output of said section.

14. The image processing sections of claim 13 additionally including:

said second selectable expand means additionally producing an auxiliary second expand bit, which is related to said neighborhood of bits input thereto by a selectable expand function performed by said expand means, said second selectable combiner means additionally responsive to the said auxiliary second expand bit, for combining inputs to form the second combined bit.

15. The image processing sections of claim 14 additionally including:

said first selectable trim means additionally producing an auxiliary first trim bit, which is related to said neighborhood of bits input thereto by a selectable trim function performed by said trim means;

said first selectable combiner means additionally responsive to the said first trim bit and auxiliary first trim bit, for combining inputs to form the first combined bit;

a second selectable trim means responsive to said second neighborhood of bits to produce a second trim bit and an auxiliary second trim bit which are related to said neighborhood of bits input thereto by a selectable trim function performed by said trim means;

said second selectable combiner means additionally responsive to said second trim bit and said auxiliary second trim bit, for combining inputs to form the second combined bit.

16. The image processing sections of claim 14 additionally including:

said second delay means additionaly producing an intermediate delayed second image bit;

AND gate responsive to said first expand bit and said intermediate delayed second image bit to produce a first grow bit;

said first selectable combiner means additionally responsive to the said first grow bit, for combining inputs to form the first combined bit;

AND gate responsive to said auxiliary second expand bit and said delayed second image bit to produce a second grow bit;

said second selectable combiner means additionally responsive to the said auxiliary second expand bit and said second grow bit, for combining inputs to form the second combined bit.

17. The image processing sections of claim 14 additionally including:

AND gate responsive to said first expand bit and inverse of said central bit of the first neighborhood to produce a first edge bit;

said first selectable combiner means additionally responsive to the said first edge bit, for combining inputs to form the first combined bit;

AND gate responsive to said auxiliary second expand bit and inverse of said central bit of the second neighborhood to produce a second edge bit;

said second selectable combiner means additionally responsive to the said second edge bit, for combining inputs to form the first combined bit.

18. The image processing sections of claim 14 additionally including:

a third selectable trim means responsive to said first neighborhood of bits to produce a square root of two trim bit which are related to said neighborhood of bits input thereto by a selectable trim function performed by said trim means;

said first selectable combiner means additionally responsive to the said square root of two bit, for combining inputs to form the first combined bit.

19. The image processing sections of claim 14 additionally including:

third means to receive in sequence a third stream of bits, related to the first stream of bits, one bit at a time, from one of a plurality of scan lines, each scan line comprising a plurality of bits representative of a line of pixels of an input image;

fourth selectable inverter means responsive to said means to receive the third stream of bits to selectively invert said third stream of bits;

a boolean combiner means disposed between the first selectable inverter and the first neighborhood, responsive to the first selectable inverter output and the fourth selectable inverter output, for logically combining inputs to form the input to the first neighborhood.

20. The image processing sections of claim 19 additionally including:

fifth selectable inverter means responsive to said means to receive the second stream of bits to selectively invert said second stream of bits;

the said selectable boolean combiner additionally responsive to the fifth selectable inverter output, for selectively logically combining inputs to form the input to the first neighborhood.

21. The image processing sections of claim 14 additionally including:

a selectable third combiner means responsive to said fine image bit, said trimmed fine image bit, said rejoin bit, said last trim bit and the said delayed second image bit, for combining said inputs thereto to produce a third combined bit which forms the second output of the section;

22. The image processing sections of claim 21 additionally including:

said second image delay means additionally producing an extended delay bit;

said third selectable combiner additionally responsive to said extended delay bit.

23. The image processing sections of claim 21 additionally including:

said second selectable combiner means additionally responsive to the said first receiving means for bypassing the first input to form the first combined bit;

said third selectable combiner means additionally responsive to the said second receiving means for bypassing the second input to form the second combined bit.

24. An image processing section suitable to be arranged in an array and capable of performing an image processing function, each said image processing section comprising, in combination:

first means to receive in sequence a first stream of bits, one bit at a time, from one of a plurality of scan lines, each scan line comprising a plurality of bits representative of a line of pixels of an input image;

second means to receive in sequence a second stream of bits, one bit at a time, from one of a plurality of scan lines, each scan line comprising a plurality of bits representative of a line of pixels of a second related input image;

a delay means responsive to said second receiving means to produce a delayed second image bit and an intermediate delayed second image bit;

first selectable inverter means responsive to said means to receive to selectively invert said first stream of bits;

first neighborhood means responsive to said first selectable inverter output bit and the first selectable inverter output from the sections adjacent thereto in said array to produce a first neighborhood of bits with a central bit;

a first selectable expand means responsive to said first neighborhood of bits to produce a first expand bit which is related to said neighborhood of bits input thereto by a selectable expand function performed by said selectable expand means;

a first selectable trim means responsive to said first neighborhood of bits to produce a first trim bit and an auxiliary first trim bit which are related to said neighborhood of bits input thereto by a selectable trim function performed by said trim means;

AND gate responsive to said first expand bit and said intermediate delayed second image bit to produce a first grow bit;

AND gate responsive to said first expand bit and inverse of said central bit of the first neighborhood to produce a first edge bit;

a first selectable combiner means responsive to the said first expand bit, said central bit of the first neighborhood, said first trim bit, said auxiliary first trim bit, said first grow bit and said first edge bit to produce a first combined bit;

second selectable inverter means responsive to said first selectable combiner output to selectively invert said first combined bit;

second neighborhood means responsive to said second selectable inverter output bit and to said second selectable inverter output bit from the sections adjacent thereto in said array to produce a second neighborhood of bits with a central bit;

third neighborhood means responsive to said first selectable inverter output bit and to the said first selectable inverter output bits from the sections adjacent thereto in said array to produce a third neighborhood of bits with a central bit;

fourth neighborhood means responsive to said first trim bit and to the said trim bits from the sections adjacent thereto in said array to produce a fourth neighborhood of bits with a central bit;

a second selectable expand means responsive to said second neighborhood of bits to produce a second expand bit and an auxiliary second expand bit which are related to said second neighborhood of bits input thereto by the selectable expand function performed by said selectable expand means;

a selectable rejoin means responsive to said second and third neighborhoods of bits to produce a rejoin bit which is related to the second and third neighborhoods of bits input thereto by the selectable rejoin function performed by the selectable rejoin means;

a second selectable trim means responsive to said second neighborhood of bits to produce a second trim bit and an auxiliary second trim bit which are related to said neighborhood of bits input thereto by a selectable trim function performed by said trim means;

AND gate responsive to said central bit of said third neighborhood and to the inverse of said second expand bit to produce a fine image bit;

AND gate responsive to said fourth neighborhood central bit and to the inverse of said second expand bit to produce a trimmed fine image bit;

an expand OR gate responsive to said fourth neighborhood of bits to produce an expanded trim bit;

AND gate responsive to the inverse of said expanded trim bit and the central bit of the third neighborhood of bits to produce a last trim bit;

AND gate responsive to said auxiliary second expand bit and said delayed second image bit to produce a second grow bit;

AND gate responsive to said auxiliary second expand bit and inverse of said central bit of the second neighborhood to produce a second edge bit;

a selectable second combiner means responsive to said fine image bit, said trimmed fine image bit, said rejoin bit, said last trim bit, the central bit of the second neighborhood, said second trim bit, said auxiliary second trim bit, and the said delayed second image bit, said second auxiliary expand bit, said second grow bit, said second edge bit and said central bit of the first neighborhood for combining said inputs thereto to produce a second combined bit which forms the first output of the section;

a selectable third combiner means responsive to said fine image bit, said trimmed fine image bit, said rejoin bit, said last trim bit and the said delayed second image bit, and said second image bit for combining said inputs thereto to produce a third combined bit which forms the second output of the section.

25. The image processing sections of claim 24 additionally including:

third means to receive in sequence a third stream of bits, related to the first stream of bits, one bit at a time, from one of a plurality of scan lines, each scan line comprising a plurality of bits representative of a line of pixels of an input image;

fourth selectable inverter means responsive to said means to receive the third stream of bits to selectively invert said third stream of bits;

fifth selectable inverter means responsive to said means to receive the second stream of bits to selectively invert said second stream of bits;

the said boolean combiner additionally responsive to the fifth selectable inverter output, for logically combining inputs to form the input to the first neighborhood;

a boolean combiner means disposed between the first selectable inverter and the first neighborhood, responsive to said first selectable inverter output, said fourth selectable inverter output and said fifth selectable inverter output, for logically combining inputs to form the input to the first neighborhood;

a third selectable trim means responsive to said first neighborhood of bits to produce a square root of two trim bit which are related to said neighborhood of bits input thereto by a selectable trim function performed by said trim means;

said first selectable combiner means additionally responsive to the said square root of two bit, for combining inputs to form the first combined bit.

26. The image processing sections of claim 25 additionally including:

third selectable inverter means responsive to said second selectable combiner bit to selectively invert said second combined bit, said selectively inverted second combined bit comprises the first output of said section which is related to the bits input to said section by the image processing operation which is performed by the section.

27. The image processing sections of claim 24 additionally including:

said second image delay means additionally producing an extended delay bit;

said third selectable combiner additionally responsive to said extended delay bit.

28. The image processing sections of claim 27 additionally including:

third selectable inverter means responsive to said second selectable combiner bit to selectively invert said second combined bit, whereby said third inverter bit comprises the first output of said section which is related to the bits input to said section by the image processing operation which is performed by the section.

29. An image processing section suitable for arrangement in an array and capable of performing an image processing function, each said image processing section comprising, in combination:

first means to receive in sequence a stream of bits, one bit at a time, from one of a plurality of scan lines, each scan line comprising a plurality of bits representative of a line of pixels of a contracted input image;

first neighborhood means responsive to said first means to receive and the first means to receive from the sections adjacent thereto in said array to produce a first neighborhood of bits with a central bit;

a contraction means responsive to said first neighborhood of bits to produce a contract bit at the output thereof which is related to said neighborhood of bits input thereto by a contract function performed by said contract means whereby said contract bit comprises the first output of the section;

second means to receive in sequence a stream of bits, one bit at a time, from one of a plurality of scan lines, each scan line comprising a plurality of bits representative of a line of pixels of a input image;

second neighborhood means responsive to said second means to receive to produce a second neighborhood of bits with a central bit;

an expand means responsive to said first neighborhood of bits to produce an expand bit which is related to said first neighborhood of bits input thereto by the expand function performed by said expand means;

AND gate responsive to said central bit of said second neighborhood and to the inverse of said expand bit to produce a fine image bit, whereby said fine image bit is related to the bits input to said section by the image processing operation which is performed by the section and forms the second output of the section.

30. The image processing section of claim 29 additionally including:

an OR gate combiner means responsive to said fine image bit and said first neighborhhood central bit for combining said inputs thereto to produce a combined bit whereby said combined bit comprises the second output of said section which is related to the bits input to said section by the image processing operation which is performed by the section.

31. The image processing sections of claim 30 additionally including:

second neighborhood means additionally responsive to the second means to receive from the sections adjacent thereto in said array;

a rejoin means responsive to said first and second neighborhoods of bits to produce a rejoin bit which is related to the first and second neighborhoods of bits input thereto by the rejoin function performed by the rejoin means;

said OR gate combiner means being additionally responsive to said rejoin bit.

32. An image processing section suitable for arrangement in an array and capable of performing an image processing function, each said image processing section comprising, in combination;

first means to receive in sequence a stream of bits, one bit at a time, from one of a plurality of scan lines, each scan line comprising a plurality of bits representative of a line of pixels of a contracted input image;

first neighborhood means responsive to said first means to receive and the first means to receive from the sections adjacent thereto in said array to produce a first neighborhood of bits with a central bit;

a contraction means responsive to said first neighborhood of bits to produce a contract bit at the output thereof which is related to said neighborhood of bits input thereto by a contract function performed by said contract means whereby said contract bit comprises the first output of the section;

an expand means responsive to said first neighborhood of bits to produce an expand bit which is related to said first neighborhood of bits input thereto by the expand function performed by said expand means;

second means to receive in sequence a stream of bits, one bit at a time, from one of a plurality of scan lines, each scan line comprising a plurality of bits representative of a line of pixels of a input image;

second neighborhood means responsive to said second means to receive and the second means to receive from the sections adjacent thereto in said array to produce a second neighborhood of bits with a central bit;

a trim means responsive to said second neighborhood of bits to produce a trim bit which is related to said second neighborhood of bits input thereto by a trim function performed by said trim means;

AND gate responsive to said trim bit and to the inverse of said expand bit to produce a trimmed fine image bit;

a rejoin means responsive to said first and second neighborhoods of bits to produce a rejoin bit which is related to the first and second neighborhoods of bits input thereto by the rejoin function performed by the rejoin means; and OR gate combiner means responsive to said trimmed fine image bit, said first neighborhood central bit and the rejoin bit for combining said inputs thereto to produce a combined bit whereby said combined bit comprises the second output of said section which is related to the bits input to said section by the image processing operation which is performed by the section.

33. The image processing sections of claim 32 additionally including:

third means to receive in sequence a stream of bits, one bit at a time, from one of a plurality of scan lines, each scan line comprising a plurality of bits representative of a line of pixels of the precursor image of the input image;

first delay means responsive to said third means to receive to produce a first delay bit;

second expand means responsive to said second neighborhood of bits to produce a second expand bit which is related to said second neighborhood of bits input thereto by the second expand function performed by said second expand means;

AND gate responsive to the inverse of said second expand bit and the first delay bit to produce a last image bit; and OR gate second combiner means additionally responsive to said last image bit for combining said inputs thereto to produce a second combined bit.

34. The image processing sections of claim 32 additionally including:

third means to receive in sequence a third stream of bits, one bit at a time, from one of a plurality of scan lines, each scan line comprising a plurality of bits representative of a line of pixels of a related second input image;

a delay means responsive to said third receiving means to produce a delayed second image bit thereby forming an third output from this image processing section;

an OR gate second combiner means additionally responsive to the delayed second image bit for combining said inputs thereto to produce a combined bit.

35. An image processing section suitable for arrangement in an array and capable of performing an image processing function, each said image processing section comprising, in combination;

first means to receive in sequence a stream of bits, one bit at a time, from one of a plurality of scan lines, each scan line comprising a plurality of bits representative of a line of pixels of a contracted input image;

first neighborhood means responsive to said first means to receive and the first means to receive from the scissors adjacent thereto in said array to produce a first neighborhood of bits with a central bit;

a selectable contraction means responsive to said first neighborhood of bits to produce a contract bit at the output thereof which is related to said neighborhood of bits input thereto by a contract function performed by said selectable contract means whereby said contract bit comprises the first output of the section;

second means to receive in sequence a stream of bits, one bit at a time, from one of a plurality of scan lines, each scan line comprising a plurality of bits representative of a line of pixels of a input image;

second neighborhood means responsive to said second means to receive to produce a second neighborhood of bits with a central bit;

a selectable expand means responsive to said first neighborhood of bits to produce an expand bit which is related to said first neighborhood of bits input thereto by the expand function performed by said selectable expand means;

AND gate responsive to said central bit of said second neighborhood and to the inverse of said expand bit to produce a fine image bit, whereby said fine image bit is related to the bits input to said section by the image processing operation which is performed by the section and forms the second output of the section.

36. The image processing section of claim 35 additionally including:

an OR gate combiner means responsive to said fine image bit and said first neighborhood central bit for combining said inputs thereto to produce a combined bit whereby said combined bit comprises the second output of said section which is related to the bits input to said section by the image processing operation which is performed by the section.

37. The image processing section of claim 36 additionally including:

second neighborhood means additionally responsive to the second means to receive from the sections adjacent thereto in said array;

a selectable rejoin means responsive to said first and second neighborhoods of bits to produce a rejoin bit which is related to the first and second neighborhoods of bits input thereto by the rejoin function performed by the rejoin means;

said OR gate combiner means being additionally responsive to said rejoin bit.

38. An image processing section suitable for arrangement in an array and capable of performing an image processing function, each said image processing section comprising, in combination:

first means to receive in sequence a stream of bits, one bit at a time, from one of a plurality of scan lines, each scan line comprising a plurality of bits representative of a line of pixels of a contracted input image;

first neighborhood means responsive to said first means to receive and the first means to receive from the sections adjacent thereto in said array to produce a first neighborhood of bits with a central bit;

a selectable contraction means responsive to said first neighborhood of bits to produce a contract bit at the output thereof which is related to said neighborhood of bits input thereto by a contract function performed by said selectable contract means whereby said contract bit comprises the first output of the section;

a selectable expand means responsive to said first neighborhood of bits to produce an expand bit which is related to said first neighborhood of bits input thereto by the expand function performed by said selectable expand means;

second means to receive in sequence a stream of bits, one bit at a time, from one of a plurality of scan lines, each scan line comprising a plurality of bits representative of a line of pixels of a input image;

second neighborhood means responsive to said second means to receive and the second means to receive from the sections adjacent thereto in said array to produce a second neighborhood of bits with a central bit;

a selectable trim means responsive to said second neighborhood of bits to produce a trim bit which is related to said second neighborhood of bits input thereto by a trim function performed by said selectable trim means;

AND gate responsive to said trim bit and to the inverse of said expand bit to produce a trimmed fine image bit;

a selectable rejoin means responsive to said first and second neighborhoods of bits to produce a rejoin bit which is related to the first and second neighborhoods of bits input thereto by the rejoin function performed by the selectable rejoin means; and OR gate combiner means responsive to said trimmed fine image bit, said first neighborhood central bit and the rejoin bit for combining said inputs thereto to produce a combined bit whereby said combined bit comprises the second output of said section which is related to the bits input to said section by the image processing operation which is performed by the section.

39. The image processing sections of claim 38 additionally including:

third means to receive in sequence a stream of bits, one bit at a time, from one of a plurality of scan lines, each scan line comprising a plurality of bits representative of a line of pixels of the precursor image of the input image;

first delay means responsive to said third means to receive to produce a first delay bit;

second selectable expand means responsive to said second neighborhood of bits to produce a second expand bit which is related to said second neighborhood of bits input thereto by the second expand function performed by said second selectable expand means;

AND gate responsive to the inverse of said second expand bits and the first delay bit to produce a last image bit; and OR gate second combiner means additionally responsive to said last image bit for combining said inputs thereto to produce a second combined bit.

40. The image processing sections of claim 38 additionally including:

third means to receive in sequence a third stream of bits, one bit at a time, from one of a plurality of scan lines, each scan line comprising a plurality of bits representative of a line of pixels of a related second input image;

a delay means responsive to said third receiving means to produce a delayed second image bit thereby forming an third output from this image processing section;

an OR gate second combiner means additionally responsive to the delayed second image bit for combining said inputs thereto to produce a combined bit.

41. An image processing section suitable for arrangement in an array and capable of performing an image processing function, each said image processing section comprising, in combination:

first means to receive in sequence a stream of bits, one bit at a time, from one of a plurality of scan lines, each scan line comprising a plurality of bits representative of a lines of pixels of a contracted input image;

first neighborhood means responsive to said first means to receive and the first means to receive from the sections adjacent thereto in said array to produce a first neighborhood of bits with a central bit;

second means to receive in sequence a stream of bits, one bit at a time, from one of a plurality of scan lines, each scan line comprising a plurality of bits representative of a lines of pixels of an input image;

second neighborhood means responsive to said second means to receive and the second means to receive from the sections adjacent thereto in said array to produce a second neighborhood of bits with a central bit whereby said second neighborhood central bit comprises the third output of the section;

third means to receive in sequence a third stream of bits, one bit at a time, from one of a plurality of scan lines, each scan line comprising a plurality of bits representative of a line of pixels of the precursor image of the input image;

first delay means responsive to said third means to receive to produce a delayed precursor image bit;

fourth means to receive in sequence a fourth stream of bits, one bit at a time, from one of a plurality of scan lines, each scan line comprising a plurality of bits representative of a line of pixels of a second related input image;

a second delay means responsive to said fourth receiving means to produce a delayed second image bit whereby delayed second image bit comprises the fourth output of the section;

a selectable contraction means responsive to said first neighborhood of bits to produce a contract bit at the output thereof which is related to said first neighborhood of bits input thereto by a selectable contract function performed by said selectable contract means whereby said contract bit comprises the first output of the section;

a first selectable expand means responsive to said first neighborhood of bits to produce a first expand bit which is related to said first neighborhood of bits input thereto by the first selectable expand function performed by said first selectable expand means;

a second selectable expand means responsive to said second neighborhood of bits to produce a second expand bit which is related to said second neighborhood of bits input thereto by the second selectable expand function performed by said second selectable expand means;

a selectable rejoin means responsive to said first and second neighborhoods of bits to produce a rejoin bit which is related to the first and second neighborhoods of bit input thereto by the rejoin function performed by the selectable rejoin means;

a first selectable trim means responsive to said second neighborhood of bits to produce a first trim bit which is related to said second neighborhood of bits input thereto by a trim function performed by said selectable trim means;

AND gate responsive to said trim bit and to the inverse of said first expand bit to produce a trimmed fine image bit;

AND gate responsive to said central bit of said second neighborhood and to the inverse of said first expand bit to produce a fine image bit;

AND gate responsive to the inverse of said second expand bit and the central bit of the delayed precursor bit to produce a last image bit; and a selectable OR gate combiner means responsive to said fine image bit, said first neighborhood central bit, said rejoin bit, said last image bit, trimmed fine image bit and delayed second image bit, for combining said inputs thereto to produce a combined bit whereby said combined bit comprises the second output of said section which is related to the bits input to said section by the image processing operation which is performed by the section.

42. The image processing sections of claim 41 additionally including:

said first selectable trim means additionally producing an auxiliary first trim bit;

said selectable OR gate combiner means additionally responsive to the said first trim bit and to said auxiliary first trim bit.

43. The image processing sections of claim 41 additionally including:

a second selectable trim means responsive to said second neighborhood of bits to produce a second trim bit;

said selectable OR gate combiner means additionally responsive to the said second trim bit.

44. The image processing sections of claim 41 additionally including:

said second expand means additionally producing an auxiliary second expand bit;

said selectable OR gate combiner means is additionally responsive to the auxiliary second expand bit and said central bit of the second neighborhood.

45. The image processing sections of claim 44 additionally including:

AND gate means responsive to said auxiliary second expand bit and the inverse of the second neighborhood central bit to produce an edge bit;

said selectable OR gate combiner means is additionally responsive to said edge bit.

46. The image processing sections of claim 44 additionally including:

AND gate means responsive to said auxiliary second expand bit and the delayed second image bit to produce a grow bit;

said selectable OR gate combiner means is additionally responsive to said grow bit.

47. The image processing sections of claim 44 additionally including:

a selectable inverter disposed between the second means to receive and the second neighborhood to selectively produce an inverted image bit.

48. The image processing sections of claim 41 additionally including:

said first selectable trim means additionally producing an auxiliary first trim bit;

a second selectable trim means responsive to said second neighborhood of bits to produce a second trim bit;

said second expand means additionally producing an auxiliary second expand bit;

AND gate means responsive to said auxiliary second expand bit and the inverse of the second neighborhood central bit to produce an edge bit, AND gate means responsive to said auxiliary second expand bit and the delayed second image bit to produce a grow bit;

a selectable inverter disposed between the second means to receive and the second neighborhood to selectively produce an inverted image bit;

said selectable OR gate combiner means additionally responsive to said first trim bit, said first auxiliary trim bit, said second trim bit, said auxiliary second expand bit, said central bit of the second neighborhood, said edge bit and said grow bit.

49. An image processing section suitable to be arranged in an array and capable of performing an image processing function, each said image processing section comprising, in combination:

means to receive in sequence a stream of bits, one bit at a time, from one of a plurality of scan lines, each scan line comprising a plurality of bits representative of a line of pixels of an input image;

first neighborhood means responsive to said means to receive and the means to receive from the sections adjacent thereto in said array to produce a first neighborhood of bits with a central bit;

a selectable expand/contract means responsive to said first neighborhood of bits to produce an expand/contract bit which is related to said neighborhood of bits input thereto by a selectable one of a plurality of expand or contract functions;

second neighborhood means responsive to said expand/contract bit and to said expand/contract bit from the sections adjacent thereto in said array to produce a second neighborhood of bits with a central bit;

a selectable expand means responsive to said second neighborhood of bits to produce an expand bit which is related to said second neighborhood of bits input thereto by a selected on of a plurality of selectable expand function performed by said selectable expand means;

third neighborhood means responsive to said stream of bits to produce a third neighborhood of bits with a central bit; and AND gate responsive to said central bit of said third neighborhood and to the inverse of said expand bit to produce a fine image bit, whereby said fine image bit is related to the bits input to said section by the image processing operation which is performed by the section.

* * * * *